INVENTORS.
DONIVAN L. HALL
WILLIAM C. SUSOR
BY
Marshall, Wilson & Yeasting
attys.

INVENTORS.
DONIVAN L. HALL
WILLIAM C. SUSOR
BY
Marshall, Wilson & Yeasting
att'ys.

INVENTORS.
DONIVAN L. HALL
WILLIAM C. SUSOR
BY
Marshall, Wilson & Yeasting
attys.

INVENTORS.
DONIVAN L. HALL
WILLIAM C. SUSOR
BY
Marshall, Wilson & Yeasting
-attys- INVENTORS.
DONIVAN L. HALL
WILLIAM C. SUSOR
BY
Marshall, Wilson & Yeasting
— att'ys. —

May 13, 1969 D. L. HALL ET AL 3,443,668

PLURAL CAR ELEVATOR SYSTEM FOR DEVELOPING HALL CALL ASSIGNMENTS BETWEEN INDIVIDUAL CARS AND REGISTERED HALL CALLS

Filed Oct. 8, 1965 Sheet 6 of 26

INVENTORS.
DONIVAN L. HALL
WILLIAM C. SUSOR

BY

Marshall, Wilson & Yeasting
Att'ys

INVENTORS.
DONIVAN L. HALL
WILLIAM C. SUSOR
BY
Marshall, Wilson & Yeasting
-attys.-

INVENTORS.
DONIVAN L. HALL
WILLIAM C. SUSOR
BY
Marshall, Wilson & Yeasting
Attys.

INVENTORS.
DONIVAN L. HALL
WILLIAM C. SUSOR
BY
Marshall, Wilson & Yeasting
Att'ys.

INVENTORS.
DONIVAN L. HALL
WILLIAM C. SUSOR
BY
Marshall, Wilson & Yeasting
Att'ys INVENTORS.
DONIVAN L. HALL
WILLIAM C. SUSOR
BY
Marshall, Wilson & Yeasting
Att'ys.

May 13, 1969 D. L. HALL ET AL 3,443,668

PLURAL CAR ELEVATOR SYSTEM FOR DEVELOPING HALL CALL ASSIGNMENTS BETWEEN INDIVIDUAL CARS AND REGISTERED HALL CALLS

Filed Oct. 8, 1965 Sheet 12 of 26

INVENTORS.
DONIVAN L. HALL
WILLIAM C. SUSOR

BY

Marshall, Wilson & Yeasting
Att'ys.

INVENTORS.
DONIVAN L. HALL
WILLIAM C. SUSOR
BY
Marshall, Wilson & Yeasting
-att'ys.-

INVENTORS.
DONIVAN L. HALL
WILLIAM C. SUSOR
BY
Marshall, Wilson & Yeasting
Att'ys.

INVENTORS.
DONIVAN L. HALL
WILLIAM C. SUSOR
BY
Marshall, Wilson & Yeasting
attys INVENTORS.
DONIVAN L. HALL
WILLIAM C. SUSOR
BY
Marshall, Wilson & Yeasting
Att'ys.

INVENTORS
DONIVAN L. HALL
WILLIAM C. SUSOR
BY
Marshall, Wilson & Yeasting
-att'ys.-

INVENTORS
DONIVAN L. HALL
WILLIAM C. SUSOR
BY
Marshall, Wilson & Yeasting
Att'ys INVENTORS.
DONIVAN L. HALL
WILLIAM C. SUSOR
BY
Marshall, Wilson & Yeasting
Att'ys INVENTORS.
DONIVAN L. HALL
WILLIAM C. SUSOR
BY
Marshall, Wilson & Yeasting
att'ys.

INVENTORS
DONIVAN L. HALL
WILLIAM C. SUSOR
BY
Marshall, Wilson & Yeasting
-att'ys- INVENTORS.
DONIVAN L. HALL
WILLIAM C. SUSOR
BY
Marshall, Wilson & Yeasting
Attys INVENTORS.
DONIVAN L. HALL
WILLIAM C. SUSOR
BY
Marshall, Wilson & Yeasting
-atty's-

PLURAL CAR ELEVATOR SYSTEM FOR DEVELOPING HALL CALL ASSIGNMENTS BETWEEN INDIVIDUAL CARS AND REGISTERED HALL CALLS

Filed Oct. 8, 1965

INVENTORS.
DONIVAN L. HALL
WILLIAM C. SUSOR

BY *Marshall, Wilson & Yeasting*
-attys-

INVENTORS.
DONIVAN L. HALL
WILLIAM C. SUSOR
BY
Marshall, Wilson & Yeasting
-Att'ys.-

PLURAL CAR ELEVATOR SYSTEM FOR DEVELOPING HALL CALL ASSIGNMENTS BETWEEN INDIVIDUAL CARS AND REGISTERED HALL CALLS

Filed Oct. 8, 1965

INVENTORS.
DONIVAN L. HALL
WILLIAM C. SUSOR
BY
Marshall, Wilson & Yeasting
Att'ys.

United States Patent Office 3,443,668

Patented May 13, 1969

3,443,668

PLURAL CAR ELEVATOR SYSTEM FOR DEVELOPING HALL CALL ASSIGNMENTS BETWEEN INDIVIDUAL CARS AND REGISTERED HALL CALLS

Donivan L. Hall, Toledo, and William C. Susor, Oregon, Ohio, assignors, by mesne assignments, to The Reliance Electric and Engineering Company, Cleveland, Ohio, a corporation of Ohio Filed Oct. 8, 1965, Ser. No. 493,973
Int. Cl. B66b 1/18
U.S. Cl. 187—29 47 Claims

ABSTRACT OF THE DISCLOSURE

An elevator control assigns hall calls to individual cars of a group on the basis of the service capability relationship between each call and the several cars. Each hall call is entered into a hall call memory and maintained until the call is served. A call finder selects individual hall calls and presets an allotter which assigns the selected hall call to a car having an acceptable service capability with respect to the call. The allotter considers the number, nature and location of other calls assigned the car, the load on the car, the spatial relationship of the car to the call to be assigned and the state of operation of the car. The car closest to the call and within acceptable service capability limits receives the call assignment. Limits are relaxed if no car of the group is within the set limits. A change in service capability in the system other than service by a car releases the assignment of a call to a car so that the call can be reassigned based upon the new conditions. Assignment of hall calls can be made directly to a car already required to serve the floor of the call in the service direction of the call as by a car call, thereby avoiding processing through the allotter.

This invention relates to elevator controls and more particularly to supervisory controls for a plurality of elevators operating as a group.

Heretofore group supervisory controls for elevators have been known. Such controls are intended to improve the service afforded by an elevator system by distributing the cars in their travel over the regions of the structure they serve in order to avoid uneven intervals between the registration of calls and the response of an elevator to such calls. The prior art systems universally required the arrival of an elevator at a position from which it could be committed to serve a landing call as a prerequisite to cancelling that call and assigning that call to the car. Ordinarily the only spacing of elevators was by the time interval between the start or release of cars from main landings, dispatching terminals, or by the division of the travel of the elevators into zones of landings and the assignment of elevators to those limited zones of service. In none of these approaches could a true balance of service and thus an even distribution of the requirements imposed upon the system be achieved.

An attempt has been made to overcome the above deficiencies in supervisory controls by assigning landing calls to cars on a quota basis. Williams United States Patent No. 2,020,981 which issued Nov. 12, 1935 represents one of the first attempts to provide quota control. The elevators would accept landing calls only when at a main landing in this system. Attempts were made to reduce the rigidity of the landing call handling ability of these controls. However, only limited success was achieved and the approach was abandoned. An extension of this approach involved providing a set of landing buttons for each car at each landing and associated indicators for each car to indicate a car was within a zone of landings proximate to the landing so that prospective passengers could select the car which could promptly respond to their call by operating the landing button for that car. Bouton et al. United States Patent No. 2,066,906 of Jan. 5, 1937 disclosed this concept. This selection by a prospective passenger was superseded by systems which enabled cars to accept calls from a single set of landing buttons in a zone ahead of the car until a quota of calls had been assigned as Williams et al. United States Patent No. 2,066,921 of Jan. 5, 1937.

Quota controlled elevators tended to retard service by preventing service by overtaking cars. Further a car frequently became fully loaded before it had served all of its assigned calls, with the result that the latter calls in a quota were passed with no service by the loaded assigned car and the unassigned cars were prevented from giving service. Systems were then evolved to permit the following cars to assume calls in the zone of a leading car once the leading car had filled its quota, Jones United States Patent No. 2,104,522 of Jan. 4, 1938. The rigidity of the quota assignment was relaxed so that an overtaking car could answer calls assigned to another car which fell behind, timed dispatching of cars was superimposed upon the quota type of control, Williams et al. United States Patent No. 2,151,819 of Mar. 28, 1939, and the quota was based upon passenger count rather than calls, Bouton et al. United States Patent No. 2,193,609 of Mar. 12, 1940.

The quota control concept considered landing calls for both directions of travel and thus permitted an ascending elevator to be assigned a quota of landing calls including "up landing calls" and "down landing calls." Such systems were refined to the point of releasing the zone of floors for quota assignment to other cars once the car's quota was filled, reversing the car at the highest down quota assigned call, and starting the car from a terminal when its quota was filled, all as shown in Williams et al. United States Patent No. 2,231,741 of Feb. 11, 1941.

Time of registration of calls has also been employed in an effort to equalize service. In British Patent No. 545,755 accepted June 10, 1942 a system is disclosed in which an effort is made to keep cars equally spaced on the circuit of travel so that their call acceptance zones are of equal value. Cars with less than a first low number of calls will accept all new calls in their zone. Those behind schedule or assigned an intermediate number of calls will accept only calls which have been registered for a first delay period. Cars having a high number of assigned calls or substantially behind schedule will accept only long delayed calls.

In each of the above type supervisory controls only a limited number of factors can be considered in establishing the operation of individual cars. The controls are quite inflexible and cannot adapt themselves to extraordinary service situations. The consideration has been directed to the condition of landing calls with little or no regard to car calls. Many of the systems hold cars which could be providing service until cars subject to the supervisory control approach a saturated condition. If the call assignment conditions exceed the capacity of the car the operation of the system is so upset that the supervisory controls frequently disrupt service rather than enhance it.

The dependence in prior art systems upon the relative position of the car and the call it is assigned, either as the call it encountered individually as it advanced along the hatchway, or as a call within a zone of landings, usually extending from the car to the next car ahead, was so rigid that frequently one car would be forced to assume a preponderance of the traffic and would thereby delay response throughout the entire system.

In accordance with the above noted deficiencies it is an object of the present invention to improve elevator system group supervisory controls.

A principal object of this invention is to develop an assignment between registered calls and cars on the basis of the predicted capability of the cars to serve the calls ascertained for example as the anticipated time interval required for the cars to answer the calls.

Another object is to assign landing calls to elevator cars for servicing those cars on the basis of the disposition of the several cars, whereby the assignment of calls to cars unfavorably situated to serve a call is avoided.

A fourth object is to equalize the service burden imposed on all elevator cars effective in the system.

A fifth object is to equalize the interval between call registration and the answering of that call while minimizing the average answer time for calls.

A sixth object is to cancel call assignments to the individual car when service conditions in the system are altered, as where a car is delayed or excessively burdened by its service requirements. Such cancelled call assignments are then reallotted on the basis of the conditions in the system at that time.

A seventh object is to facilitate and expedite the assignment and reassignment of calls to cars.

An eighth object is to include car calls imposed upon an elevator car in the consideration determining assignment between landing calls and the cars.

A ninth object is to evaluate any number of factors from which an assignment determination is made for each car under control of a group supervisory control.

A tenth object is to enable the rapid assignment between landing calls and cars upon receipt without limitation as to the eligibility of cars for said assignment based on their position and in most instances their condition.

A further object is to enable the assignment between landing calls and elevator cars based upon a wide variety of criteria. Thus in the example below the distance between a car and a call and the number of calls assigned to the car between the car and the call are criteria of predicted answer time. The loading of the car and the total calls assigned the car are criteria of predicted ability to serve the call under consideration for assignment. Variations on these criteria are available in accordance with the present object such as the ascertaining of only those calls assigned the car and within the range of travel between the call and car, and the stopping interval currently imposed either as an average or a sum over a number of stops or a period.

Another object is to restrict service of elevator cars to landing calls to those calls with which the cars are associated by the assigning means.

Another object is to treat landing calls individually in the assignment process whereby each call is selected and the relationship between it and the cars eligible to serve it is ascertained prior to the treatment of any other landing call.

Another object is to ascertain the distance between a landing call and the cars eligible to serve the call.

A further object is to ascertain the service capability of cars with respect to registered landing calls.

Other objects involve adjuncts to the developed assignment between landing calls and individual cars to facilitate service including to directly assign landing calls to a car or cars having a car call for the same landing to avoid duplication in service, to correct assignments where conditions change sufficiently to warrant correction except where a car would be required to provide the service of the assignment due to a car call, and to limit assignments where the predicted service capability of all eligible cars with respect to the call is so poor that the accuracy of said prediction is not sufficient to provide a criterion for assignment.

The above objects are realized in a group supervisory control for two or more elevators utilizing call memories to retain assigned calls. Car calls are entered into the call memories directly while landing calls are allotted to the cars according to their current ability to respond promptly to those calls. Each landing call when registered actuates equipment which senses the presence of a car call for that landing in a car traveling in the direction of that call and under certain conditions is directly assigned to the elevator having that car call. In the event no such car call is registered or the direct assignment condition is not in effect, the landing call institutes an operation which assays the disposition of each car with respect to the call and develops an assignment between the call and a car appropriately disposed to provide service.

A primary feature of this invention is the means for developing an assignment for service between individual landing calls and individual cars by predicting the capability of the cars to serve the call and making the assignment according to the prediction. Heretofore, a landing call has been assigned a car when the car had a certain spatial relationship to the call and prior to the creation of that relationship any car might be assigned to serve the call. Where assignment of calls to cars has been accomplished without the rigid requirement that the car approach to within the slowdown distance of the landing of the call, the spatial relationship has limited the eligibility of cars to receive the advance call assignment as by requiring the call to be within a zone of floors available for assignment to the car as determined by the car position. As distinct from the prior art controls the controls of the present invention direct the elevator operations according to the anticipation of the service to be derived therefrom. Thus instead of establishing directions for car operation or correction of further operations after some service has been rendered, the present system predicts the service to be rendered and directs the cars accordingly. It thereby eliminates the lag in response inherent in prior art systems.

A further feature is the ability of the present control system to respond to conditions which alter the validity of its predictions and to develop new directions for the car by a reappraisal of the conditions as they exist after the change. In one view of this aspect of the invention the system can be considered to predict the time required for each of the cars to provide service to each landing call and to predict the time after reaching the call which will be required to serve any service burdens remaining.

A significant feature of the invention is the means for individually treating each landing call by evaluating its relationship to all cars prior to the creation of an assignment between it and an individual car. A landing call when registered is selected for consideration to the exclusion of any other landing calls which may be registered. Its relationship to the cars is evaluated and the assignment completed before another call is selected.

In considering the service capability of the cars relative to the calls the system considers each car capable of serving the call. Two forms of evaluating means are illustrated below. A feature of each is that the distance between the call and each car can be ascertained thereby offering an indication of the travel time required for the cars to reach the call under consideration.

Another means of evaluating service capability is to measure the number of calls assigned to each car. A feature of this invention resides in considering both car calls and landing calls assigned to each car. These calls in representing required stops by the car can also be related to the time required for each car to render service.

Loading of the cars is also employed as a measure of service capability inasmuch as it is indicative of the time required to complete load transfers at the stops.

A feature of this invention is the utilization of the service capability factors to ascertain the closest car to the call under consideration which has an acceptable level of loading and an acceptable number of assigned calls. The assignment is then made between this car and the call. A subsidiary aspect of this feature is the means of successively scanning the cars for the car closest to the call and applying progressively looser acceptance levels for service capability in the event no car having a first preferred acceptable level is found. Thus, in the event all cars have a load or a number of assigned calls exceeding the first preferred acceptable level, a new acceptance level is established and the closest car having the new acceptable level is sought. Several levels can be established utilizing this mode of evaluation for the assignment.

A second means of developing the assignment which is the subject of United States patent application Ser. No. 494,194 for "Elevator Control" filed herewith in the names of Donivan L. Hall, James H. Kuzara and William C. Susor has been disclosed herein as a preferred embodiment for the control system. In this second assigning means the assignment is optimized so that the car having the optimum service capability with respect to the call under consideration is utilized in the assignment between the call and the car. In this assigning means and the assigning means of this invention the assignment is accomplished by assigning the car to the call. However, it is to be appreciated that it is considered within the scope of these concepts to assign the call to the car.

Another feature of this invention is the means for cancelling call assignments when the predicted service capability of a car is altered as by a change in the service requirements or conditions. Landing calls are stored in a first storage in which they are retained until a car has served them. Once they are under assignment they are also stored in a memory individual to the car subject to assignment. This second memory is cancelled with the first when the call is served. It also can be cancelled by a service condition, particularly a loading of the car to capacity. When cancelled from the second memory, a call according to this feature is retained in the first memory and treated as a newly registered car which is selected, subjected to the assignment evaluation for the then current conditions and then associated with a car suitably situated with respect thereto.

A feature of this invention is the call memories for each elevator car and their adjuncts while enable the direct assignment of landing calls when a car call is coincided therewith. A car call can be assigned only to the car for which it is registered, hence it is directly entered into a memory for the car. If a landing call is registered which can be served by a car in serving an assigned car call the landing call and car are associated by a direct assignment process such that no selection of the call or evaluation of the service capability of the cars with respect thereto is required.

If a call must be allotted, a search sequence is initiated to scan each landing ahead of the call to ascertain the spacing of cars from the call by sensing the coincidence of the effective car position and the scan position. This car finder is another feature of the invention.

The exemplary system is arranged to release assignment of all landing calls except those corresponding to car calls for the car under conditions which would lead to a delay in the response of the car to calls. If a car were held unduly at a landing the assignment would be released. Similarly if it were loaded to a predetermined level approaching its capacity, its response would be delayed or its service even prevented and assignment released. When thus released, calls are reassigned to those cars capable of accepting them and responding to them without delay. Reassignment is accomplished by the means employed for the initial assignment.

The aforenoted functions occur and the equipment completes each call assignment or reassignment in a maximum interval of fifty milliseconds. Logic switching elements, advantageously of the solid state type, are utilized to achieve these results with a high degree of reliability.

One feature of this invention is the system of car logic which enables calls to be assigned to cars while they are at any location within the building. A subsidiary aspect of this feature is the isolation of the car service assignments from the car position and direction of travel such that all cars in service are eligible for assignment of a call.

Another feature resides in a call finder which serially processes calls coupled with a call memory which stores calls until the call finder completes the processing of any call under its control.

A further feature involves interlocking between the call finder and the call assigning means such that a call will not cause the operation of the call finder until a call in process has been found and the car-call assignment made. Conversely, the allotter which develops the assignment cannot function during the call hunting operation of the call finder.

An additional feature of the call finder is the means for establishing for each call a base and a hunting direction for the allotter which the allotter employs in locating cars and evaluating their capability to serve the call.

Another feature is the flexibility with which service criteria can be added or altered in the evaluating process of the call allotter.

An additional feature involves a total stops counter for each car which indicates in the allotter functions the total number of stops required by both car and landing calls for each car at the time of call assignment.

A further feature resides in the release of call assignments and the reassignment of such calls to a car more favorably disposed to respond to the calls when a change in conditions in the system warrant.

A feature of the call assignment techniques and apparatus of this invention is the utilization of a call memory for all landing calls which can be allotted to a call memory individual to each car and distinct from the car's car call memory. All three of these memories are reset when a car stops at the landing of the call while conditioned to serve the call.

The above and additional objects and features will be more fully appreciated from the following detailed description when read with reference to the accompanying drawings in which:

FIG. 1 is a functional block diagram of an elevator system according to the present invention including subdivided block diagrams representative of a set of functional elements for typical elevator cars;

FIGS. 1*a* and 1*b* are expanded functional block diagrams of the block labeled "CALL ALLOTTER" in FIG. 1;

Figure 1:
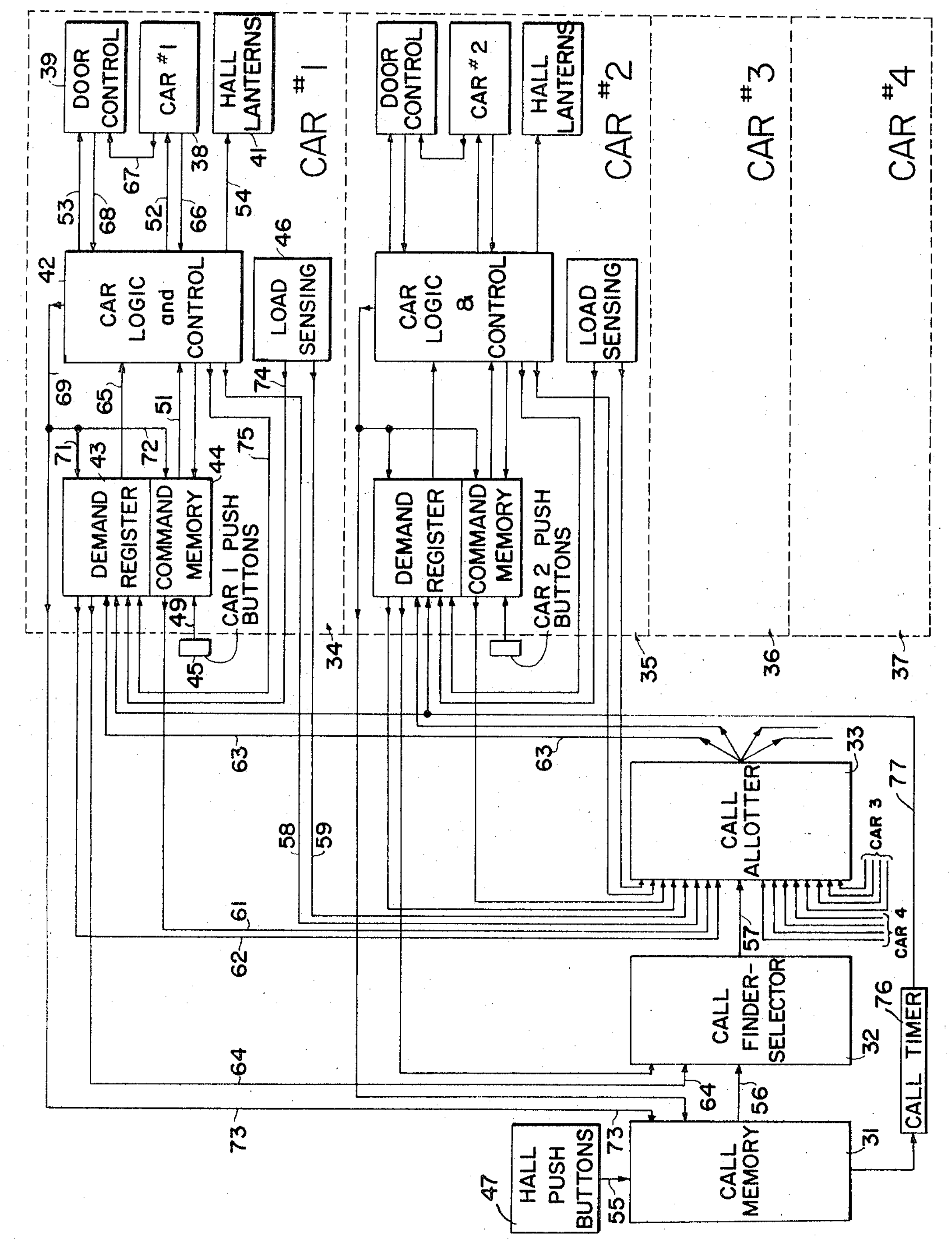
Figure 1A:
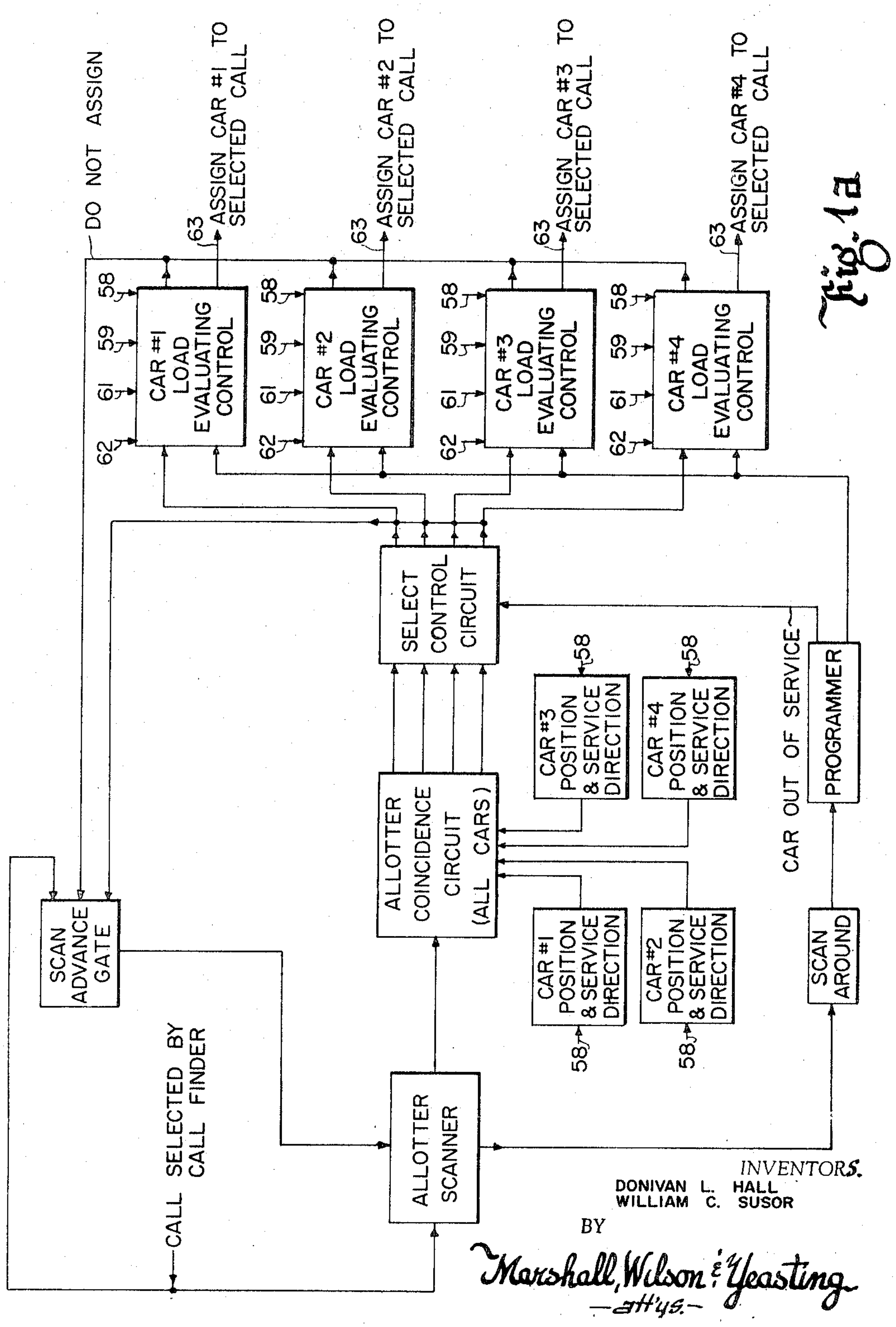
Figure 1B:
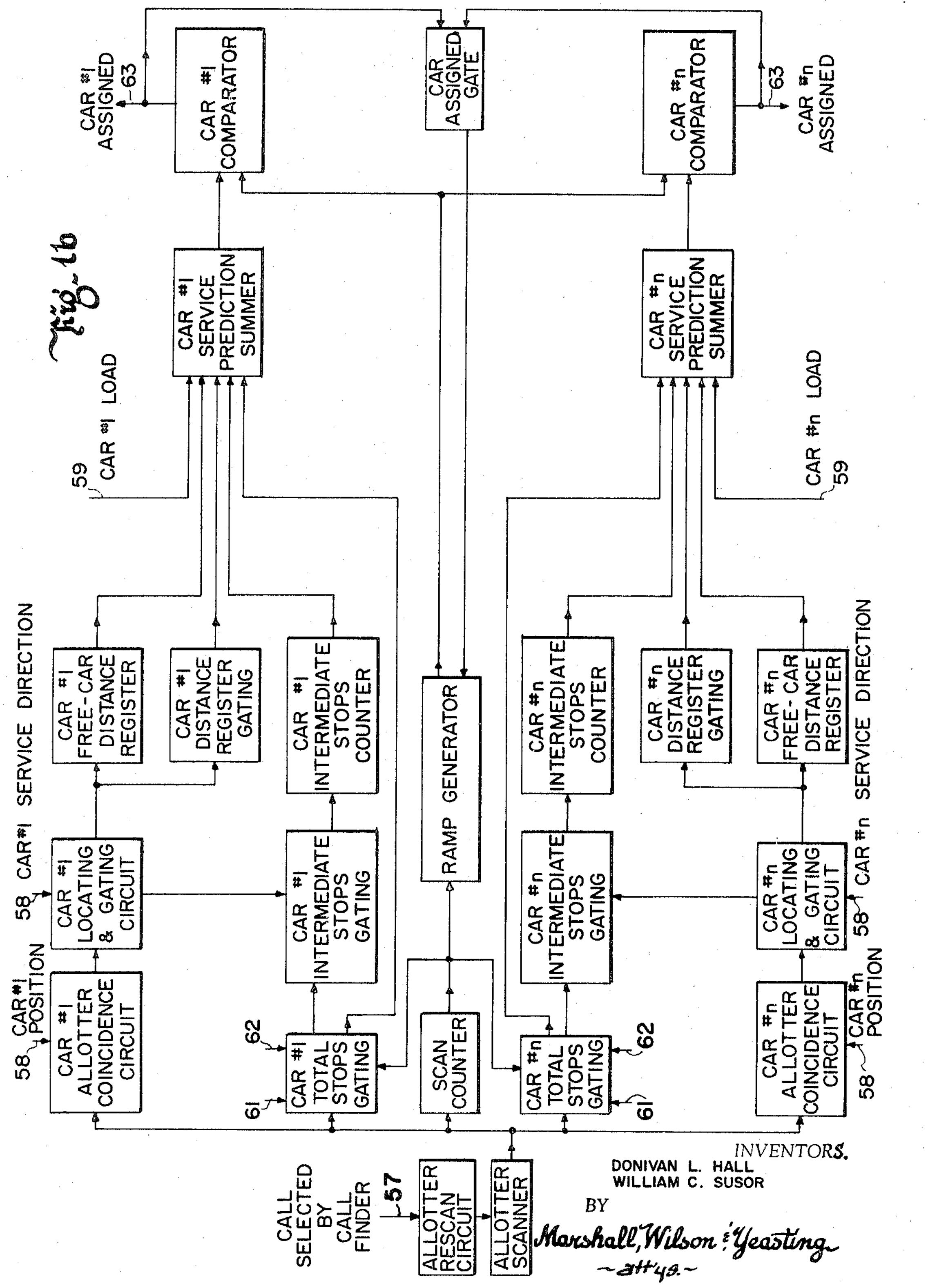
Figure 7:
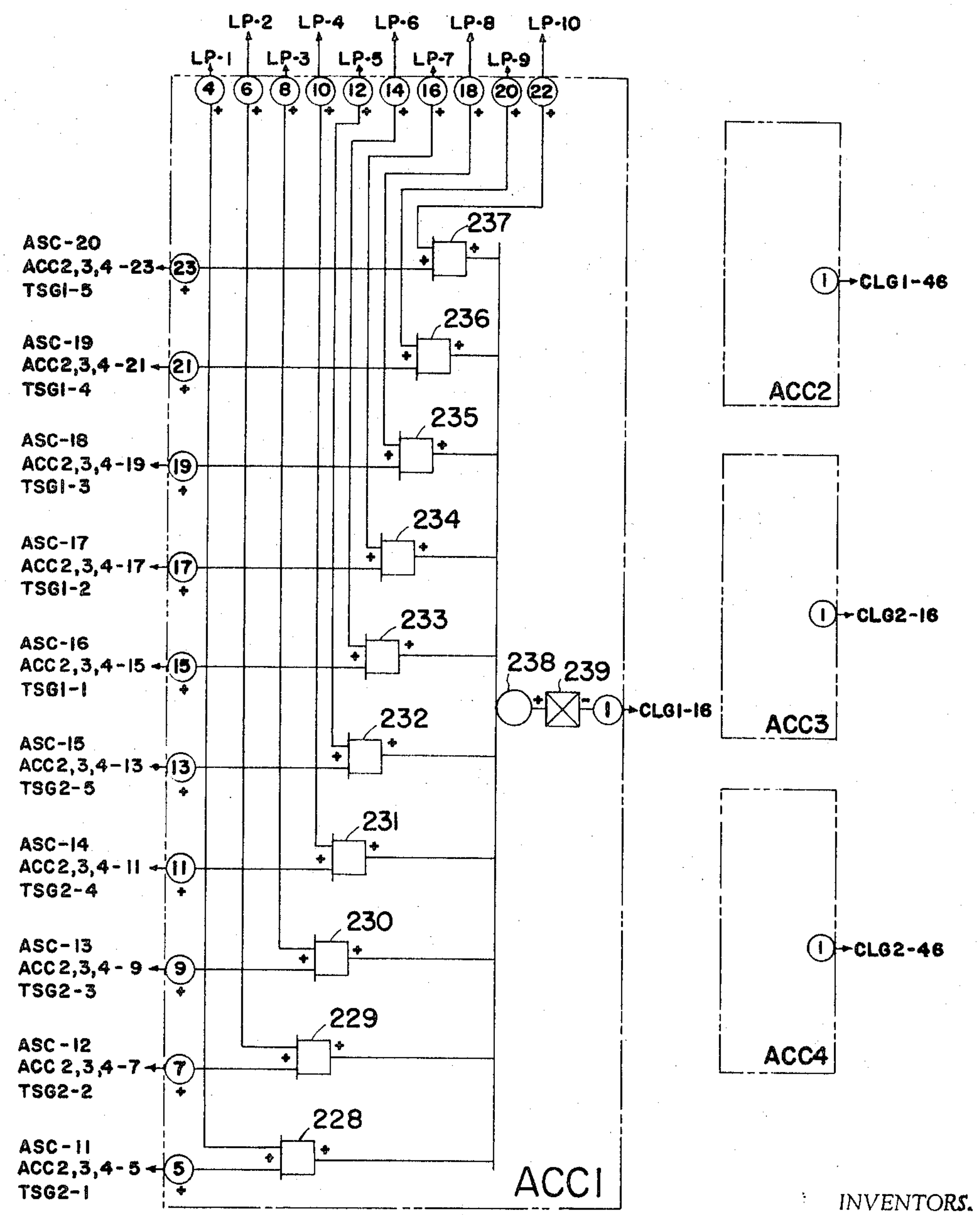
Figure 8:
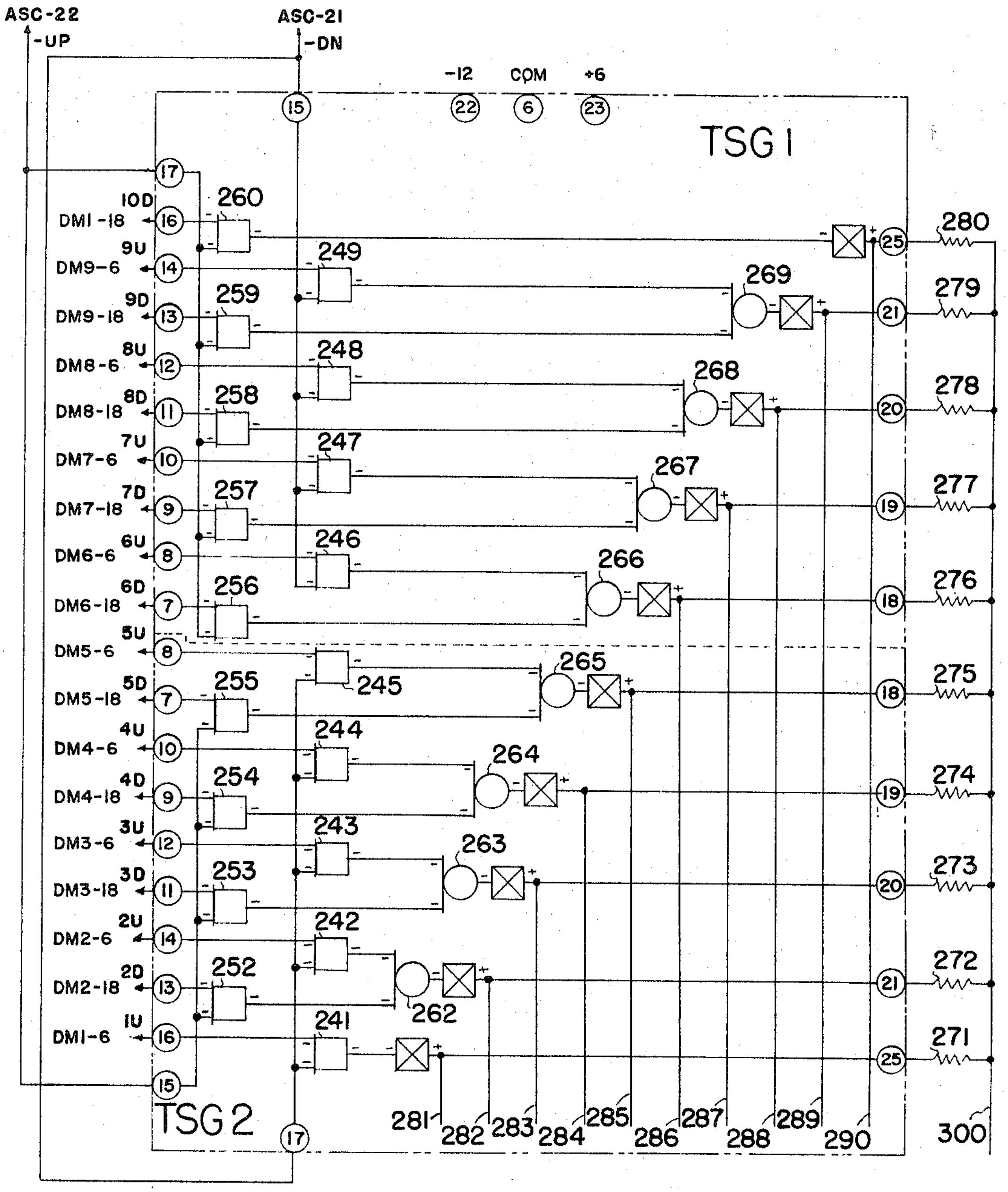
Figure 9:
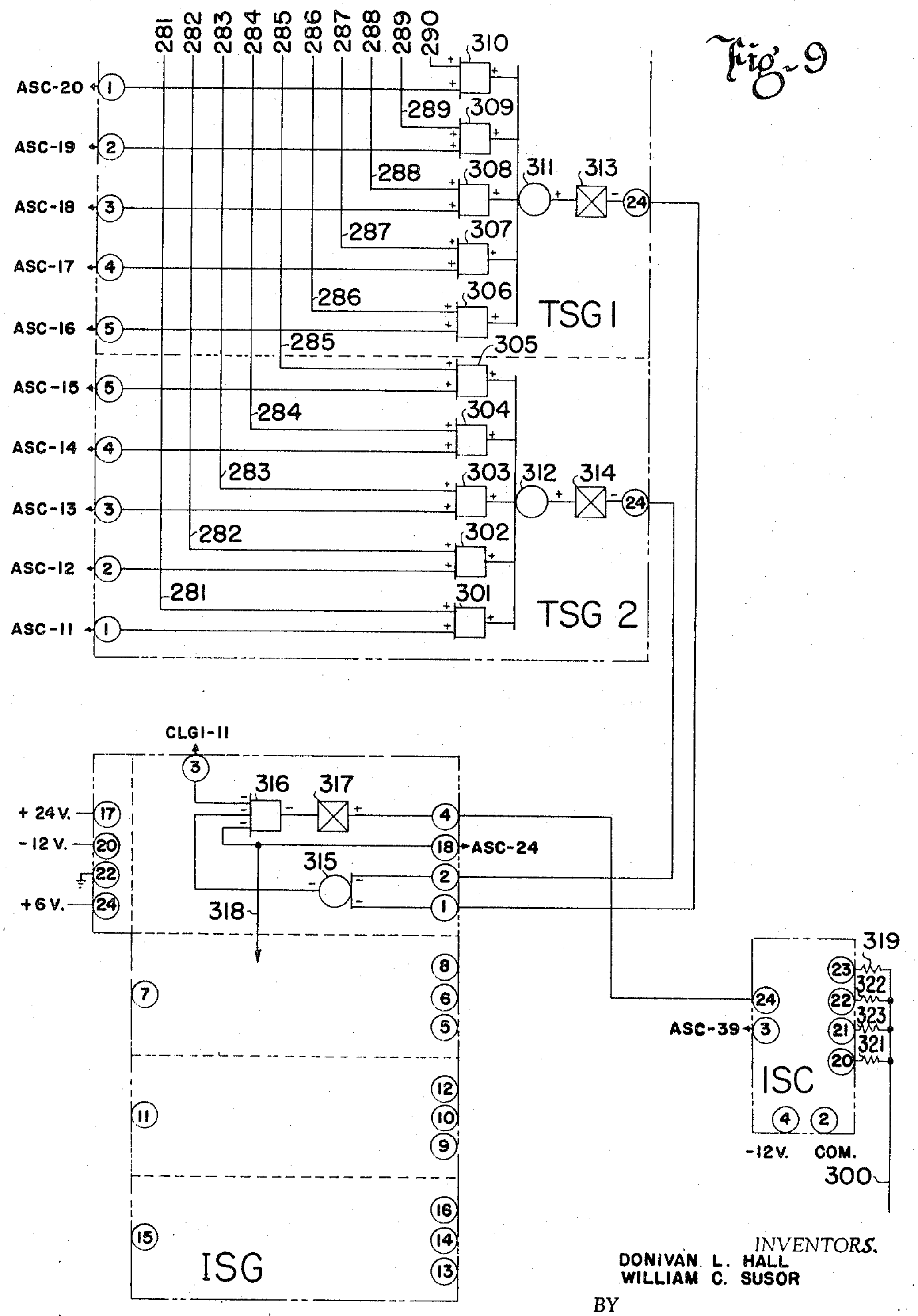
Figure 10:
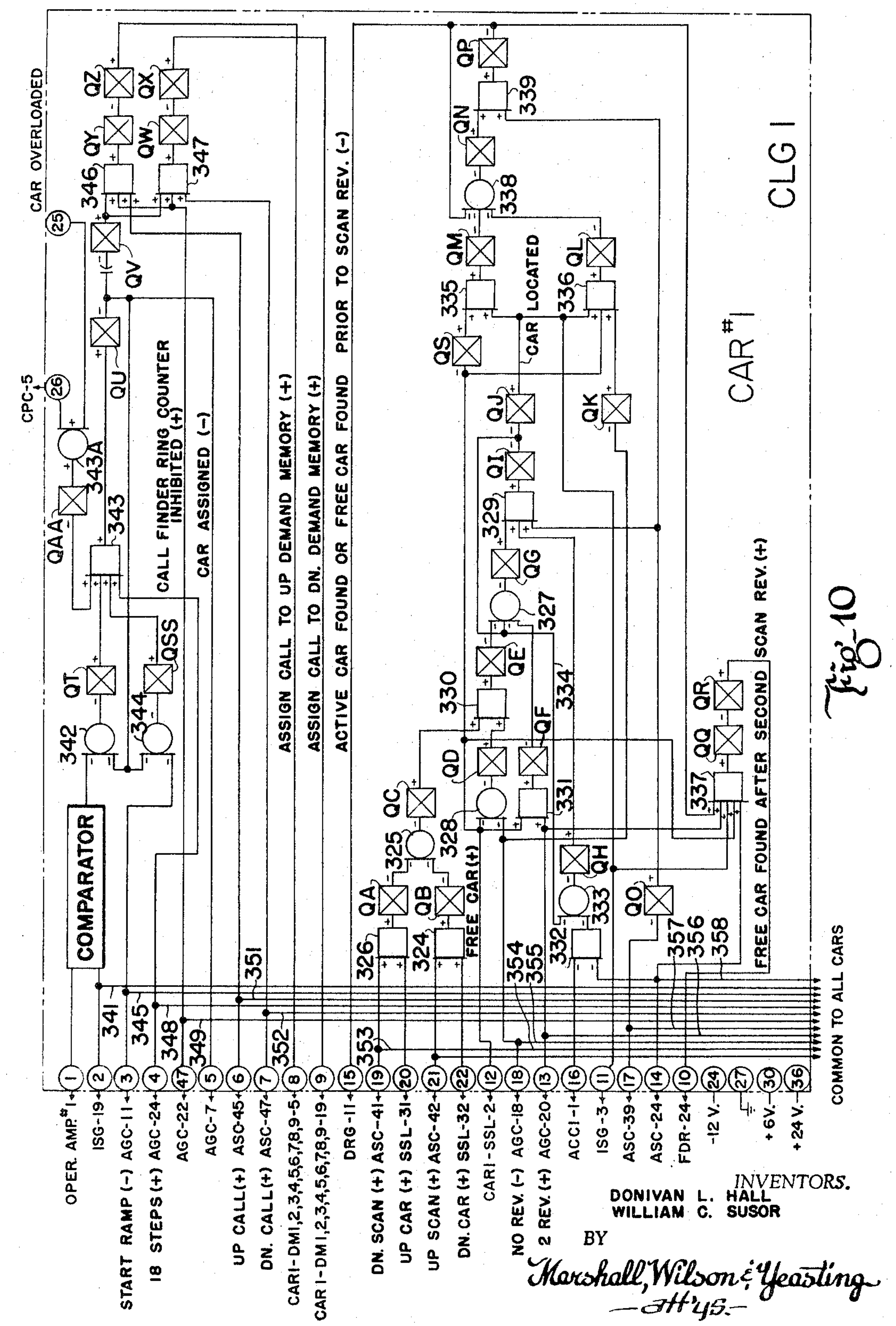
Figure 12:
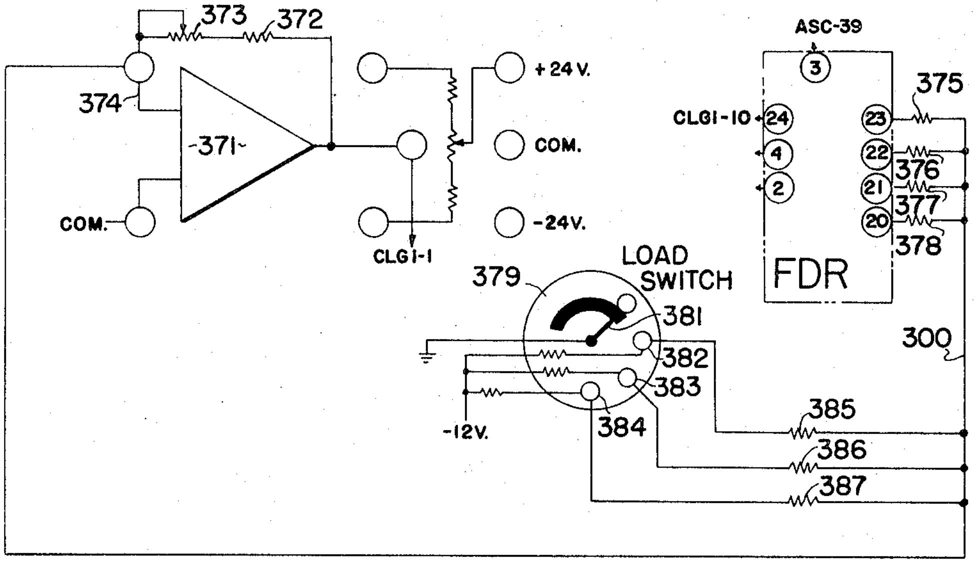
Figure 11:
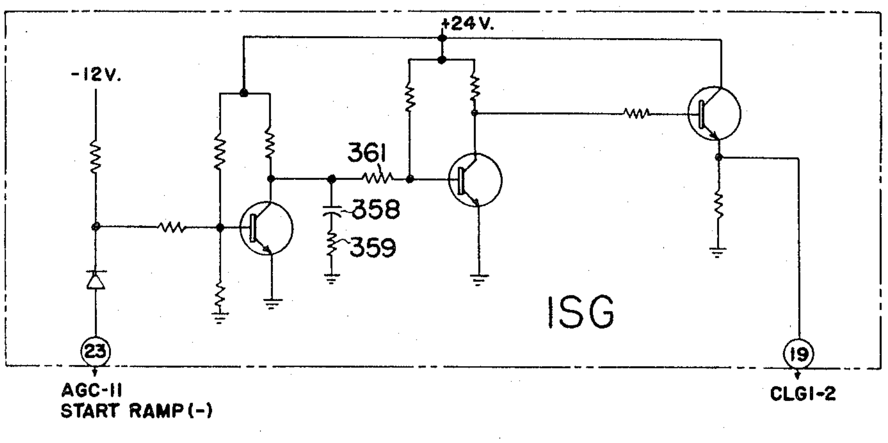
Figure 13:
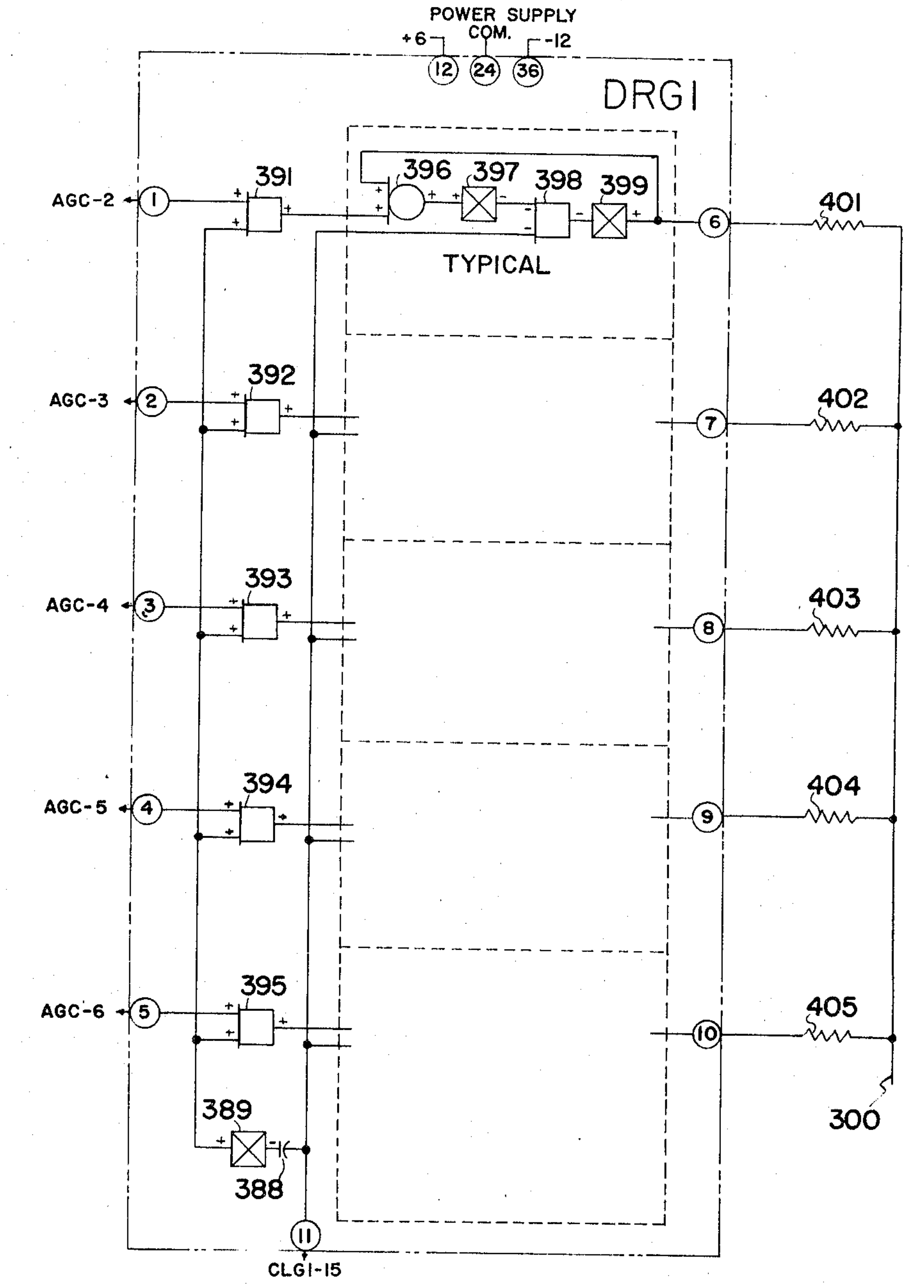
Figure 14:
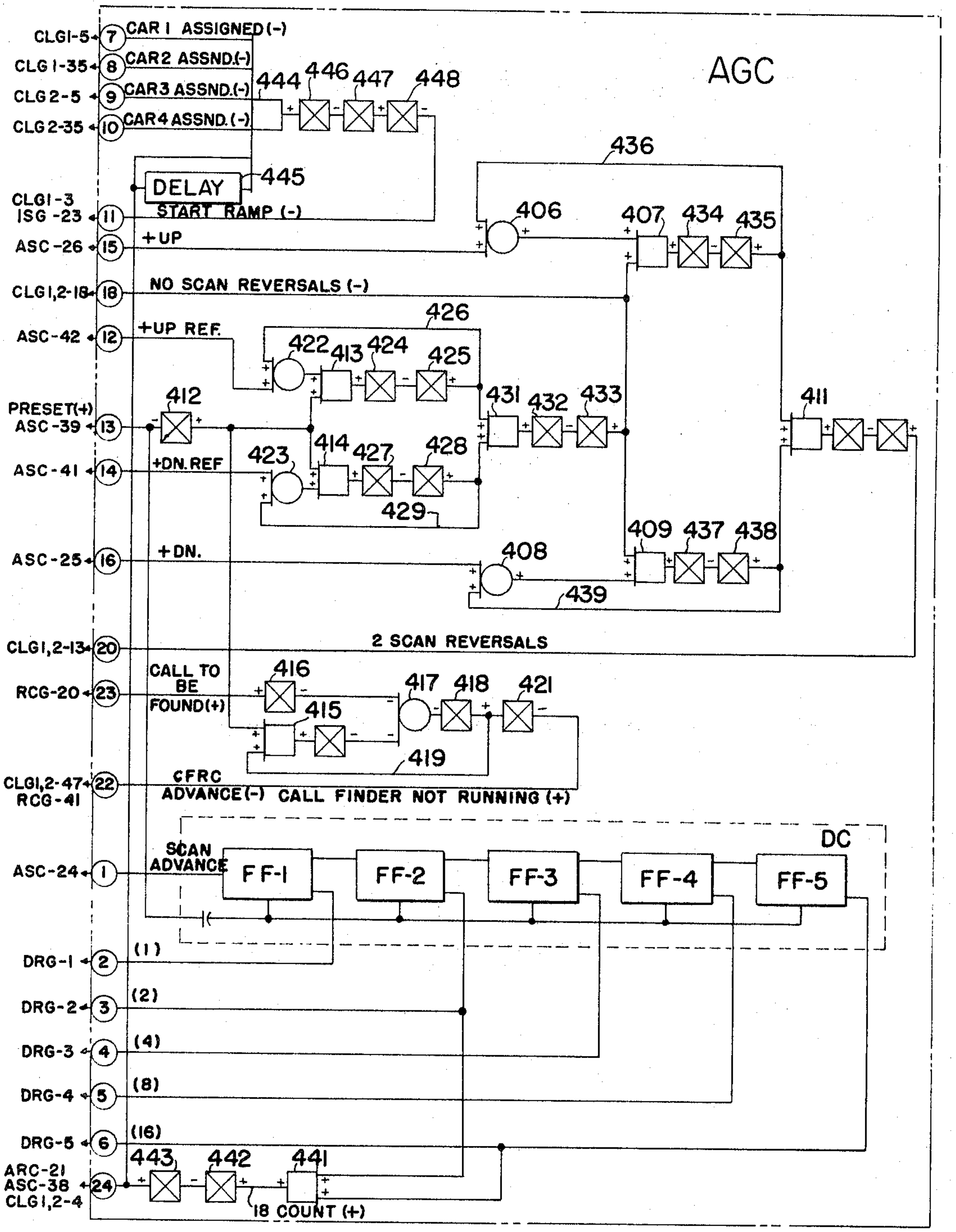
Figure 15:
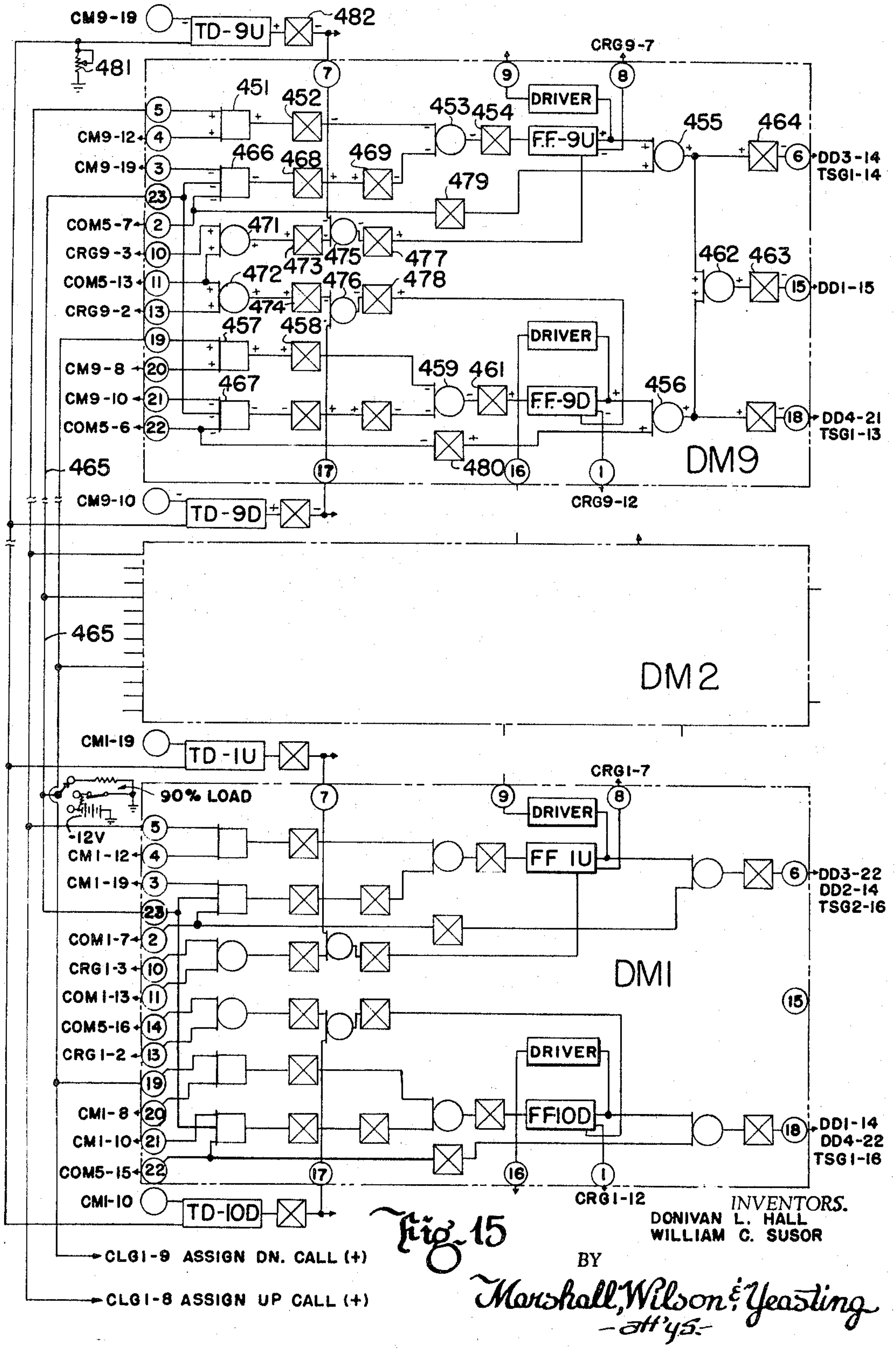
Figure 16:
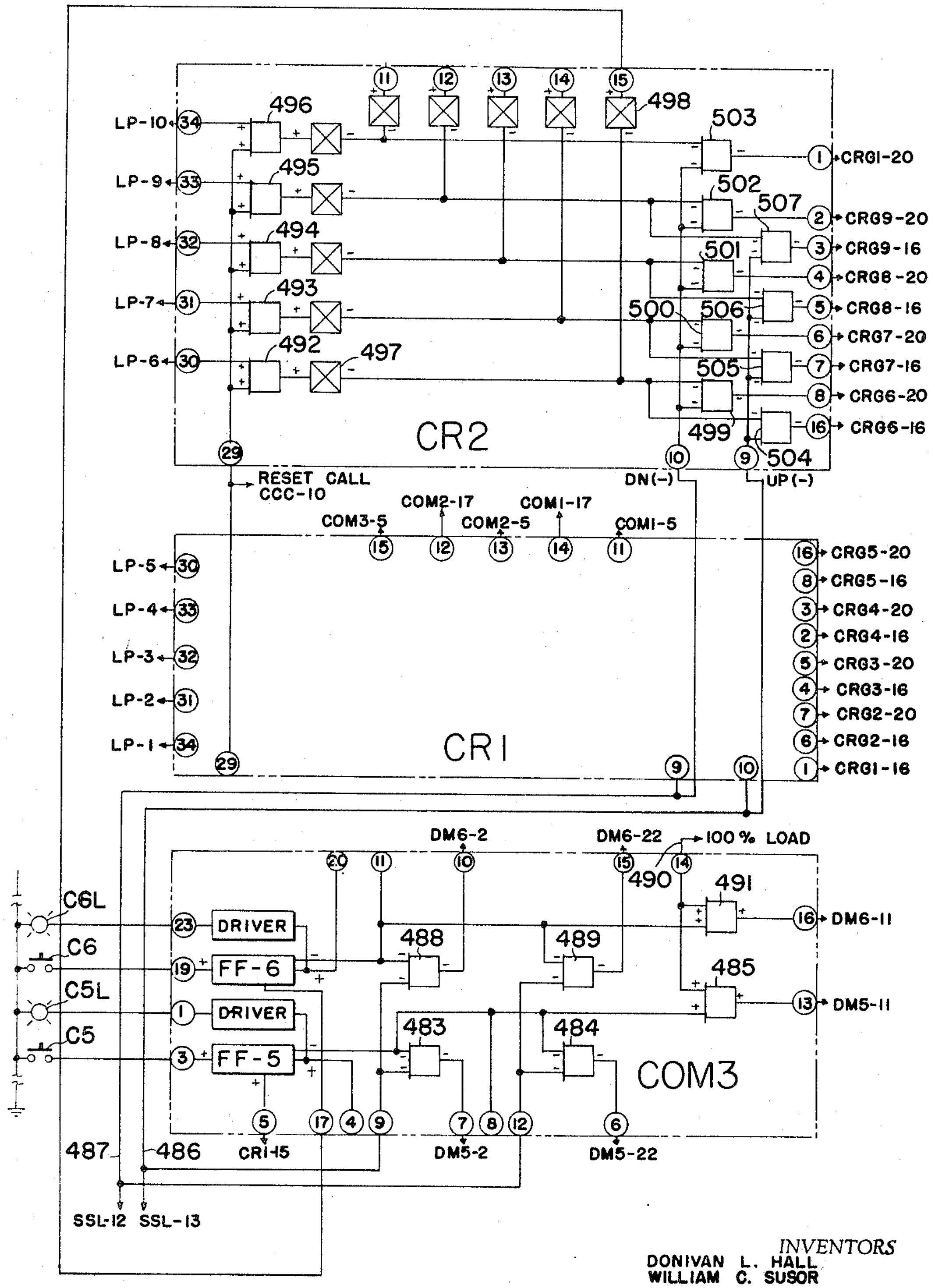
Figure 17:
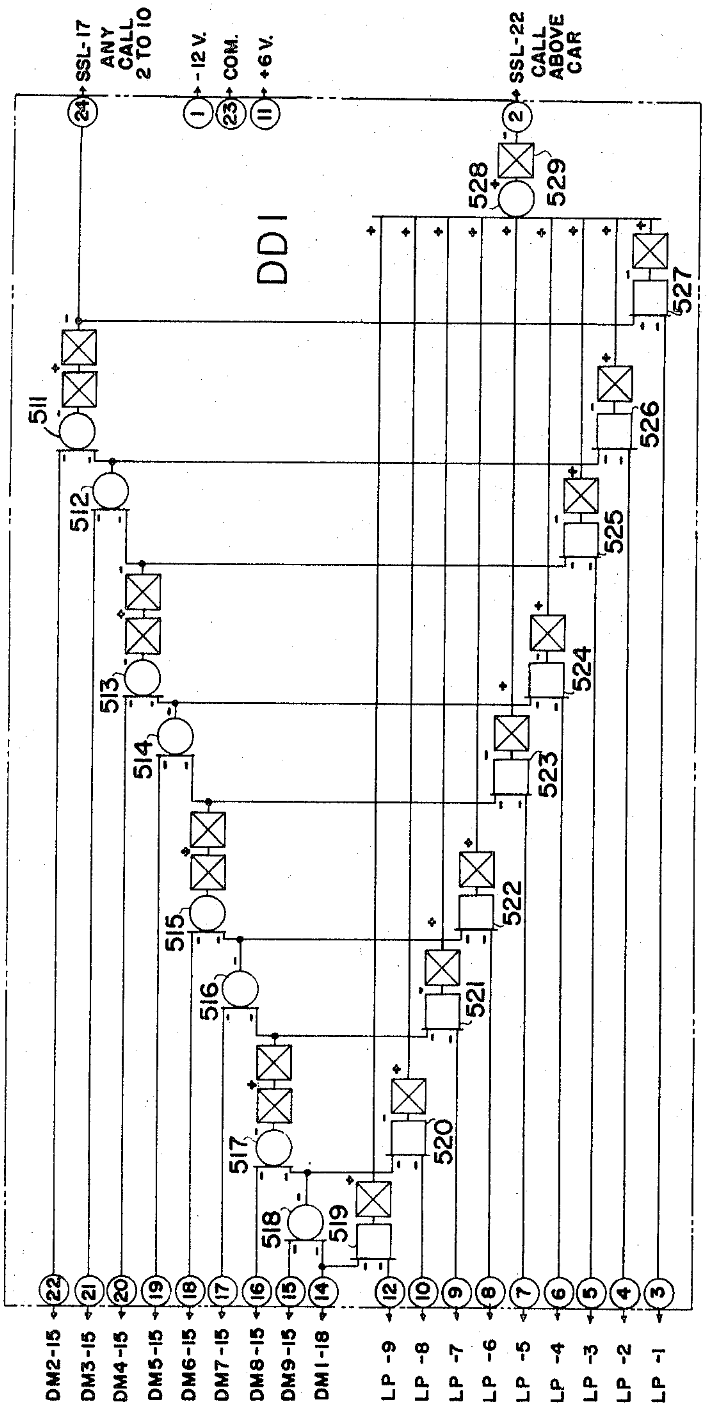
Figure 18:
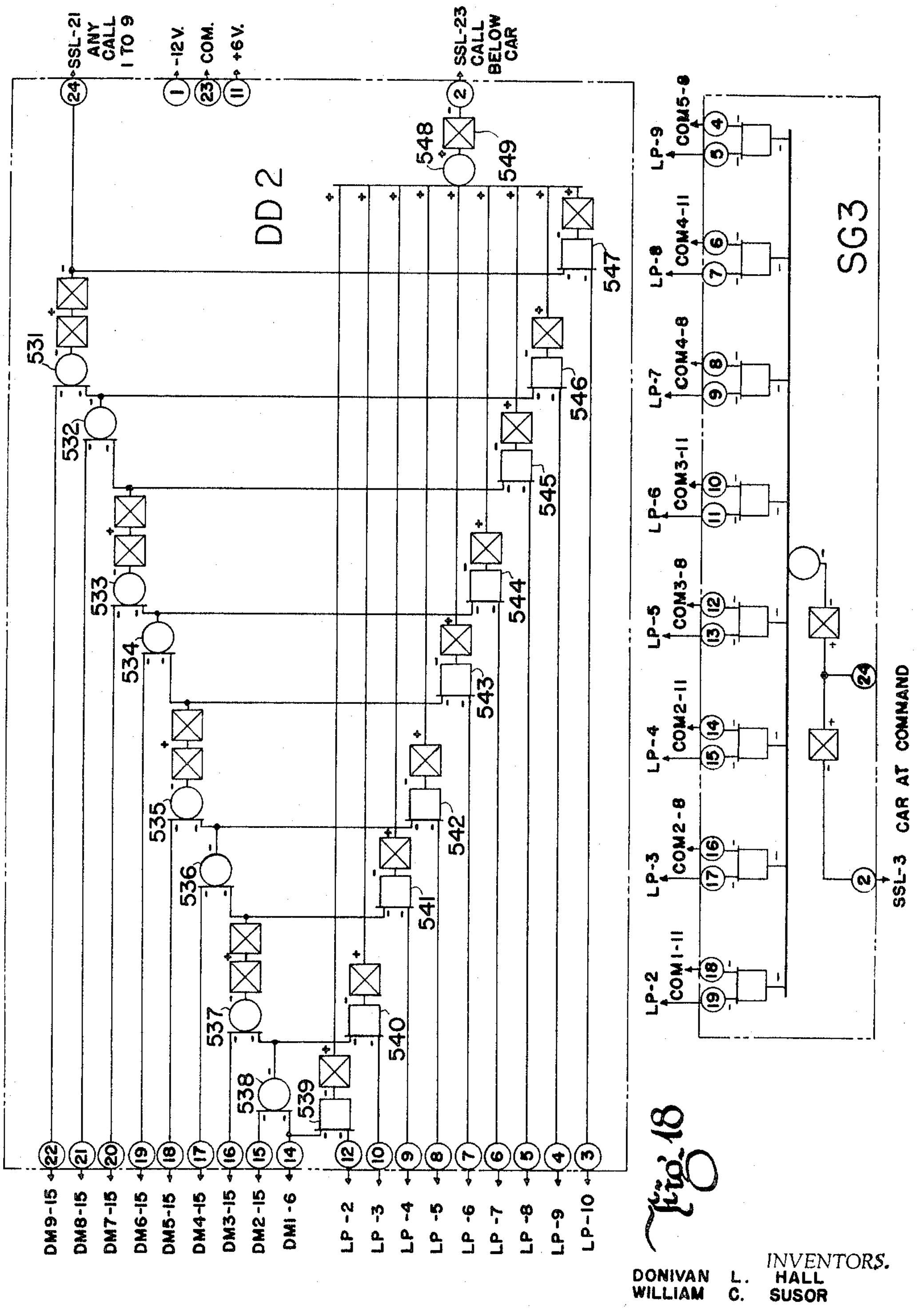
Figure 19:
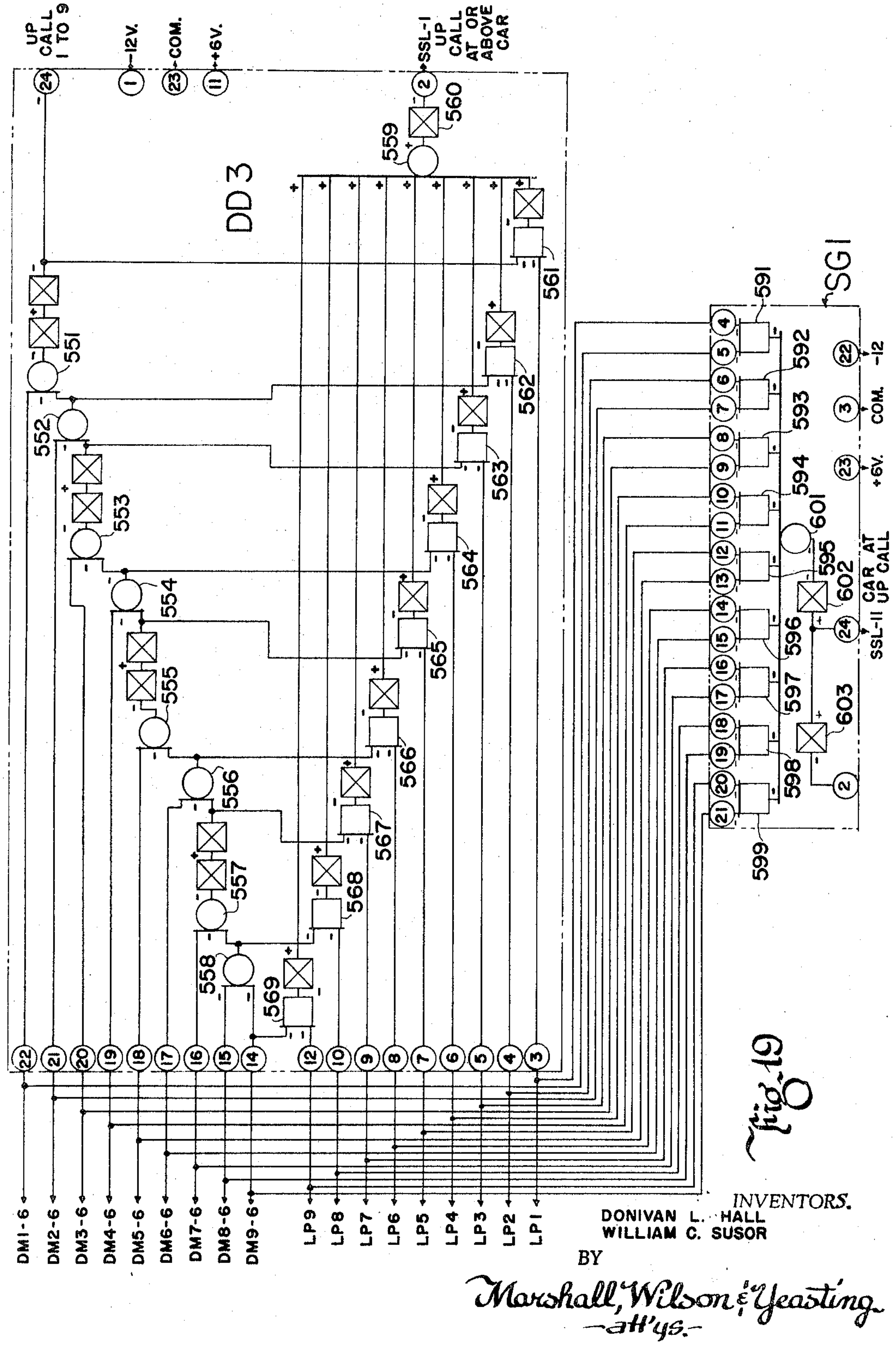
Figure 20:
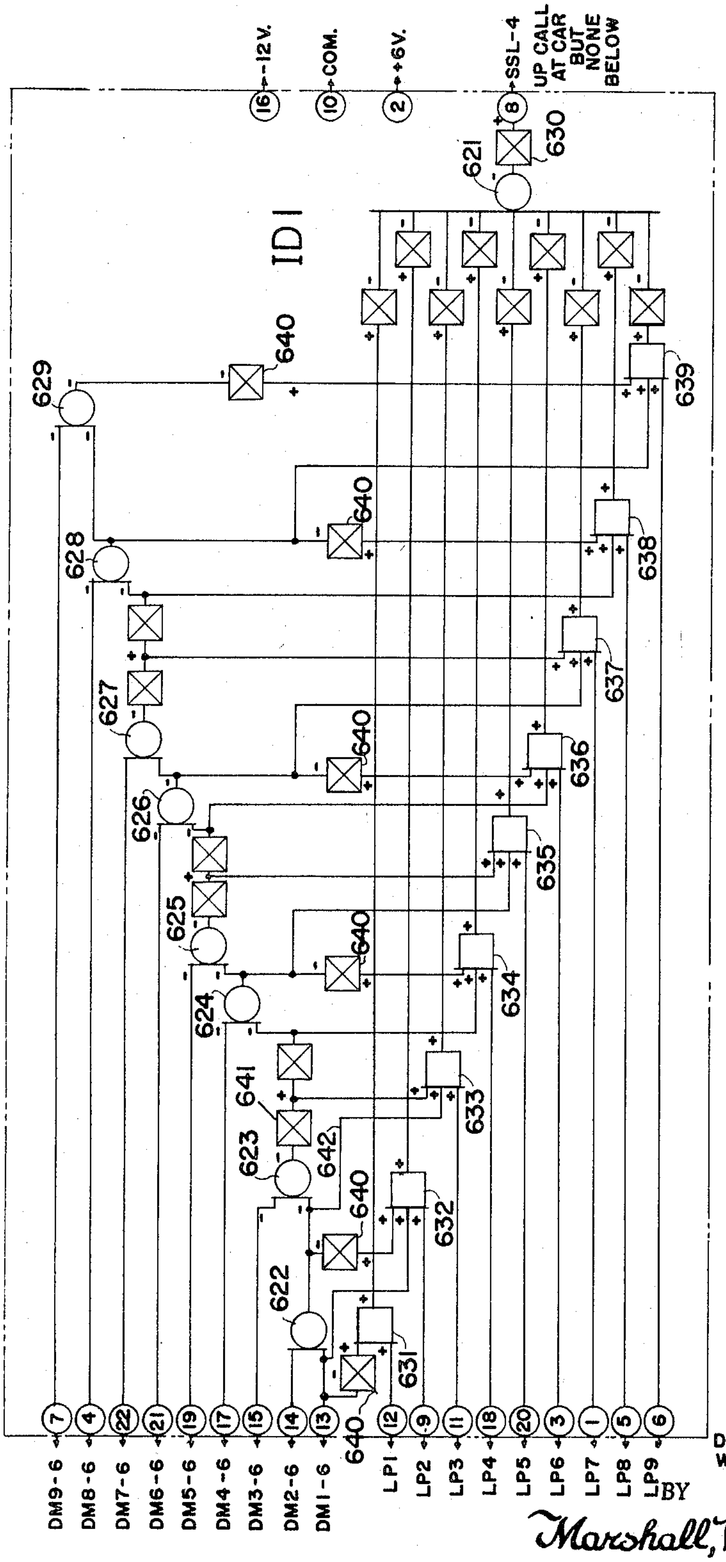
Figure 21:
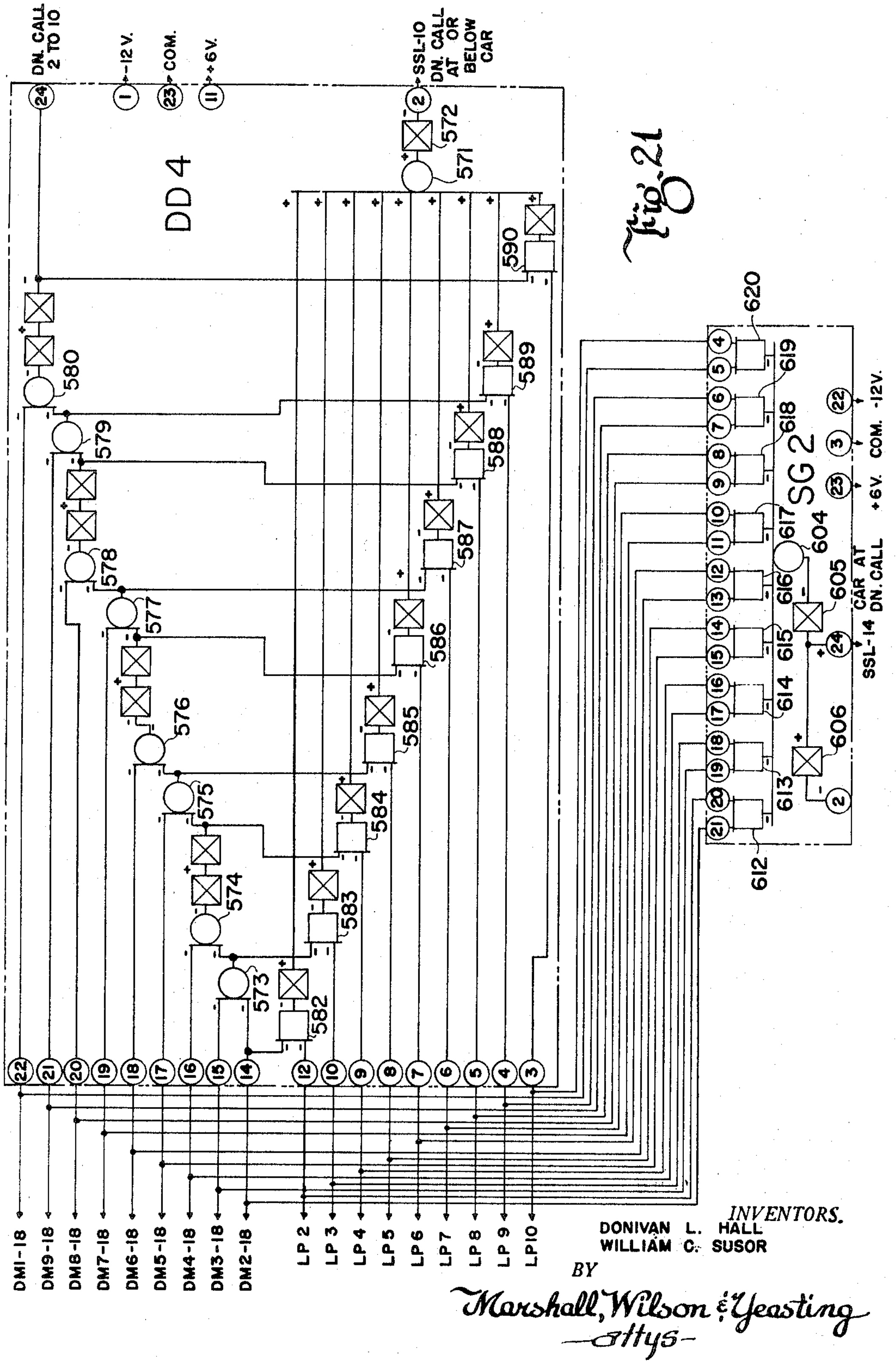
Figure 22:
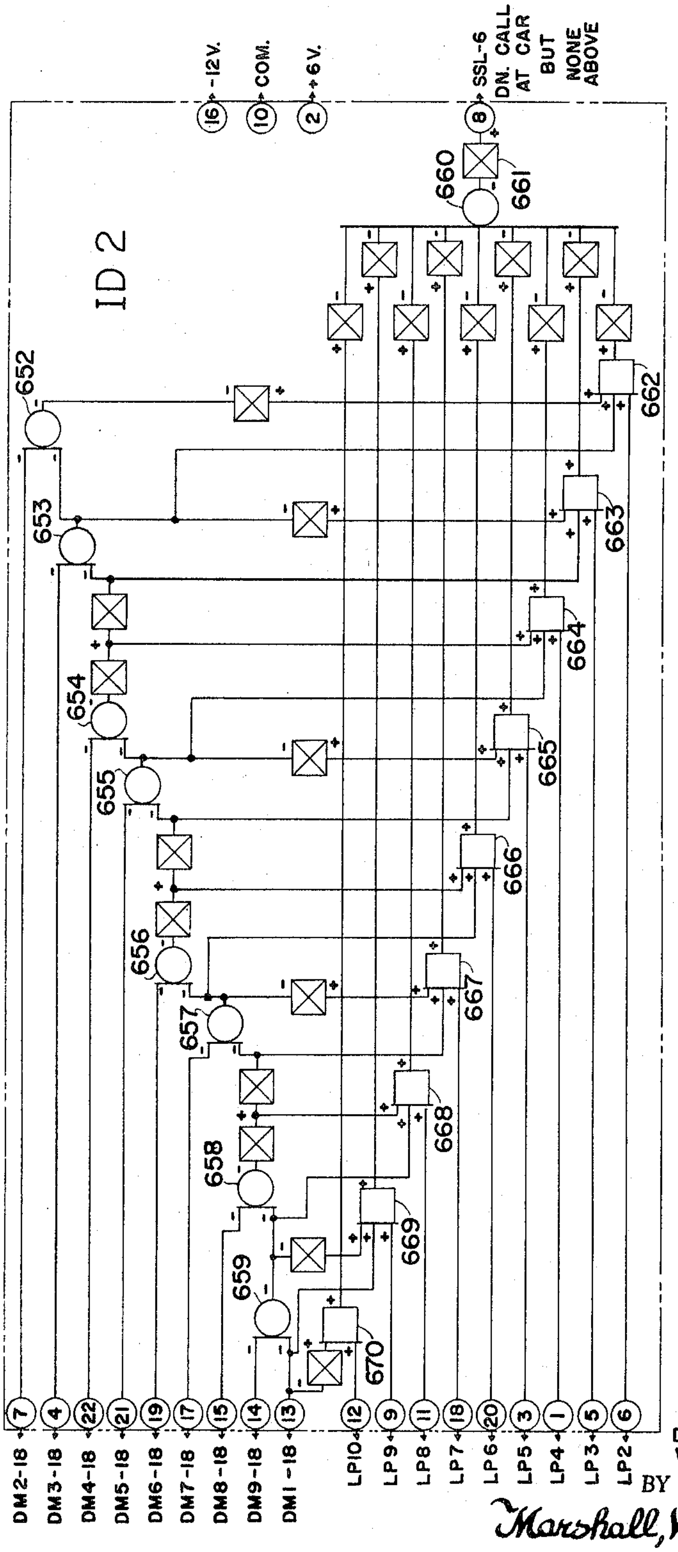
Figure 23:
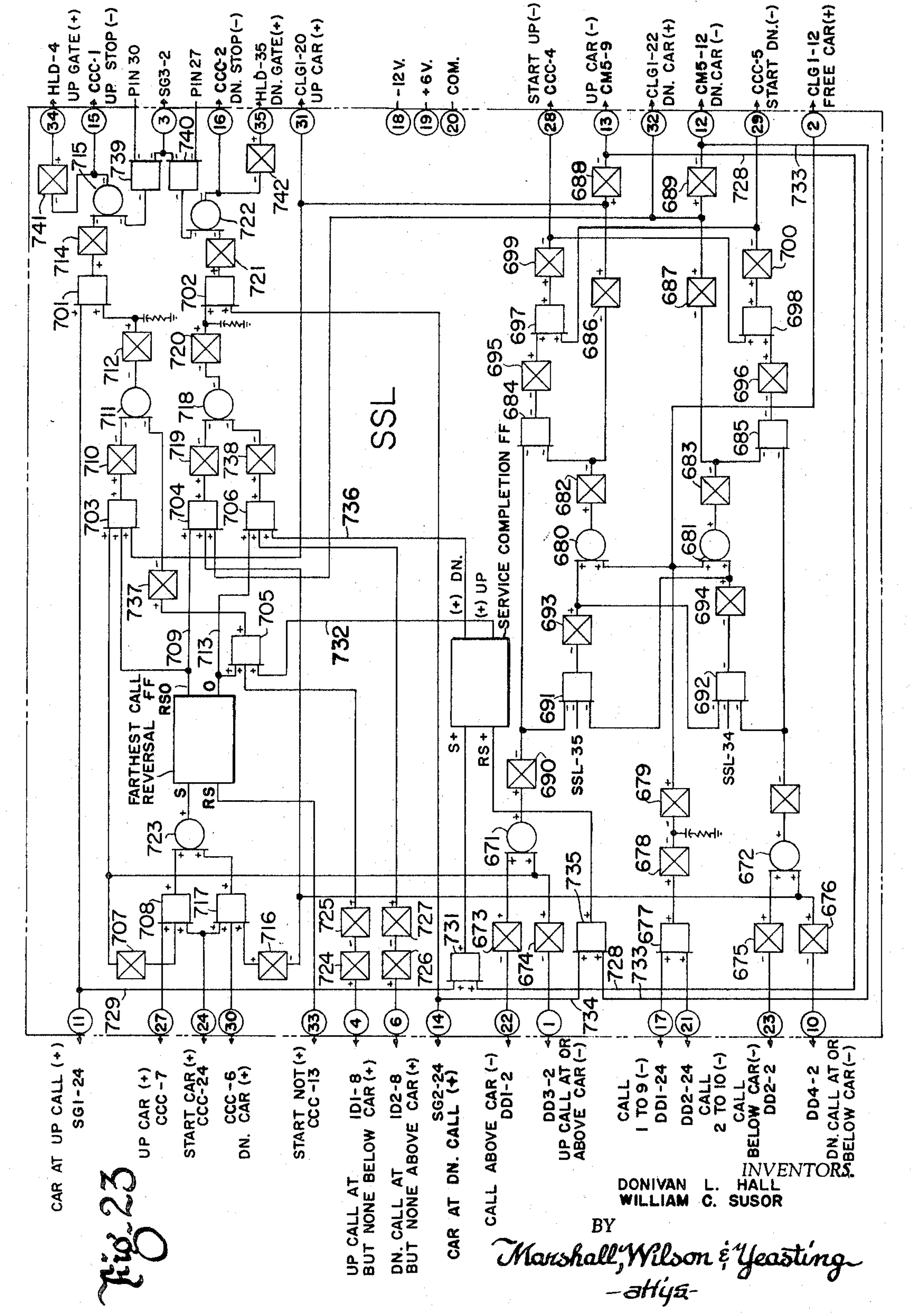
Figure 24:
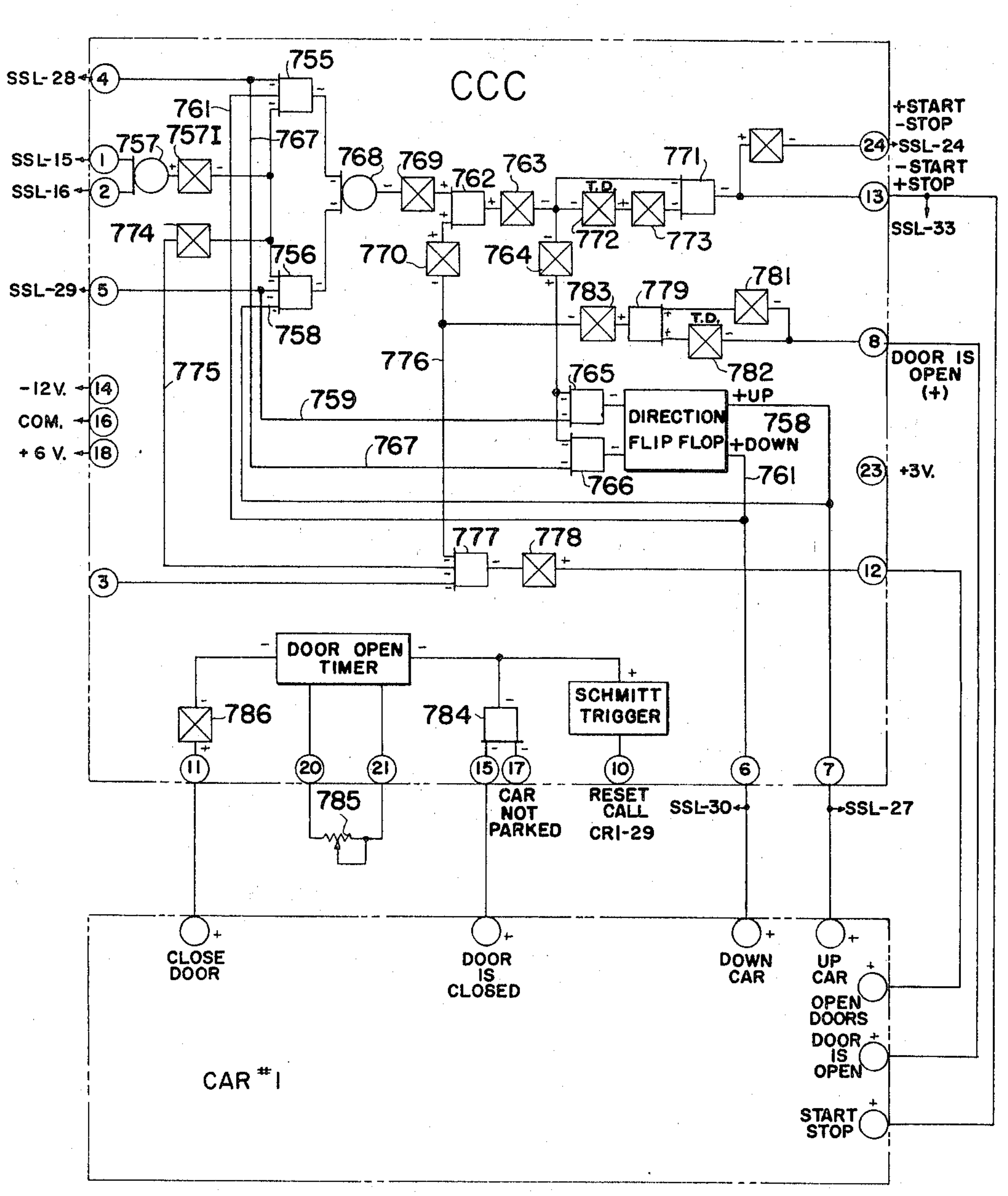
Figure 25:
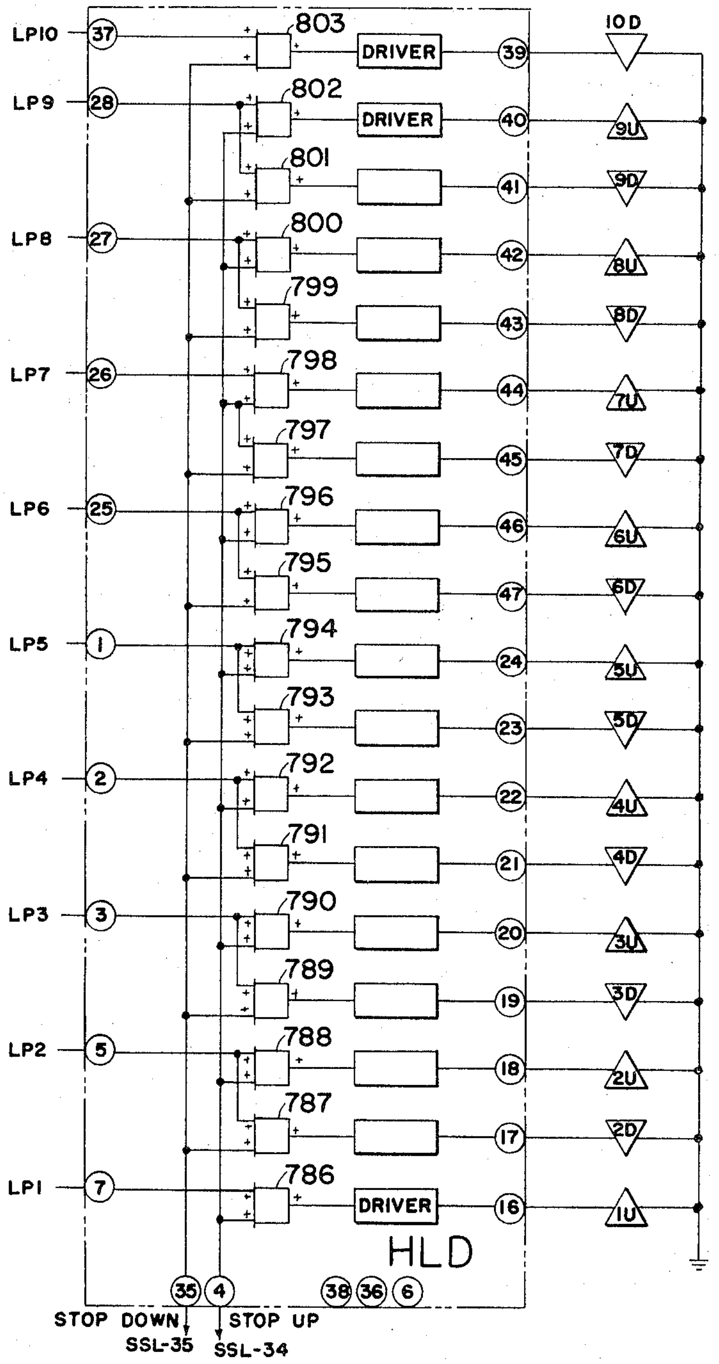

FIG. 7 is a logic diagram of a typical allotter coincidence circuit ACC1 for car 1 and block representations of corresponding controls ACC2 to ACC4 for cars 2 through 4 as shown generally in FIG. 1*b*;

FIG. 8 is a logic diagram of a portion of the total stops gating circuits for car 1 TSG1 and TSG2 typical of such circuits TSG3 to TSG8 for cars 2 to 4 as shown generally in FIG. 1*b*;

FIG. 9 is a logic diagram of another portion of the total stops gating circuits for car 1 TSG1 and TSG2 also typical of those circuits for cars 2 to 4 together with the intermediate stops gating circuit logic elements of which are shown only for car 1, and the intermediate stops counter for car 1 typical of counters for each car, all as shown in block form in FIG. 1b;

FIG. 10 is a logic diagram of that portion of the car locating and gating circuit CLG1 for car 1 and is typical of corresponding circuits for car 2 incorporated in another portion of that module and of the module CLG2 for cars 3 and 4 as represented in FIG. 1*b*;

FIG. 11 is a schematic diagram of the ramp generator employed in the embodiment of the call allotter shown in FIG. 1*b* to develop the comparison base for the several car service capability signals;

FIG. 12 is a logic diagram of the counter of free car distance, free car distance register FDR, for a typical car, the load switch and the comparator for that car, all as shown in block form in FIG. 1*b*;

FIG. 13 is a logic diagram of one typical section and block representations of the remaining sections of a car distance register gating circuit for car 1 DRG1 corresponding to such circuits DRG2 to DRG4 for cars 2 to 4 as set forth in FIG. 1*b*;

FIG. 14 is a logic diagram of the allotter gating circuit AGC and the distance counter DC of the illustrative system as shown in FIG. 1*b*;

FIG. 15 is a logic diagram of the demand memories for a typical car for the terminal landings DM1 and a typical intermediate landing DM9 together with a block representation of another typical demand memory DM2;

FIG. 16 is a logic diagram of the command memories for a typical car for a typical pair of landings COM3 and the call reset circuits for a group of five landings, 6 to 10, for car 1, CR2, and a block diagram of a call reset circuit for landings 1 to 5 for that car CR1, typical of the call reset circuits CR3 to CR8 for cars 2 to 4;

FIG. 17 is a logic diagram of the direct drive controls for starting a typical car upward to any call above the car DD1 which corresponds to circuits for each of the cars;

FIG. 18 is a logic diagram of the direct drive controls for starting a typical car downward to any call below the car DD2 which corresponds to circuits for each of the cars;

FIG. 19 is a logic diagram of the direct drive controls for starting a typical car for an up call above the car, DD3 and the stop gating circuit for stopping the car at up calls SG1 which corresponds to circuits for each of the cars;

FIG. 20 is a logic diagram of the inverse drive controls for starting a typical car downward to stop for an up call below the car ID1, which corresponds to circuits for each of the cars;

FIG. 21 is a logic diagram of the direct drive controls for starting a typical car for a down call below the car DD4 and the stop gating circuit for stopping the car at down calls SG2, which corresponds to the circuits for each of the cars;

FIG. 22 is a logic diagram of the inverse drive controls for stopping a car for a down call above the car I*d*2 typical of that for each car;

FIG. 23 is a logic diagram of the start-stop logic of a typical car;

FIG. 24 is a logic diagram of the car control circuit for a typical car providing the couplings between the system of this invention and the hoist motor controls the door controls and the safety controls of the car; and FIG. 25 is a logic diagram of the hall lantern driver circuits for a typical car.

The invention has been illustrated as applied to a ten landing structure served by four elevator cars. An up hall call switch S1U–S9U is located at each of the first through ninth landings, and a down hall call switch S2D–S10D is located at each of the second through tenth landings to enable prospective passengers to register hall calls. Each car is provided with a car call switch C1–C10 for each landing.

Individual car control can be accomplished by several means. However a preferred control is typified by that disclosed in United States patent application Ser. No. 380,385 of Donivan L. Hall et al. filed July 6, 1964 for Elevator Control wherein the elevator car is controlled by externally supplied start, direction and destination signals supplied in the present instance from the supervisory control. The car control provides the supervisory control with a signal indicating the final stop in a normal slowdown sequence for the car at all times so that when a destination signal is matched slowdown is initiated and the car follows a slowdown pattern to stop at its destination. In addition to the initiating signals interchanged between the car controls and the supervisory control there are several secondary or permissive signals interchanged as that enabling the hall latern to be lighted and that indicating the car and hall doors are closed. Thus in general the car control is maintained separate from the supervisory control and the interlinkages between those controls heretofore afforded by the various circuits commutated by the floor selector mechanism of each car are not required in the present system.

The system of the present invention can be considered in three main sections. A call finder selects a call and locates it as a base from which the assignment of that call to a car proceeds. A call allotter considers the disposition of each car in the system with respect to the call located by the call finder and assigns either the closest car within a given limit of predicted service capability or the car predicted to be most favorably disposed to the call. The car logic senses the location and service requirements of the calls assigned the car and issues start, and directional signals to the car in a manner to cause it to serve those calls. The present disclosure includes two forms of call allotter as shown in FIGS. 1*a* and 1*b* wherein the preferred form is shown in logic diagrams in FIGS. 6 through 14 and is the subject of a separate patent application for "Elevator Controls" filed in the names of Donivan L. Hall, James H. Kuzara and William C. Susor filed herewith. The car logic also includes portions which are the subject of a separate patent application for "Elevator Controls" which is particularly concerned with the relationship between calls and cars and the means of ascertaining that relationship and is filed herewith in the names of James H. Kuzara and Orvale J. Martin.

The illustrative system is of such a magnitude that its disclosure has been abbreviated where possible by showing only representative examples for those circuits which are repeated. In general the system has been constructed in circuit modules and accordingly where possible a module or a substantial portion of a module has been shown in each drawing figure. Modules have been segregated by dot-dashed enclosing lines in the drawings.

In a system of the type which will be considered below involving a plurality of similar elevator cars serving a plurality of floors at which similar functions are performed, the control circuitry follows relatively well developed patterns wherein for example the car functions for one car are duplicated for every other car and the control functions for any given floor are duplicated for every other floor with the possible exception of special landings. In view of this substantial amount of duplication and in an effort to simplify the disclosure of this invention where possible, typical circuits have been set forth in logic diagram form and where repetition of those circuits occurs, only blocks representing the circuits are depicated. Inasmuch as the interconnections of even simplified logic diagrams if presented with any degree of completeness tends to confuse rather than illustrate the salient features of the invention, such interconnections have in large part been avoided by applying terminal number designations to each one of the typical circuits set forth and the connection of those terminals to the terminals of other circuits has been indicated by reference characters characteristic of those destination terminals positioned adjacent the arrow-headed leads issuing from the illustrated terminals. Thus, as will be seen from a review of FIG. 2, a typical call memory circuit for the ninth floor designated CM9 is illustrated in logic diagram form. That circuit is provided with a number of external terminals each of which is designated by a circle containing a numeral and positioned adjacent the dot-dash line embracing the circuit and in the lead to that terminal. A similar call memory circuit is provided for floors 2 through 8 in the illustrative system and with minor revisions to accommodate terminal operations an additional circuit CM1 (not shown) provides the call memory for a down call at the top landing and an up call at the bottom landing. In order to simplify the disclosure only circuit CM9 is shown as a complete logic diagram. While some of its interconnections to external circuits are illustrated, the majority of the connections from its terminals are indicated by the designation of terminals on other circuits. Thus, for example, terminal 3 on circuit CM9 is connected to terminal 3 on circuit CM8. This is signified by the reference character CM8–3 adjacent the arrow-headed lead issuing from terminal 3 of circuit CM9.

In the case of the additional call memory circuits represented by rectangles, the external terminals are illustrated and numbered in accordance with the same system utilized for the call memory CM9. Thus following through the illustration by reference to the terminal 3 of circuit CM8, it will be noted that this is interconnected to terminal 3 of both CM9 and CM7 as indicated by the reference characters CM9–3 and CM7–3 adjacent the circled 3 representing the terminal.

Intercoupling of the modules of the present drawings has followed a uniform nomenclature wherein each module has a letter designation and each terminal of each module is numbered. On the drawings the terminals are shown as circles with their numeric designations within the circle. The modules have been designated on the drawings by their reference characters. Couplings from the terminals are indicated by designation of the module and terminal number to which a terminal is connected located adjacent an arrow-headed lead extending from the terminal. These designations are by the reference character of the module followed by a dash and the terminal number of that module.

In order to further facilitate an appreciation of this invention, the reference characters utilized to identify the major circuit components have been tabulated in alphabetical order together with a short functional name for those circuits and the figure in which those circuits are found.

Figure 2:
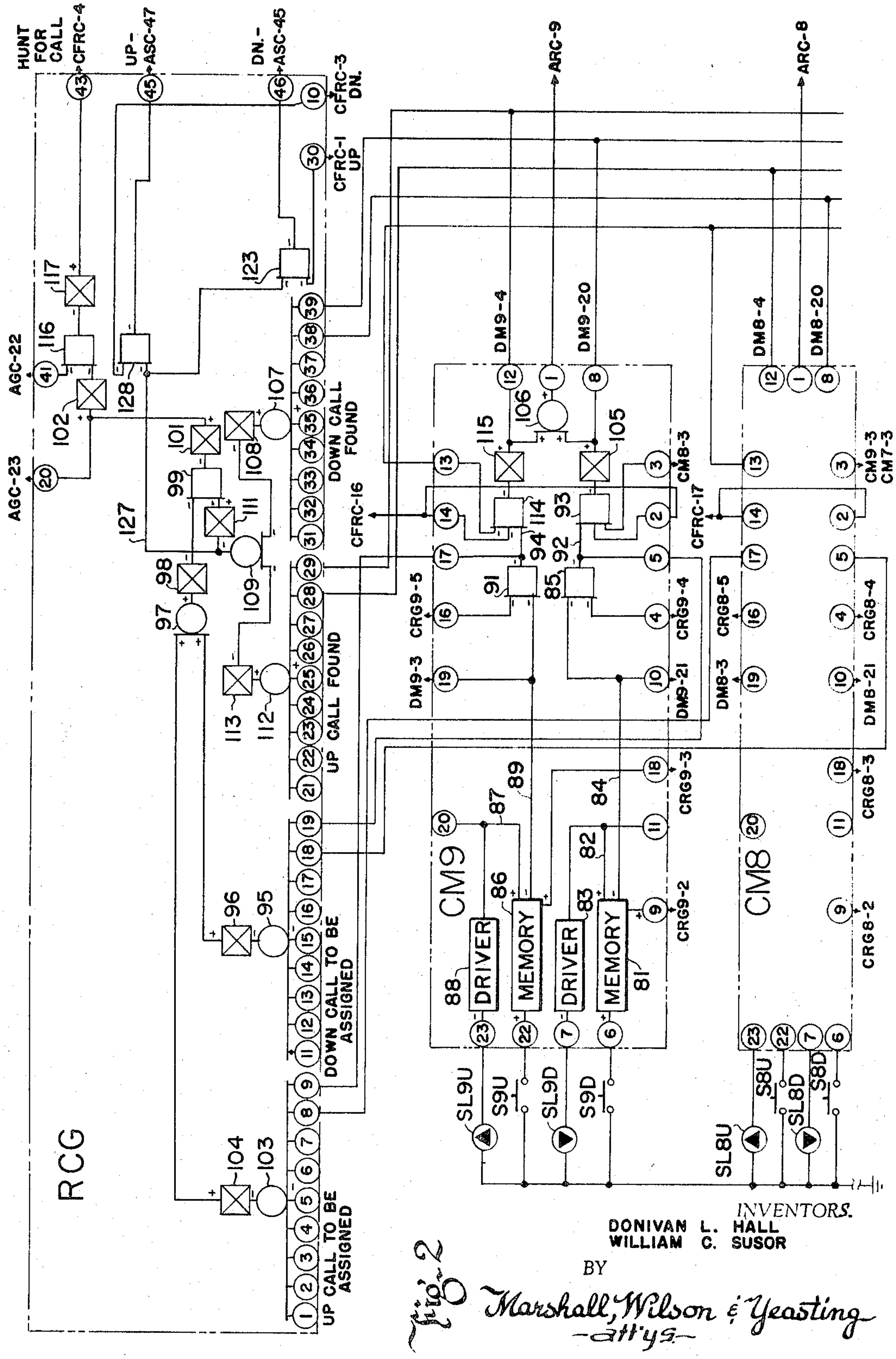
FIG. 2 is a logic diagram of typical call memories for the eighth and ninth landings, CM8 and CM9, and of the call finder ring counter gating circuit RCG typical of this invention.
Figure 3:
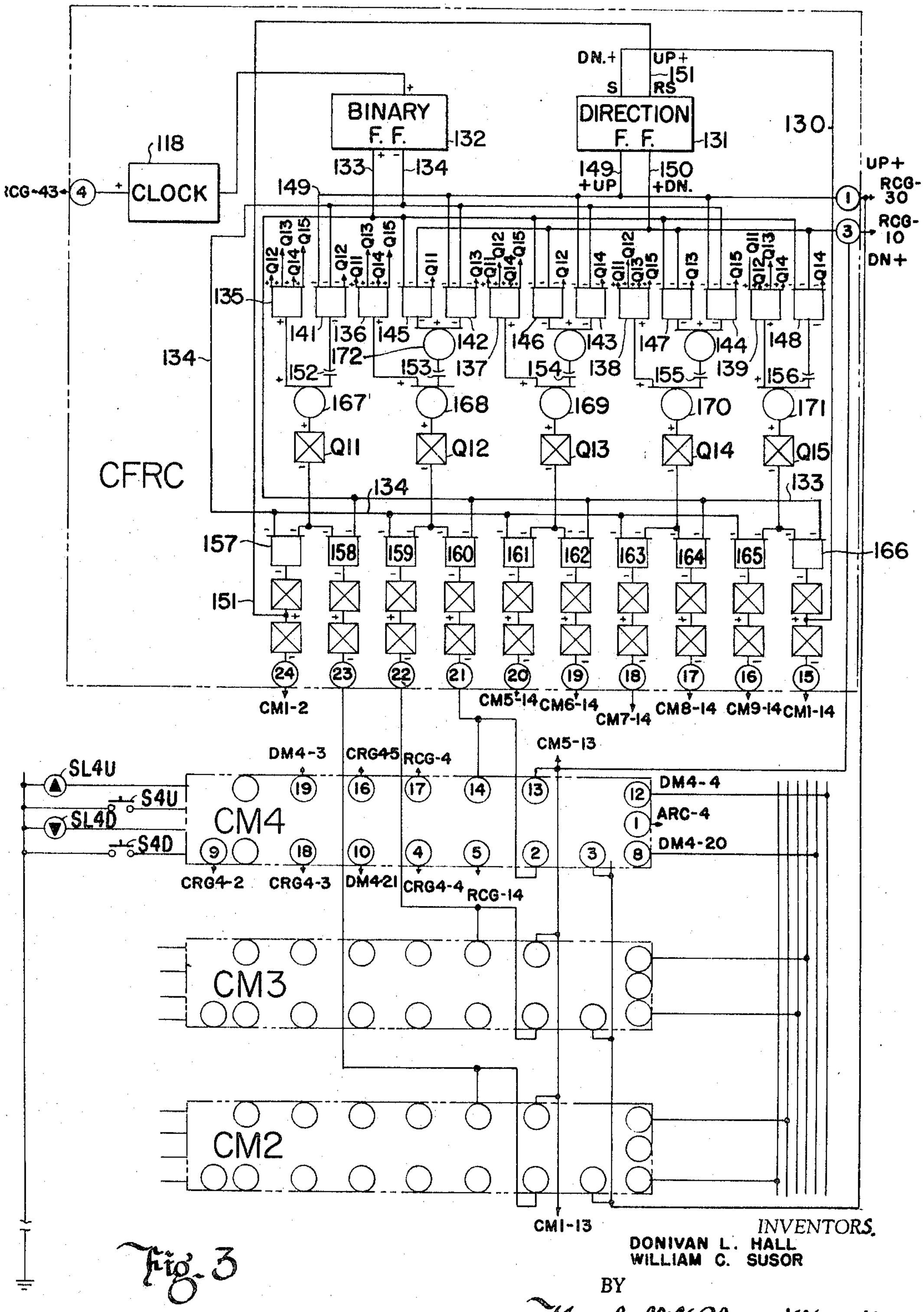
FIG. 3 is a logic diagram of a call finder ring counter typical of that utilized for this invention together with block representations of call memories.
Figure 4:
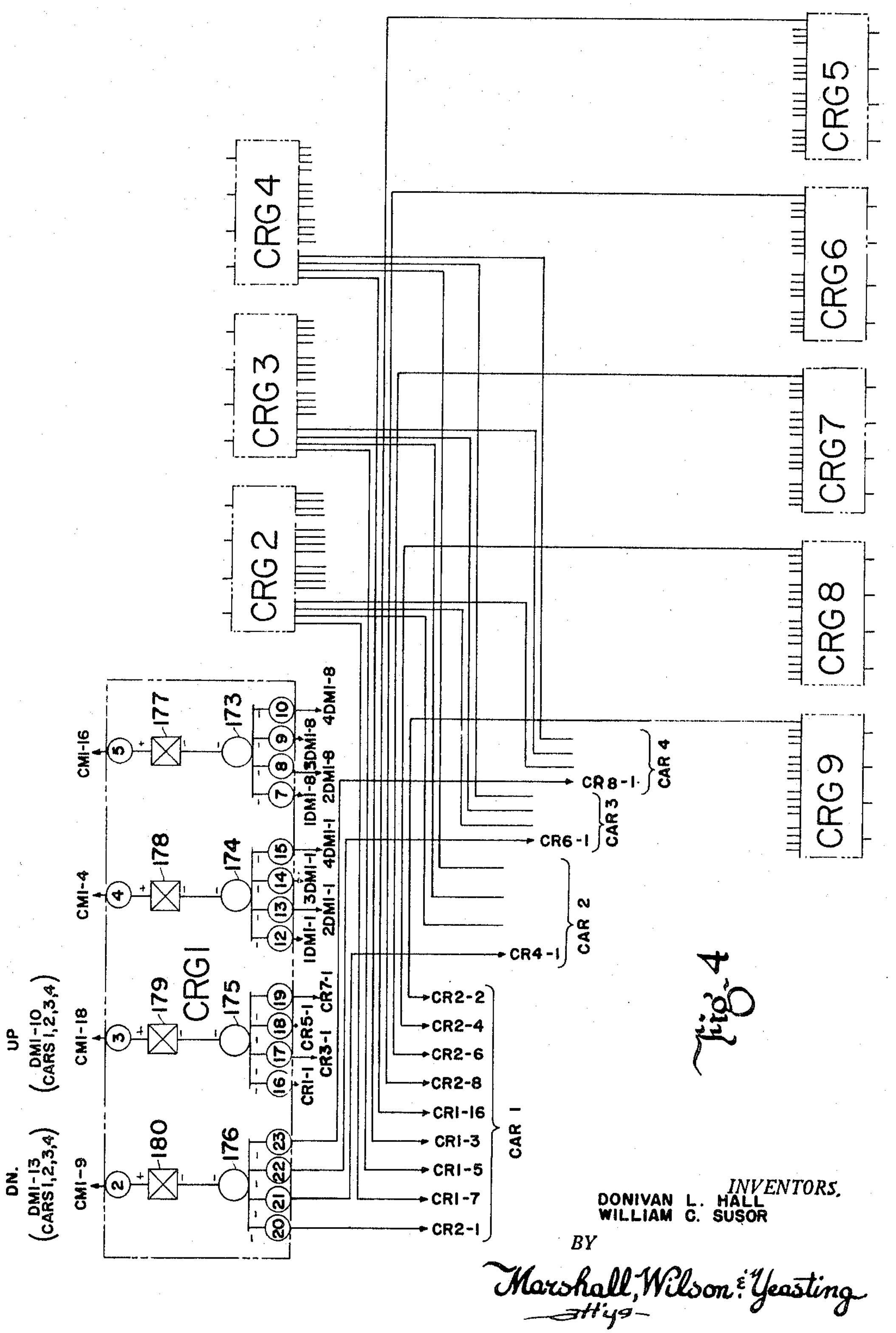
FIG. 4 is a logic diagram of the call reset gating for the terminal landings CRG1 represented as typical of the call reset gating CRG2 to CRG9 for every other landing of the elevator system as shown in block form.
Figure 5:
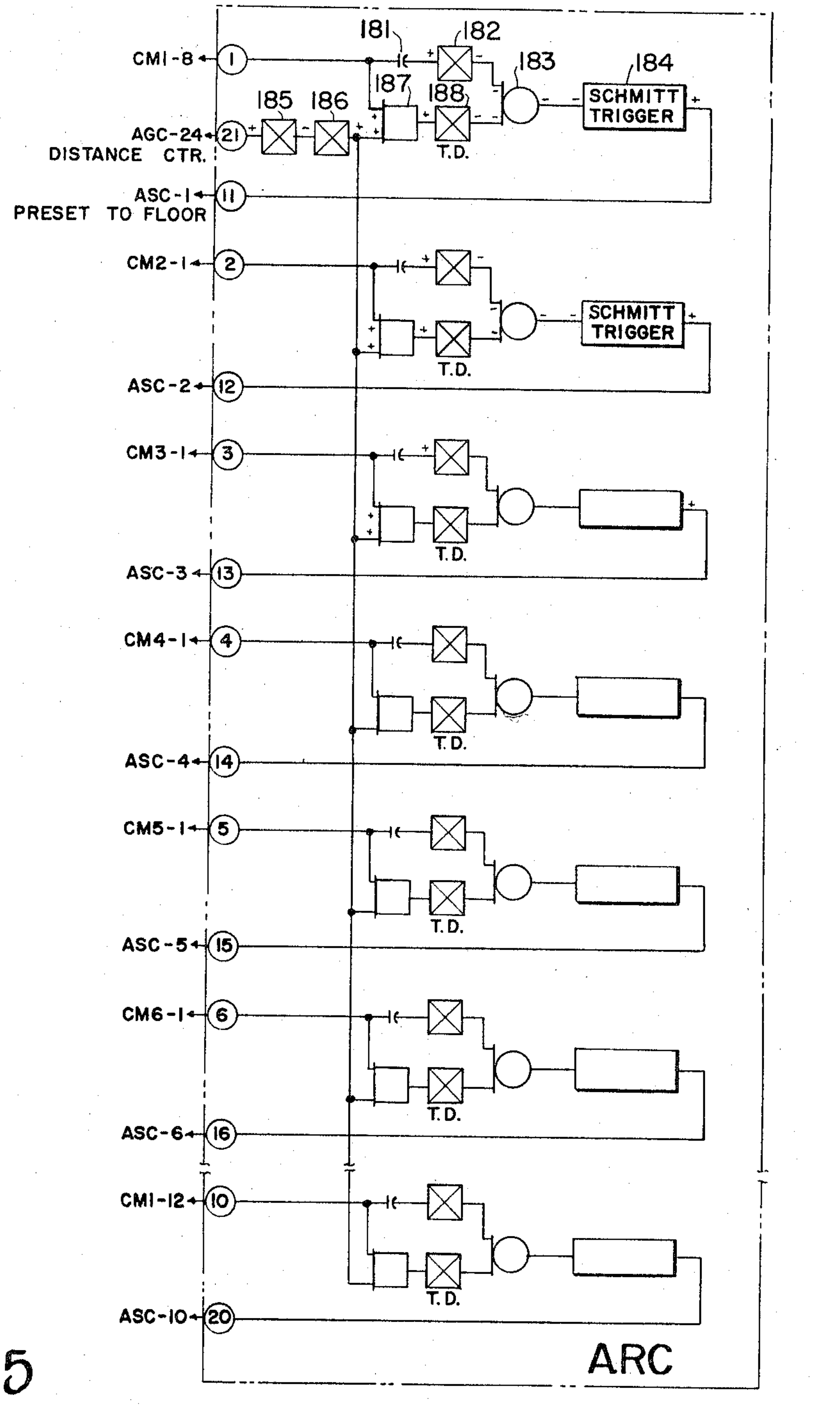
FIG. 5 is a logic diagram of an allotter rescan circuit typical of this invention.
Figure 6:
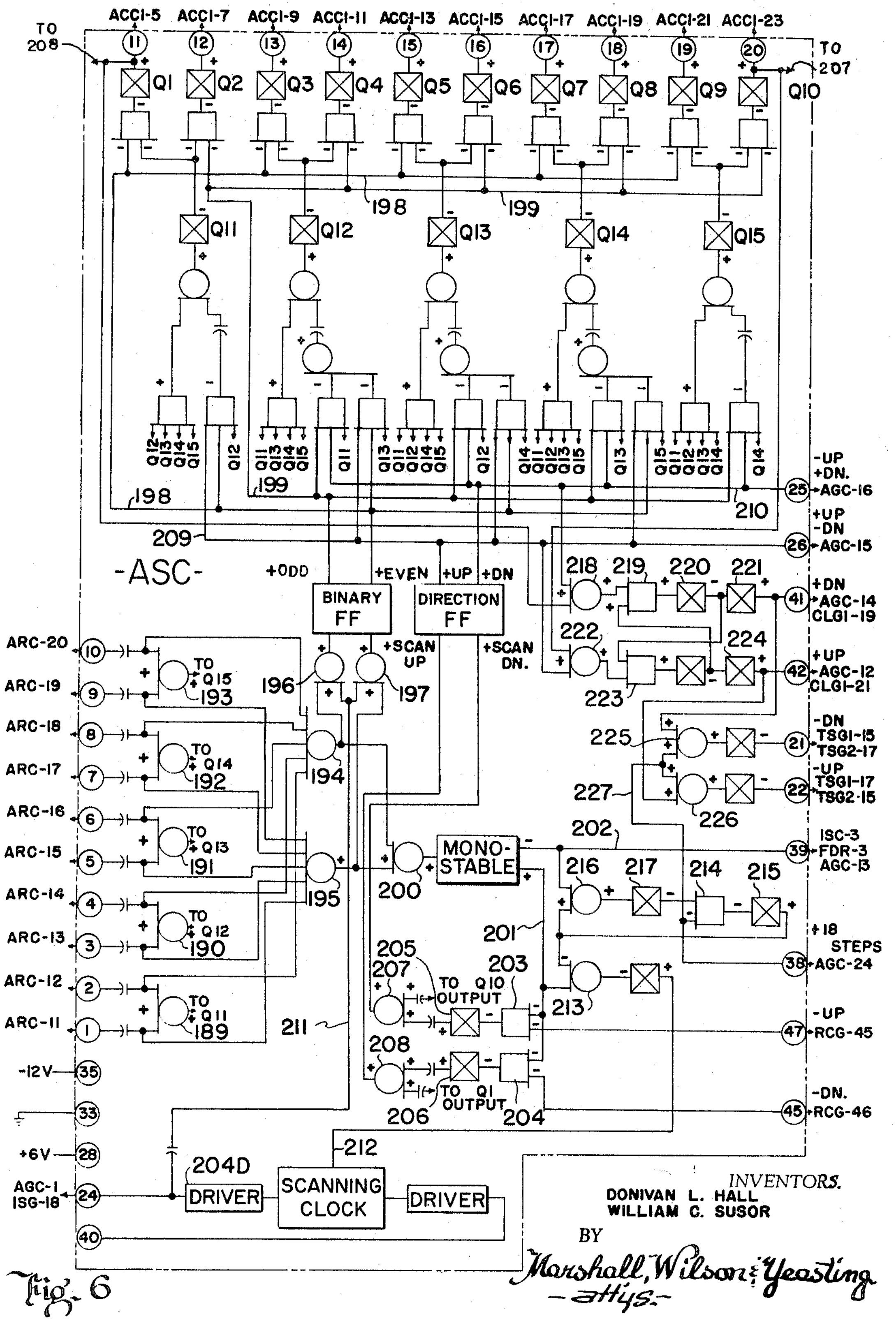
FIG. 6 is a logic diagram of one form of allotter scanner circuit suitable for this invention and constituting a more detailed disclosure of the "Scanner" of FIG. 1*b*.

| Symbol | Functional Name | Location |
|---|---|---|
| ACC1–ACC4 | Allotter Coincidence Circuit Cars 1–4. | Fig. 7 |
| AGC | Allotter Gating Circuit | Fig. 14 |
| ARC | Allotter Rescan Circuit | Fig. 5 |
| ASC | Allotter Scanning Circuit | Fig. 6 |
| CCC | Car Control Circuit | Fig. 24 |
| CFRC | Call Finder Ring Counter | Fig. 3 |
| CLG1 | Car Location and Gating Circuit, Cars 1 and 2. | Fig. 10 |
| CLG2 | Car Locating and Gating Circuit, Cars 3 and 4. | |
| CM1 | Call Memory, 1st Up and 10th Down | (Not shown) |
| CM2–CM9 | Call Memory, 2nd to 9th | Figs. 2 and 3 |
| COM1–COM5 | Command Memory, 1st to 10th | Fig. 16 |
| CR1–CR8 | Call Reset, Cars 1 to 4 | Fig. 16 |
| CRG1 | Call Reset Gating, 1st Up and 10th Down. | Fig. 4 |
| CRG2–CRG9 | Call Reset Gating, 2nd to 9th | Fig. 4 |
| DC | Distance Counter | Fig. 14 |
| DD1 | Direct Drive Up | Fig. 17 |
| DD2 | Direct Drive Down | Fig. 18 |
| DD3 | Direct Drive-Stop Up | Fig. 19 |
| DD4 | Direct Drive-Stop Down | Fig. 21 |
| DM1 | Demand Memory, 1st Up and 10th Down. | Fig. 15 |
| DM2–DM9 | Demand Memory, 2nd to 9th | Fig. 15 |
| DRG1–DRG4 | Car Distance Register Gating, Cars 1–4. | Fig. 13 |
| FDR | Free Car Distance Register | Fig. 12 |
| HLD | Hall Lantern Driver | Fig. 25 |
| ID1 | Inverse Drive-Stop Up | Fig. 20 |
| ID2 | Inverse Drive-Stop Down | Fig. 22 |
| ISC | Intermediate Stops Circuit, Cars 1–4 | Fig. 9 |
| ISG | Intermediate Stops Gating, Cars 1–4 | Fig. 9 |
| ISG | Ramp Generator in ISG | Fig. 11 |
| RCG | Ring Counter Gating | Fig. 2 |
| SG1 | Stop Gating—Up | Fig. 19 |
| SG2 | Stop Gating—Down | Fig. 21 |
| SSL | Start-Stop Logic | Fig. 23 |
| TSG1–TSG8 | Total Stops Gating, Cars 1–4 | Figs. 8 and 9 |

Inasmuch as logic elements such as flip flops, coincidence gates, anti-coincidence gates and inverters are available in many forms and are well known in the art, the structures of such elements for AND's, OR's, NOR's, MEMORY's and operational amplifiers have not been set forth in detail and the invention's circuits have been represented as logic diagrams rather than schematics.

While the functions of these elements can be accomplished in large part with electromagnetic switching, it is considered too slow for practical application wherein the entire call finding and allotting function is to be performed for a call in a matter of milliseconds. Accordingly, the system illustrated here employed solid state switching and logic elements.

*Description of FIGURE 1*

As depicted in FIGURE 1, the system of this invention involves three major elements common to all of the cars represented by a call memory 31, a call finder-selector 32 and a call allotter 33. The exemplary system made up of four cars is illustrated in FIGURE 1 by car logic function groups for cars 1 and 2 broken down in functional block diagrams and for cars 3 and 4 represented by the general blocks wherein cars 1–4 are identified by blocks 34, 35, 36, and 37. The typical car logic functions for car 1 are illustrated within the major car block 34 and comprise the car itself 38 including its hoisting mechanism and the means for generating a car position signal, a door control for the car 39, and hall lanterns 41 for the car indicating the proximity of the car to a landing and its condition to both stop at that landing and to travel therefrom in a given direction. Each of the door control, car and hall lantern control blocks are coupled both to supply to and receive signals from a car logic control 42 which determines the starting, stopping and travel direction of the car in serving its assigned service requirements. Those requirements are supplied from a demand register 43 which indicates the landings at which the car will stop in response to assigned hall calls and a command memory 44 which retains the registration of the car calls registered within the control panel within the car represented by the block 45. Certain of the control functions as will be more fully understood hereinafter are provided by a load sensing means 46 for the car which can indicate the car loading in terms of either the number of passengers within the car or the weight of the load within the car, for example.

Service requirements are imposed upon the system by the means of hall call switches represented by the rectangle 47 and by car calls from the rectangle 45. Car calls are registered by conventional means within the car as displayed on control panels therein and are applied directly as represented on the path 49, to the command memory 44 for the respective car. In order to distinguish the response of a car to a car call from that response to a hall call, it will be convenient to consider a registered car call as a "command" inasmuch as the car must respond to such calls in order to clear them from the system and no other car can serve such calls. The hall calls are distributed among the cars by the call allotter 33 and as assigned by the allotter are termed "demands." Accordingly once a car call has been registered, it is entered into a command memory and held there until it is cancelled by the response of the car to that call. The signals in command memory 44 are applied as over the path 51 to the car logic control 42 which in turn develops the direction, start and stop signals over path 52 to the hoist motor controls of the car represented by rectangle 38. The car logic control also develops the start, stop signal to the door control 39 over the path 53 and at appropriate moments in the operation of the car and preceding its arrival at the landing for which the call is registered, it issues a stopping position signal over path 54 to the hall lantern controls 41, over path 53 for door control 39, and over path 52 for the retardation of the hoist motor.

Operation of the car 38 causes a car position signal to be issued to the car logic control 42 over the path 66. As the car advances along the hatchway it comes to close proximity to a landing. It enters a region commonly termed a door zone and a door zone signal is issued over the path 67 from car 38 to door control 39. The door control 39 in turn issues door close and open signals to the car logic control over the path 68 at appropriate points in the operating cycle of the car. In the particular example under consideration here, the closing of the car doors after the response of the car to either a demand or command causes the cancellation of that demand or command by issuing a reset signal from the car logic control 42 over the path 69. However, alternative call reset techniques can be employed such as the stop of the car, the opening of the doors or the initiation of door closing after stop.

A demand memory reset signal is passed over the path 71 to the demand register 43 and over the path 72 to the command memory 44. Storage of the hall call signal in the call memory 31 is also canceled at this time by a reset signal over the branch 73 from path 69.

When conditions arise which indicate that a car is unduly delayed in serving the demands and commands imposed upon it, the demands can be released and the hall calls from which they matured reassigned as demands on other cars. Two sources of an indication of such delayed service are shown. When the car is loaded in excess of some predetermined level, stops in response to demands would be unfruitful inasmuch as no room would be available in the car to transport the passengers waiting at the landings. On the other hand, where a demand and a command exist for the same floor, it is to be presumed that the stop of the car for the command will result in the discharge of at least one passenger and accordingly the creation of room for the acceptance of at least one passenger from the landing. Accordingly, when the load sensing control 46 develops a signal characteristic of a predetermined loading, a reallocation signal is issued over the path 74 to the demand register 43 whereby those demands which do not coincide with commands for the car are released. Similarly, when other factors delaying the car service develop, as sensed in the car logic controls, for example when the doors of a car are held open unduly at a landing, a delayed service signal is issued from car logic control 42 over path 75 to the demand register 43 to cancel the demands which do not coincide with commands. A further example of an undue delay is that occurring when a hall call is registered an excessive interval. A call timer 76 times the interval each call is retained in call memory 31. When the interval of registration exceeds a certain amount, a signal is issued on path 77 to remove the assigned call from its demand register and the timer 76 is reset or negated for further intervals for that call. The cancellation of the demands in the demand register corresponds to the registration of an unassigned hall call inasmuch as the hall call from which the demand was developed, remains registered in the call memory 31 until a car has responded to that call by satisfying its demand. Accordingly, upon release by the demand register, the call again is fed to the call finder selector and from the call finder selector to the call allotter for reallottment to the cars in accordance with their ability to satisfy the calls.

In the detailed consideration of the system which follows, it will be recognized that the supervisory control receives inputs from hall landing push buttons, car floor destination push buttons, car position signals and car loading controls. Outputs from the supervisory system are the start up or start down signals for each car, the stop signal for each car and the door control signals. Output signals to the hall push button indicator lights and hall lanterns are also provided. The car position signal comes from the car control which can be of conventional form or of the form shown in United States patent application Ser. No. 380,385 filed July 6, 1964 for Elevator Control in the name of Donivan L. Hall et al. The start up, start down and stop signals go to the aforenoted car control system.

The switches for registering hall calls represented by the rectangle 47 include up and down call switches for each landing but the terminal landings in the usual elevator system and an up call switch at the lower terminal landing and a down call switch at the upper terminal landing.

Once a hall call is registered, it is retained in registration by means of call memory 31 until it has been served. A call entered in the call memory, according to the present invention, is assigned to but one of the cars available in service, by means of the call allotter 33 through the intermediate function of the call finder selector which segregates calls within the memory in a serial relationship for assignment. Each call registration is entered into the call finder selector over path 56 in which it is serially selected for consideration by the call allotter and is transmitted to the call allotter as a signal indicating the location of the call and its required direction for service over path 57.

The call allotter ascertains the relationship of active cars in the system relative to the selected call and assigns a car which is suitably related to the selected call for expeditiously serving that call.

Registration of a call for service from a landing by a prospective passenger is made on a directionally selective basis by means of landing call buttons. Such calls are stored in call memories such as CM9 of FIG. 2 until they have been cancelled by the response of a car stopping at the landing of the call and conditioned to depart therefrom in the direction of the call. Since landing calls are imposed in a random fashion and since they can be satisfied by any number of cars, those calls entered into call memories are allotted individually to the cars. The call finder of FIGS. 2 and 3 comprising the ring counter gating circuit RCG of FIG. 2 and the call finder ring counter CFRC of FIG. 3 serializes the landing calls for their disposition to the several cars by the allotter.

The stored landing calls in the call memories CM1 to CM9, when not allotted, actuate the call finder ring counter CFRC to cause it to step from landing position to landing position until it encounters a position for which a call to be allotted is registered. Thus, the call finder ring counter starts from the position of its previously found call and advances to the next call having a direction of service corresponding to the direction of advance. If the activated call memory coincides with the setting of the call finder ring counter, no advance of the counter occurs. When the ring counter CFRC reaches its limit of positions, the first and tenth positions in a ten landing elevator system, it reverses its direction of advance. If advancing in the direct sequence, one to ten, when the counter reaches ten it enters inverse sequence, ten to one. From the inverse sequence it is switched to the direct sequence after it has reached its first position.

The ring counter gating circuits RCG respond to an activated call memory for an unallotted call to start the call finder ring counter CFRC in the event it is not set at the position of the call. It also stops the counter CFRC when the call memory has been found. The gating circuits RCG set the scanning direction of the allotter scanner ASC so that the allotter scanner initially hunts downward from its position preset by the found call memory when the call is an up landing call and upward when it is a down landing call.

The allotting process involves predicting for each car the service capability of that car relative to the selected call assigning the selected call to that car which is either closest and has an acceptable service capability or is conditioned most favorable to serve the call. Call assignment is transmitted from the allotter path 63 to the demand register 43. Once demand register 43 receives the allotment of the call, it issues a signal on path 64 to release the call finder selector 32.

As in the case of the command memory, the demand register section of the car control issues signals over path 65 to the car logic control to indicate the location and direction of the demand whereby the car logic control can institute appropriate car starting and direction setting functions for the car control 38 over path 52. Two forms of an allotter have been illustrated. In one the cars are considered serially. In the other they are considered broadside. The one establishes certain criteria for each car, imposes a first preferred limit on the criteria and interrogates each car to ascertain if it falls within acceptable limits. The sequencing of the cars for interrogation is established in the order of spacing of the cars from the call so that the car which is closest to the call is the first interrogated, the next closest is the next interrogated and so on. If no car is encountered which has criteria within limits, those limits are relaxed and a new interrogation cycle is initiated. Thus the allotter develops an assignment between the selected call and that car closest to the call and having an acceptable service capability with respect to the call as established by the criteria limit.

The second and preferred form of allotter compares the service capability of all cars and selects the car with the optimum capability. It does this by generating electrical signals for each criterion for each car, summing the signals for the criteria for each car, considering all summed signals simultaneously and selecting the car with the most favorable signal for assignment to the selected call. In ascertaining the service capability it also considers the separation of the cars from the call, the calls which the car is assigned, the loading of the car and the absence of all call assignments to the car.

*Description of FIG. 1a*

The allotter of FIG. 1*a* is responsive to the selection of a registered landing call for assignment by the call finder 32 through the application of a suitable preset signal therefrom over path 57. It responds to signals from the command memory 44 of each car over path 61, from the demand memory 43 of each car over path 62, from the load sensing means 46 for each car over path 59, and from the car logic and control 42 over path 58. It issues assignment signals on lead 63 to the demand memories 43 of that car closest to the call and within the acceptable limits of service capability.

It utilizes and develops these signals in a combination including a scanner which is preset by the signals on path 57 from the call finder to initiate its scan from the location of the selected call and to scan in a direction opposed to the service direction of the selected call. The scanner can be either a bidirectional counter having a scan position for each landing which can be related to scan direction to distinguish between ascending and descending service directions for the cars or it can be a ring counter having scan positions corresponding to each landing call which close upon themselves as, for a ten landing elevator system, in an ascending sequence 1 through 10 followed by a descending sequence 9 through 2 and back to 1. In this latter arrangement the scanner can always scan in a direction opposed to the sequences recited, that is downward for the ascending sequence and upward for the descending sequence. The preset of the scanner to the position of the landing as 8 or "8 up" for a selected "8 up" landing call is coupled with a scan set in the descending sequence of 7 or "7 up," 6 or "6 up" etc. so that a scan position is sensed for each potential stop between the selected call and a car approaching the call.

These scan positions are passed to an allotter coincidence circuit which senses coincidence between scan position and car position for all cars. This circuit is fed from the car position and service direction signal sources for each car. The car logic and control equipment can be considered to provide the information to the car position and service direction circuits over path 58 of FIG. 1 so that a coincidence between the allotter scan and car position and direction can be sensed. In the example if car #2 is an "up car" at landing 6 after two scan steps coincidence is achieved at position "6" direction "up" (scan direction down) or at "6 up," depending on the type scanner.

Upon establishing a scan position-car position coincidence a signal is passed to a select control circuit. If the selected car of the coincidence is in service, that is if it is not on "individual service," "inspection," "out of service," "parking" or the like, and if it is the only car in coincidence then its load evaluating control is made effective so that the service burden for the car can be predicted. The select control circuit initially stops the advance of the scanner when an in service car is coincident with the scan and to be evaluated. This stop signal is passed to a gate control for the scanner advance which is enabled by the selection of a call on lead 57 and the absence of a coincident car signal from the select control circuit. This gate after stopping scan advance releases the inhibit when the load evaluating control for the car is effective whereby controls between the gate and the load evaluating control become effective to control the allotter scan advance.

The select control circuit includes means to avoid the actuation of the load evaluating control of two cars where two cars are located at the landing and traveling in the service direction so that both actuate the scan position-car position coincidence circuit. This involves a "no two interlock" wherein the first car to be selected in the control circuit locks out the second or any other cars which are also coincident.

The load evaluating control of each car receives information indicative of the service requirements imposed upon that car as signals from the car's command and demand memories, load sensing means and car service direction controls. In the load evaluating control an acceptance or rejection of the car assignment to the call is made on the basis of ascertaining if the car's currently imposed service requirements are within predetermined limits. These limits are set by a programmer which alters the limits where repetitive cycles of consideration of a car's availability are required. For example, the load summing circuit can be set at a first preferred limit in which an in service car will be assigned if it is loaded below a given level as ascertained by load sensing means 46 and indicated over path 59 to the load summing circuit, and if it has been assigned no more than three calls as indicated by the number of command memories 44 and demand memories 43 activated to pass signals over paths 61 and 62 respectively to the load evaluating control.

If the first car selected by the select control circuit is indicated to have an acceptable service requirement by its load evaluating control then it is considered to be capable of responding to the call within a time interval determined by the load summing criteria of the first preference level. This predicted ability to respond is the acceptable level for assignment and therefore a signal is issued over path 63 to the demand memories for that car. This signal enables the demand memories so that that memory corresponding to the selected call which initiated the allotter operation is gated to admit the call into memory and to release the call finder and allotter for further assignments.

If the load summing circuit of the selected car indicates a service burden outside the limits dictated by the programmer, as where more than three calls are assigned the car or its load excess the predetermined acceptable limit a "no go" signal is issued by the load summing circuit. If another car is also positioned coincident with the scan position, upon rejection of the first car, that car's load evaluating control is enabled to ascertain if its assigned calls and loading fall within the first preferred limits. If the car is within limits, it is assigned the call through its demand memory and the call finder and allotter are released as described. If not, a "no go" signal is issued.

A "no go" signal from the load summing circuit of the last car to be considered at a given position removes the inhibit on the gate to the allotter scanner so that the scanner advances in the direction originally established by the call finder until it encounters another "in service" car.

The select control circuit, in response to the scan position-car position coincidence of this new car enables the car's load evaluating control and inhibits further advance of the allotter scanner at its gate. The load evaluating control ascertains the capability of the car to serve by measuring its service requirements against the first preferred limits established by the programmer and issues either an acceptance or rejection of the car for asignment to the call as described. If the car is assigned, the call finder and allotter are released and its demand memory for the selected call actuated. If the car is rejected the scanner inhibit is released and additional cars are hunted.

Coincidence in the scanning process is sought between a scan position which has been advanced ahead of the call and a car which is approaching the call. Thus, when an up call is registered the scan is of landings below the call and coincidence is sought with cars having an up service direction located below the call. Once the up cars at landings below the call have been scanned the next closest cars are those set for down service as viewed from the bottom of the range of travel. Thus, the scan proceeds to the lowest down car by scanning from the lowest landing upward while hunting down cars. When coincidence between their position and scan position is established, such cars are considered for assignment if their service requirements are within the programmer defined limits. If no such cars are found, the scan is again reversed at the upper limit and proceeds downward looking for ascending cars which when found are evaluated for assignment. It is to be noted that the car service direction to which the coincidence control responds is opposed to the scanner advance direction. Thus, while the scanner advances in an ascending sequence of landing positions coincidence is sensed in the scan position-car position coincidence control for cars set for down service. Cars set for up service establish coincidence when encountered by a scan in a descending order of landings.

As the allotter scanner completes a scan cycle without establishing an assignment between a car and the selected call, it actuates the programmer through a count around control. The programmer then alters the acceptance level of service capability so that a different set of criteria are applied in determining if a car has an acceptable service capability. In one embodiment the second preference level established by the programmer is to assign any "free car." A "free car" is one which has no commands or demands assigned but is otherwise available for service. Where any free car can be assigned, a "no two interlock" is included in the controls of the programmer so that only the first "free car" is assigned and any other "free cars" are locked out of assignment. Such assignment results in the release of the call finder and allotter for processing further calls.

If no "free car" is available a looser set of service capability criteria are established and applied to each car in the order of their spacing from the selected call. Thus the scanner again advances to coincidence with the closest car, and the load evaluating control for that car applies the newly established service capability limits to either assign the car to the call or reject the car and advance the scanner to the car next most proximate the selected call. In turn each car is subject to the interrogation of its service capability to ascertaining if it is within acceptable limits until a car is assigned. In the llustrative example the third service capability limit is a car traveling toward the call with less than a capacity load. The closest car having these criteria is assigned to the call.

Each actuation of the count around circuit sets a new limit of service capability. While there might be any number of limits the present example established but three and then recycled to the first. An alternative has been to terminate the operation of the allotter when the lowest limit was applied to each car without finding an acceptable car. Upon such termination the call finder is again actuated to select another call for processing by the allotter.

*Description of FIG. 1b*

The allotter of FIG. 1*b* is shown in more detail in FIGS. 5 through 14. It also assigns a car to a call selected by the call finder in response to a signal issued on path 57. In developing the assignment it enables all demand memories of the selected car on path 63 so that the memory for the landing and service direction of the selected call is actuated. It responds to inputs including car position and service direction on path 58, car loading on path 59, commands assigned the car on path 61 and demands assigned the car on path 62 for each car.

This embodiment of an allotter considers all cars simultaneously in broadside fashion and selects the car having the optimum service capability with respect to the selected call to serve that call. In ascertaining the optimum car it effectively predicts the ability of each car to travel to the call expeditiously by considering its distance from the call, the number of stops for demands and commands between its current position and the call, and the load imposed on the car. It further provides some measure of the service capability of each car following the stop at the call by also considering the total number of stops as indicated by the total number of demands and commands assigned each car. In equating these factors to predicted service time a system including cars operating at 600 feet per minute and serving ten foot floor heights is arranged to allow one second per floor of travel as ascertained in the distance registers. Such a system would require about twelve seconds to slow from full speed to a stop, open its doors, serve a call, close its doors, and accelerate to full speed. Each stop is scaled to six seconds in the total stop gating circuit. Each intermediate stop is additionally scaled to six seconds. Each passenger indicated by the load sensing means is assigned a signal scaled to one second to approximate the amount of time he requires to transfer from the car to a landing. The car having the total signal representative of the lowest amount of time is selected to be assigned the call.

In this embodiment of the allotter the scan is advanced through a cycle so that it establishes coincidence with at least all cars in service without interruption. One convenient technique is to scan the entire range of travel. If the assignment of a car is not made shortly after the completion of the evaluation of each car's capability to serve, the scan is repeated. Such failure to assign a car can arise where all cars have predicted service time intervals so great that an assignment would be invalidated by changing conditions prior to the service being rendered to the call. In the example if the shortest predicted service time is sixty seconds or more no assignment is made. A second scan is utilized to confirm the validity of the first prediction or to sense any changes in conditions which might alter that prediction.

A call selected by the call finder is passed from path 57 to an allotter rescan circuit which develops a sharp pulse to preset the scanner position and scan direction. The pulse is repeated if an assignment is not made within a predetermined time interval sufficient to complete a normal assignment.

The pulse from the allotter rescan circuit functions in the manner described for FIG. 1*a* to cause positions corresponding to landings to be scanned step-by-step and to be fed to an allotter coincidence circuit and a total stops gating circuit for each car. Each car's position is passed to its allotter coincidence circuit so that it issues a signal to the car locating and gating circuit for the car when there is a coincidence between scan position and car position. Two such coincidences occur for each car in each scan, however the car locating and gating circuit identifies that coincidence which occurs when the scan direction opposes the car service direction and issues a "car located" signal at that time.

The "car located" signal is passed from the car locating and gating circuit to the distance register gating circuit and the free car distance register circuit. In the distance register gating circuit a count is registered based upon the number of scan steps from the call position to the car position to indicate the spacing of the car from the call. This count is translated to an analog signal scaled to the time predicted as required for the car to traverse the distance and is applied to the car's service prediction summer.

The "car located" signal is also passed to the car's free car distance register if the car is in service and has no commands or demands assigned so that it is a "free car." Free car distance is distinct from that measured in the distance register gating circuit since the latter is concerned with travel including reversals so that a descending car is related to an up call by its separation from the bottom terminal and the distance from the bottom terminal upward to the call. A free car, on the other hand, has no predetermined course of travel. It normally is parked at the landing to which it last provided service. It can be started in either direction to run to the call. Hence, only the absolute distance between the car and call need be considered in ascertaining its service capability.

Free car distance is measured in the scan portion between the initiation of scan and the first reversal in the free car distance register. The distance for the remainder of the possible locations of a free car is measured in a separate free-car distance register which is effective over the range of scan following the second scan reversal to the termination of scan adjacent the initial scan position. This register, which may be a binary counter of scan advance pulses, is gated by scan position-car position coincidence to count the landings from the car to the scan initiation position. The binary count is translated to an analog signal scaled to travel time and applied to the car's, service prediction summer.

The number of stops each car is required to make as indicated by the commands and demands assigned to it is also considered in ascertaining service capability. Those stops are considered which are between the car and the landing of the call as well as the total stops. The intermediate stops are accumulated in an intermediate stops counter as the scan progresses. Each coincidence of a scan position with a landing for which there is an assigned command or demand is sensed in the cars total stops gating circuit and passed through its intermediate stops gating circuit to the car's intermediate stops counter. The counter translates the number of stops into an analog signal scaled to time. This signal is applied to the car's service prediction summer.

Total stops are gated into the car's total stops gating circuit at the end of the allotter scan as the commands and demands assigned the car. This count is translated to an analog signal also scaled to time and applied to the service prediction summer. A fifth source of signals to the service prediction summer is the load sensing means 46 which applies a signal scale to time and proportional to loading of the car path 59.

The summer of each car produces a signal which is the sum of loading, intermediate stops, total stops, and distance between call and car scaled to time. That car having the lowest sum signal is the one having the best predicted capability to serve the call and is assigned to serve the call. The sum signals of all cars are compared to a standard which is generated after the allotter scan has been completed and all factors involved in the prediction of service capability have been developed and applied to the summers. Thus, when the scan has proceeded through the number of steps required to completely scan the service range of the elevator system, eighteen in a ten landing system, the scan counter issues a gating signal to the total stops gating circuit of each car and to a ramp signal generator. The ramp signal increases with time. It is applied to a comparator circuit for each car to which is also applied the total service prediction signal of that car in a manner such that the two signals are compared. If a total signal is encountered having a level coincident with the ramp signal, the associated car is assigned the call, the ramp generator is stopped and the call finder and allotter are released for processing further calls. If no coincidence of a total signal with the ramp signal is encountered, as where the total signal for each car exceeds the upper limit of the ramp signal, no assignment is made and the allotter rescan circuit causes the allotter to recycle.

*Description of FIGURE 2*

The logic diagram of FIGURE 2 illustrates the call memory circuits CM9 for the ninth landing hall calls for both the up and down direction together with outline representations of the call memory circuit for landing 8, CM8, and the ring counter gating RCG utilized in the call finder 32 to identify that call and the direction of service it requires which is currently under consideration for the allotting functions. The hall call push buttons 47 of FIGURE 1 are represented individually in FIGURE 2 for both the up and down direction by symbols representing manually closed contacts bearing the reference characters having a prefix S and a suffix U for an up call or D for a down call together with the number of the landing. Thus in the case of a ninth landing down hall call the push button actuated contact S9D is closed to apply ground to terminal 6 of CM9. This causes memory 81 to be set.

Throughout the present disclosure polarity symbols have been applied to indicate the sign of the set signal applied to or derived from the logic element to which the symbol is proximate. Thus, in the case of memory 81 ground is applied to its input by the momentary closing of contact S9D to impose a positive going signal as signified by the + at terminal CM9–6. The setting of memory 81, a flip-flop for example, issues a positive signal on lead 82 to the driver 83 for the call register lantern SL9D and to terminal 11. Setting of memory 81 also develops a negative signal on lead 84 to terminal CM9–10 and one input to AND 85. Similarly, if the ninth floor up hall call had been registered by closing contact S9U to apply ground to terminal CM9–22, the memory 86 would have been set to develop a positive signal on lead 87 to terminal CM9–20 and to driver 88 causing the lamp SL9U to light and indicate that a ninth landing up call was registered. Output 89 from memory 86 would apply a negative signal to the input of AND 91 and to the terminal CM9–19. When a hall call is reset by the response of an elevator car to that call, as will be discussed with respect to FIGURE 4, and the call reset gating circuits CRG1 through CRG9, a positive going signal is applied to the reset terminals CM9–9 or CM9–18, as the case may be, of call memory CM9 to reset respectively memory 81 and 86. In the case of memory 81 this again sets a positive signal on output lead 84 and a negative signal on output lead 82 to inhibit AND 85 and driver 83.

AND 85 is inhibited when no landing call has set memory 81 and when a landing call which has set memory 81 has been allotted to a demand memory DM9 of an individual car so that a positive signal is applied from the call reset gating circuit of FIG. 4 at CRG9–4 to CM9–4. The absence of a previously registered and allotted demand for a ninth down landing call is signified by a negative signal on the second input of AND 85 as applied to the call memory CM9 at terminal 4. This signal is derived from the call reset gating for the ninth landing CRG9 at terminal 4 as will be described with respect to FIGURE 4. Similarly the absence of up ninth landing demand registered on some car is indicated to the AND 91 by the application of a negative signal to its input coupled to terminal 16 of CM9 from terminal 5 of call reset gating circuit CRG9.

With both inputs to AND 85 negative, it issues a negative signal on output lead 92 to terminal CM9–5 and an input of AND 93. Thus a negative signal on lead 92 indicates that a landing call is in registration at the ninth landing for the down direction of travel and has not been allotted. Similarly, a negative signal on the lead 94 indicates that a ninth landing up call is registered and has not been allotted.

AND 93 responds to a coincidence of an unallotted down ninth landing call, the setting of the call finder ring counter CFRC of FIG. 3 to its ninth position, and the setting of a down direction in CFRC to inhibit counter CFRC, preset the allotter scanning circuit ASC for the landing from which it is to initiate its scan, and apply a signal to the down memory DM9 of each car serving the ninth landing.

Call finder ring counter CFRC is gated for operation by the signal from AND 85. Terminal CM9–5 is coupled to terminal RCG–19 of the ring counter gating circuit RCG in FIGURE 2 and passes a negative signal to that circuit. The call finder consists of the call ring counter gating circuitry and the call ring counter. The assumed ninth down landing call in energizing AND 85 initiates the call assignment process at the down direction OR gate 95 of RCG which in turn issues a negative signal to the inverter 96 and thus a positive signal to OR 97 which is inverted to a negative signal by inverter 98 and passed to AND 99. When AND 99 is on, it issues a negative signal to inverter 101 which issues a positive signal to terminal RCG–20 and to the input of inverter 102 signifying that a memory in which a call is entered is yet to be found by the call finder.

OR 95 has an input at RCG–11 through RCG–19 for each down landing call so that it is enabled by any unassigned down landing call passed by a call memory. Similarly, OR 103 has an input at RCG–1 through RCG–9 for each unassigned up landing call passed by a call memory. In the case of a ninth up landing call passed by AND 91, OR 103 is enabled by a negative signal from CM9–17 to RCG–9 to pass the signal to inverter 104 as a positive signal at OR 97. OR 97 thus responds to any unallotted landing call to partially enable AND 99.

The call finder ring counter CFRC of FIG. 3 can be considered similar to a self-interrupting stepping switch which is placed in motion by the entry into registration of a call resulting in an output from a call memory and which stops when the counter has been advanced to the landing corresponding to that in which the call memory signal is entered. Thus, if the call finder ring counter CFRC of FIGURE 3 is not positioned on the number 9 output terminal CFRC–16 to issue a negative signal therefrom and thus is not in the proper assignment position at the time the ninth down landing call is effective through call memory CM9, the ring counter CFRC will step until it encounters the landing for that call memory.

A coincidence of the position of the ring counter CFRC and the call memory currently effective upon the call finder is sensed in the call memory by enabling AND 93. CFRC terminals 3 and 1 issue direction setting signals. A down direction set issues a negative signal from CFRC–1 and a positive signal from CFRC–3, while an up direction set issues a positive signal from CFRC-1 and a negative signal from CFRC–3. A down set applies a negative signal from CFRC–1 to CM9–3 and the lower input to AND 93. A ninth position of the counter applies a negative signal from CFRC–16 to CM9–2 and the middle input to AND 93. The call completes the enabling coincidence so that AND 93 issues a negative signal to inverter 105 which issues a positive signal to CM9–8 and OR 106. CM9–8 is connected to the demand memories DM9 for each car and to RCG–39. The advance of the counter CFRC is inhibited by a positive signal to OR 107 in the ring counter gating circuit. OR 107 passes the positive signal which is inverted by inverter 108 and applied to OR 109 as a negative signal which is inverted by inverter 111 to a positive signal input to AND 99 maintaining the AND 99 off.

Any found down call memory which has been made effective upon the call finder will activate OR 107 as described since an input is provided from each call memory to 107 at terminals RCG–31 to RCG–39 for memories CM1 to CM9 respectively. Any up call memory when found is effective through OR 112 and inverter 113 to similarly actuate OR 109 and inhibit AND 99. Call memories CM1 to CM9 are coupled to OR 112 from their terminals 12 to RCG–21 to RCG–29 respectively. They derive positive signals from the up call memory found ANDs corresponding to 114 which issues negative signals to inverters as 115.

Call memories also preset the allotter scanning circuit by a positive signal at their terminal 1 as at CM9–1 for any found call as fed to OR 106 from AND 93 or 114.

When AND 99 is inhibited by a positive signal at its lower input it disables the call finder ring counter advance since AND 116 is inhibited. Advance of CFRC is enabled by a negative signal to the lower input of AND 116 from AND 99 and a negative signal to the upper input at RCG–41 connected to the allotter gating circuit at AGC–22. AND 116 issues a negative signal to inverter 117 which applies a positive signal to RCG–43 and thence CFRC–4 of the call finder ring counter clock 118. Clock 118 periodically issues an advance signal to the counter CFRC while it is enabled and when disabled by the inhibiting of AND 116 it stops the counter.

Ring counter gating circuits establish the allotter scanning direction by developing a negative signal at RCG–45 for an up direction and at RCG–46 for a down direction. Call finder scan direction corresponds to the service direction of the landing call at the time it selects that call.

The selection of a call while the call finder is advancing in a descending sequence and has a negative signal at CFRC–1 enables AND 123 to issue a negative down scan direction signal to the allotter at ASC–45 from RCG–46. AND 123 is gated since the "down call found" signal to OR 107 is passed through inverter 108, OR 109 and lead 127 to apply a negative gating signal to the upper input of AND 123. At this time AND 128 is inhibited since a positive down scan signal for the call finder is applied from CFRC–3 to RCG–10 and the upper input of AND 128. Conversely an "up call found" signal from OR 112 coincident with a negative signal at CFRC–3 to RCG–10 for the call finder set for an ascending sequence enables AND 128 to pass a negative up allotter scan signal from RCG–45 to ASC–47. At this time AND 123 is inhibited by the positive signal from CFRC–1 to RCG–30.

An interlock is provided between the call finder and the allotter such that the call finder cannot hunt for a call if the allotter is processing a call and the allotter cannot process a call if the call finder is hunting. A "call to be found" signal from AND 99 results in a positive signal at terminal RCG–20. This signal is passed to the allotter gating circuit AGC of FIG. 14 at AGC–23 where it is gated to an OR 417 which is latched in its gated condition until the allotter scanner is preset at the initiation of an allottment of a call found by the call finder. Once the allotter preset signal is generated, OR 417 is disabled since the call has been found to inhibit AND 99 and remove the positive signal at RCG–20 and the latch has been removed. OR 417 when gated passes a negative signal to a terminal AGC–22 which is connected to RCG–41 to gate AND 116 and provide the call finder clock with an enabling signal. When OR 417 is not gated it inhibits AND 116 and the call finder clock. Coupled with this inhibit of the call finder during the allotter functions is an inhibit of the call assignment by the allotter during the interval OR 417 is gated (to be described with respect to FIG. 10).

*Description of FIG. 3*

Call memory circuits CM2, CM3 and CM4 corresponding generally to that illustrated in FIG. 2 are represented in FIG. 3 for floors 2, 3 and 4. Call memory CM1 (not shown) is special to the extent that it accommodates the up landing call for the lowest landing S1U and the down landing call for the highest landing S10D.

Call finder ring counter CFRC is a biquinary counter controlled by scanning clock 118 and a direction setting flip flop 131 which reverses the direction of the count when the extremes are reached. CFRC develops a negative signal individually on one of its terminals CFRC–24 to CFRC–15 for landings one through ten respectively whereby the selected landing, when in coincidence with an active call memory, presets the allotter.

A positive signal applied to scanning clock 118, a free running multivibrator causes the clock to periodically apply signal pulses to flip flop 132. Clock 118 while subjected to the positive signal at CFRC–4 first has a negative going signal to a level which it maintains for about 40 microseconds and a positive going signal to its dormant level which it holds about 10 microseconds to produce a signal having a sharp rise time in both directions. The positive going signals to binary flip flop 132 transfer states at outputs 133 and 134. Lead 133 initially transfers positive and 134 transfers negative; on the second positive going signal from clock 118, lead 133 transfers negative and lead 134 transfers positive. Hence leads 133 and 134 each apply square waves of opposite phase having a transfer every 50 microseconds.

The count or location of the finder is established by gating one of the AND's 157 to 166 to pass a negative signal and produce a negative output signal through the tandem inverters to one of the terminals CFRC–24 through CFRC–15. Upon initiation of energization of the scanner a count has been randomly estabilshed. Normally where the scanner has been operating, it retains the count and scan direction established in the preceding scan. It advances in the direction previously set and from its previously applied count with each positive going clock signal.

Assume, for purposes of illustration that an initial count of "1" was present so that binary flip flop 132 issues a negative signal at 134, AND 157 was gated and all other AND's 158 to 166 were inhibited. Under these conditions inverter Q11 has a positive input to enable AND's 157 and 158. With a count "1" a positive signal is issued to lead 151 and the reset input of direction flip flop 131 whereby an "up" or ascending scan is set by developing a positive signal on lead 149 and a negative signal on lead 150. Scan direction is reversed at the maximum count, "ten" in the example, by a positive signal on the "set" input 130 of the direction flip flop 131 to establish a positive signal on lead 150 and a negative signal on lead 149.

The quinary portion of the counter is arranged to set that inverter associated with the counter. Thus in the assumed count of "one" inverter Q11 is set to issue a negative signal and inverters Q12, Q13, Q14, and Q15 issue positive signals. These conditions are maintained by interlocking gates, AND's 135 136, 137, 138 and 139, which are of the positive set type. Transfer is accomplished in a descending count by gates 141, 142, 143 and 144 and in an ascending count by gates 145, 146, 147 and 148, each of which is of the negative set type.

With a "one" count inverters Q12 to Q15 issue positive signals to the input of interlock AND 135 to gate a positive signal to OR 167 thereby holding a negative output on inverter Q11. The negative signal from Q11 to each of the other interlock AND's 136 to 139 inhibits those AND's to inhibit the ORs 168 to 171 and thus each of counts "3" to "10."

The inversion in binary flip flop 132 to a negative signal on lead 133 and a positive signal on lead 134 inhibits AND 157 and gates AND 158 to advance to a count of "2." At this time each of the down transfer AND's is inhibited by the positive signal on lead 149, up transfer AND's 146, 147 and 148 are inhibited by the positive signals from Q12, Q13 and Q14; and up transfer AND 145 is gated since a negative signal is applied from Q11. This negative signal inhibits OR 172 without effect at this time. AND 145 is thus cocked for transfer in response to the next pulse from the binary 132.

The next inversion of binary 132 imposes a negative signal on 134 and a positive signal on 133 to inhibit AND 145. The positive going signal from AND 145 gates OR 172 through blocking capacitance 153 to OR 168 and inverter Q12. Inverter Q12 issues a negative signal to inhibit interlocking AND 135 and OR 167, thereby issuing a positive signal from inverter Q11 to gate interlock AND 136. The negative signal on lead 134 coupled with that from Q12 gates AND 159 for a count of "3." Th next binary inversion gates AND 160 inhiibts AND 159 to transfer to a count of "4" and cocks up transfer AND 146 so that the following binary inversion enables inverter Q13 for the count of "5."

Reversal of the scan direction by the direction flip flop 131 activates the descending transfer AND's 141 to 144 to enable logic corresponding to that set forth above.

Scan direction signals are issued by the call finder ring counter at CFRC–3 and CRFC–1. A positive signal at CFRC–1 signifies the scan is ascending and at CFRC–3 it signifies a descending scan. Conversely a negative signal at CFRC–1 signifies a descending scan and at CFRC–3 it signifies a positive scan. The call memories CM1 to CM9 are indicated as found only when the call finder scan is in a direction corresponding to the call service direction, as sensed in AND's 93 and 114 of CM9 for example, at terminals 13 and 3 for negative signals indicated as up and down scan respectively derived from CRFC–1 and CRFC–3. These direction signals are connected in multiple from the call finder ring counter to each call memory.

*Description of FIG. 4*

The call reset gating circuits of FIG. 4 are individual to each call memory and are common to all cars serving the landing accommodated by that call memory. In a ten landing system nine call reset gating circuits are employed. Each call reset gating circuit issues reset signals to its call memory and the corresponding demand memories (to be described) and issues signals indicative of a present demand in a demand memory to its call memory.

In a four car system each car has a demand memory for each landing it serves. The state of these several demand memories is collectively sensed in the call reset gating and signaled to the call memories for control of the call finder whereby a registered demand inhibits actuation of the call finder in response to a call in the correspondig call memory.

In FIG. 4 call reset gating circuit CRG1 is illustrated as typical of circuits CRG2 to CRG9. Each circuit is responsive to the up demand memories of all cars serving the landing through OR 173 and to the down demand memories through OR 174. Terminal 8 of the first up demand memory of cars 1 through 4 are connected to OR 173 as 1DM1–8 to CRG1–7, 2DM1–8, to CRG1–8, 3DM1–8 to CRG1–9 and 4DM1–8 to CRG1–10. From OR 173 the negative signal indicative of an up demand for the bottom landing for one of cars 1 to 4 is inverted in inverter 177 and a positive inhibit signal is passed from CRG1–5 to CM1–16 to prevent AND 91 of CM1 from initiating call finder operation in reponse to a first up landing call. Inverter 178 similarly passes an inhibit signal to prevent a call finder hunt in response to a tenth down landing call if a tenth down demand is registered.

In the detailed disclosure of elements individual to the cars only a typical element has been shown. Thus in the case of the demand memories and call resets no car designations have been employed. These circuits as interconnected to the call reset gating circuits of FIG. 4 are distinguished by an additional prefix in the case of demand memories and a distinct suffix in the case of call registers. Thus demand memories have a number prefix corresponding to the car number so that the same terminal from each of four DM1's when connected to CRG1 are distinguished as 1DM1, 2DM1, 3DM1 and 4DM1 for cars 1 to 4. Call resets are arranged with two modules per car so that car 1 has CR1 and CR2, car 2 has CR3 and CR4, car 3 has CR5 and CR6 and car 4 has CR7 and CR8. The terminals of CRG1 are interconnected to similar call reset circuits of each car at CR1, CR3, CR5 and CR7 for cars 1, 2, 3 and 4.

When a call is to be reset by the response of a car thereto, a negative signal is issued from the call reset as CR1 or CR2 for car #1 of FIG. 16 for that car, for that direction of service, and for that landing. That signal is passed by the call reset gating circuit CRG1 to CRG9 for the landing to reset the demand memories DM1 to DM9 of all calls and the call memory CM1 to CM9 for that landing and service direction. An up first landing reset by any car passes a negative signal to OR 175 which is inverted by inverter 179 and issued as a positive reset signal at CRG1–3 to the first demand memories at DM1–10 for each car and first call memory at CM1–18. Down tenth landing reset is fed from each car's call reset to OR 176 and through inverter 180 to terminal CRG1–2 from which it is passed to the demand memory at DM1–13 for each car and to call memory at CM1–9.

In view of the number of terminals involved the individual terminal designations and their connection notations have not been shown for call reset gating circuits CRG2 to CRG9 of FIG. 4. However, it is to be appreciated that the positions of the lines crossing the dot-dashed margins of those circuits correspond to those of CRG1 with appropriate changes in landing numbers. Thus CRG2 has inputs for each of the cars 1 to 4 from the up and down demand memory of the second landing for those cars and the call reset output for up and down service for those cars. The outputs of the call reset gating circuits also correspond to those of CRG1 so that each circuit is coupled to "demands present" inputs of respective call memories for the up and down directions and "calls answered" or "reset" inputs to the respective call memories and to respective demand memories of each car.

*Allotter*

The landing call selected by the call finder is assigned to an elevator car which is in a condition to expeditiously respond to that call. This assignment is accomplished by an allotter, elements of which are shown in FIGS. 5 through 14. The assignment by the allotter introduces the call into a demand memory individual to the car, the landing and the service direction. Such a call is thereafter considered a demand upon that car.

The allotter can accommodate any number of factors considered significant in evaluating the capacity of each car to serve the call subject to assignment. Each factor can be weighted according to its degree of importance with respect to the car's service capacity and can be assigned different levels in accordance with the magnitude of the factor currently imposed upon the car or system as a potential detriment to service. The factors are summed for each car and the assignment is made to the car having a sum with a predetermined relationship to the sums of other cars. In the illustrative embodiment, the car having the smallest sum is allotted the call on the basis that that sum represents the optimum service capability as composed generally of the shortest anticipated answer time and the most expeditious response to the service anticipated to be required by the call for any car capable of answering the call.

The relationship of the call to each car is ascertained by counting the number of landings between the call and the cars either as the number of landings the car will be required to pass in completing that portion of a round trip terminal-to-terminal to advance to the call or the absolute travel distance in the case of a free car. Such a count is obtained by the allotter scanner of FIG. 6 which counts from the call in the direction cars capable of serving the call would approach the landing of the call. The scanner scans the entire travel range in both the up and down direction locating cars set for up service while scanning downward and cars set for down service while scanning upward. Cars are identified as to their location in the individual allotter coincidence circuits of FIG. 7 and their distance from the call is indicated in their distance register gating circuits of FIG. 13. This provides one criterion of the predicted time required of each car to answer the call if it were assigned the call.

Another criterion of predicted answer time is the number of stops required of the car in traveling to the call. This is ascertained by the car locating and gating circuits of FIG. 10, the intermediate stops gating circuits of FIG. 9 and the intermediate stops counter of FIG. 9, each of which is individual to the car.

An indication of the interval required of the car to provide service after it has stopped for the call is afforded by the total number of stops assigned to it and the load imposed upon it. The total stops gating circuits for each car as typified in FIGS. 8 and 9 are the means for indicating the total stops assigned. Loading of the car can be ascertained by a load switch as represented in FIG. 11.

The various control functions in the allotting process are in large part performed in the allotter gating circuit of FIG. 14 wherein the initation and termination of the scan by the allotter scanner and the comparison of the several sum signals are actuated.

Under normal operation a car is assigned a call within a maximum of about eleven milliseconds of the initiation of the allottment function. If the service capability signal for each car exceeds a certain level indicative of an excessive service delay the allottment function loses its validity. Accordingly no allottment is permitted since the magnitude of the ramp signal against which the sum signal for each car is compared is restricted and cannot reach coincidence with the sum signals. Under these circumstances a second allottment of the call is attempted on the assumption that the state of the service requirements can be altered in the interim. This reallottment is instituted by the allotter rescan circuit of FIG. 5.

*Description of FIG. 5*

The allotter rescan circuit of FIG. 5 normally passes a fast rise time preset signal to the allotter scanner preset of FIG. 6 from one of terminals ARC–11 through ARC–20 to ASC–1 to ASC–10 for landings 1 to 10 respectively. This signal is derived from the call memory allotter preset signal terminal 1 or CM1–12 in the case of a first landing up call and CM1–8 in the case of a top landing down call, and is applied to terminals ARC–1 through ARC–10 for landings one through ten as a positive signal when the call is found by the call finder. Blocking condenser 181 passes a positive signal pulse to inverter 182 to gate OR 183 and Schmitt trigger 184 in the case of a found call at the first landing. The Schmitt trigger issues a preset signal to the allotter scanner and a normal allotting function (as will be described) follows.

If the system is saturated so that the summed analog signals for each car exceed the ramp signal maximum against which they are compared, no allottment of the call will occur. The ramp signal is generated following the completion of an allotter scan, indicated by the eighteenth scan step of the scanner in a ten landing system. An end of scan signal appears as a positive pulse at ARC–21 from distance counter DC at AGC–24 of FIG. 14. It is passed by inverters 185 and 186 to AND 187. AND 187 is gated while the call memory indicates a call is registered and not assigned as a demand in one of the cars. Hence it passes a positive signal to time delay 188 provided a positive signal is present at ARC–1.

In a normal allottment of a call the allottment is completed within ten milliseconds of the completion of the scan and the output to the allotter rescan circuit is inhibited by inhibiting AND 85 from the call reset gating of FIG. 4 to terminal 4 of the call memory or by inhibiting AND 91 from the call reset gating, to terminal 16. However, if the call is not assigned, the signal to the allotter rescan circuit persists. Time delay 188 is set for about a hundred milliseconds in the the example. If the "call not assigned" signal persists for that interval following completion of a scan, the time delay 188 again enables Schmitt trigger 184 to again apply a preset pulse to the allotter scanner preset and initiate a second allotter scan for that call.

The above allotter rescan cycle is repeated for a call passed by the call finder until that call is assigned to a car. Once the call is assigned the call finder and allotter are released to process other calls if such are registered.

*Description of FIG. 6*

The location of a call by the call finder and the enabling of the call memory gate presets the allotter scanning circuit of FIG. 6 by applying through the allotter rescan circuit of FIG. 5 a positive signal to the appropriate preset terminal ASC–1 to ASC–10 for landings 1 to 10 respectively. The allotter scanning process involves a progressive scan from the selected call location in a direction to locate cars in advance of the call, initially below the call or downward for an up call and above the call or upward for a down call. Each landing between the call and the cars is counted for individual cars as is each call between the cars and the call during this process. The scanning also involves inverting the hunting direction when the limits of travel are achieved so that each scan can include two scan direction reversals and a return to the originating position.

A preset at terminals ASC–1 to ASC–10 is passed to an OR which enables the appropriate quinary stage of a counter corresponding to that employed in the call finder ring counter circuit of FIG. 3 while a second OR presets the binary flip flop to enable the odd or even binary stage associated with the quinary stage of the counter. OR's 189 to 193 are respectively connected to apply a positive signal to inverters Q11 to Q15 respectively in response to an odd or even value of preset for the respective quinary stage. For example, a preset 8 from CM8–1 to ARC–8 to ARC–18 to ASC–8 activates OR 192 and inverter Q14. This preset also presets the even binary stage associated with Q14 by passing a positive signal to OR 194. An odd value of preset is passed to OR 195. The binary flip flop has a set OR 196 and a reset OR 197. OR 194 sets the flip flop through OR 196 to issue a negative going signal on lead 199 and a positive going signal on lead 198. Thus with inverter Q14 active and the remaining inverters inactive so that only the pulse position output AND's associated with Q7 and Q8 are effective the positive signal on lead 198 inhibits the AND for Q7 and the negative signal on lead 199 enables the AND for Q8 to issue a preset positive signal for the eighth position or landing at ASC–18.

The OR's 194 and 195 also enable the scanning direction to be set through OR 200 which fires the one shot multivibrator labeled "monostable" to cause the brief issuance of a negative signal on output 201 and a positive signal on output 202. This preset signal from the monostable has a duration of 40 to 50 microseconds and is terminated before the pulse on the preset inputs from the allotter rescan circuit is terminated. Direction setting AND's 203 and 204 are enabled by the brief negative signal on lead 201.

Ring counter gating establishes the scanning direction at terminals RCG–45 and RCG–46 such that a negative signal is issued at RCG–46 when a down call is to be allotted and a negative signal issues at RCG–45 for an up call. AND 203 for up calls is gated from RCG–45 to ASC–47 to set the scanner for an initial descending direction during the gating pulse from the monostable. AND 204 for down calls responds to a negative signal from RCG–46 through ASC–45 to cause an initial scan in the ascending direction. Inverters 205 and 206 apply a positive pulse signal to OR's 207 and 208 through blocking condensers which are passed to the set and reset inputs of the direction flip flop. OR 208 to the set input of the direction flip flop, when issued a positive signal causes the direction flip flop to set the counter to advance in an ascending direction by issuing a positive signal on lead 209 and a negative signal on lead 210 for an ascending count. Similarly when OR 207 is on it resets the direction flip flop to cause the counter to advance in a descending order by imposing a negative signal on lead 209 and a positive signal on lead 210.

The counter advances its count in much the same fashion as the call finder ring counter of FIG. 3. Clocking pulses are derived from a scanning clock which issues a negative going signal at the termination of the allotter control reset (as will be described), holds that signal at a given level for 40 microseconds, returns to its initial level for ten microseconds and thereafter repeats the cycle until it is stopped. The binary flip flop thus issues square waves 180° out of phase on leads 198 and 199 having a 50 microsecond dwell at the maximum level and a 50 microsecond dwell at the minimum.

In an ascending setting the count advances between quinary stages each cycle of the binary flip flop and from odd to even stage of the section controlled by the active quinary stage for inverters Q1 through Q10 for each half cycle of the flip flop. A descending setting reverses the sequence of the quinary stages causing the advance from Q15 to Q11 and upon the inception of conduction in each pair of binary stages controlled by a quinary stage, operates the even stage in the first half cycle of the binary flip flop and the odd stage in the second half cycle.

If the assumed call had been a down landing call for the eighth landing the counter is set to initially scan upward from position 8 (ARC–18) by a positive signal at ASC–8 and a negative signal at ASC–45. When the tenth position is reached a positive signal from Q10 is applied to OR 207 at its upper input to reset the direction flip flop whereby the counter scans downward from Q10 to Q1. When the first position is reached the signal from Q1 is applied to the lower input of 208 to set the counter to an ascending scan.

Scanning continues while the free running multivibrator labeled "scanning clock" continues to run and apply pulses to lead 211 feeding the binary flip flop. The clock operates when the positive inhibit signal on lead 212 is removed by disabling OR 213. It is started upon the termination of the direction set signal on lead 201 from the monostable and is inhibited during the reset of the allotter and its associated elements. The clock operation is continued until a scan cycle is completed as signified as a positive signal at ASC38.

The allotter and its associated circuits are reset during the pulse from the monostable circuit. Normally a negative signal is present on lead 202 and a positive signal is on lead 201. During the firing interval of the monostable circuit the signal polarities are reversed. The positive signal on lead 202 to terminal ASC–39 is applied to reset the counters in the intermediate stops counter at ISC–3, the free-car distance counter at FDR–3, and the distance counter at AGC–13. Resetting of the distance counter DC cancels the count of eighteen which terminated the preceding allotter scan and removes the positive "eighteen count" signal from terminal AGC–24.

While the "eighteen count" prevails, the scanning clock is inhibited. A positive signal at ASC–38 inhibits AND 214 so that inverter 215 gates OR 213 to impose an inhibit signal on the scanning clock over lead 212. During the allotter reset and while the monostable is inverted, the reset of the "eighteen count" does not remove the inhibit from the scanning clock since the negative signal from the monostable on lead 201 to OR 213 maintains that OR gated. At the termination of the monostable reset signal lead 201 returns positive and since the "eighteen count" signal has been cancelled OR 213 is inhibited to remove the inhibit on the scanning clock.

The inhibit of the scanning clock is locked out during an allotter scan by gating AND 214. During the reset by the monostable, OR 216 is gated by the positive signal on lead 202. The resulting negative signal from inverter 217 to AND 214 in coincidence with the reset of the "eighteen count" signal gates AND 214. Inverter 215 latches OR 216 to hold AND 214 gated until another "eighteen count" signal is applied at ASC–38 to inhibit AND 214 and the scanning clock.

The distance counter of the allotter gating circuit AGC of FIG. 14 is driven in synchronism with the scanner by pulses derived from the scanning clock through driver 204D and ASC–24 which is connected to AGC–1. This counter will be discussed in detail below.

In the allotter scanning process the direction flip flop is reversed at the initiation of the terminal scan interval. Thus, when the scanner is stepped to a count of 1 the ring counter is set to the up direction even though the first position is included in the scan downward and a scan reversal should be considered to occur only as the scan transfers from the terminal to the next adjacent position. The ring counter reversal is therefore considered to occur one scan step in advance of the reversal of the scanning reference direction.

Scanning reference direction is significant in the free-car distance counter logic. Free-car distance is measured as the absolute distance of a free-car from the call. Accordingly, if the free-car is encountered in the initial portion of the scan, that preceding the first reversal of the scanning reference direction, the free car distance can be measured as the number of scan steps from the initiation of the scan to the coincidence of the scan with the free car lead position. The scan between the first and second reversals of the scanning reference direction is not utilized in the free-car distance measure. If the free-car is encountered after the second reversal of scan, its distance from the call is measured by the number of scan steps from the location of the car to the return of the scan to its initial position.

A reversal of scan circuit involving portions of the allotter scanner circuit and the allotter gating circuit AGC of FIG. 14 are employed to isssue a signal for no reversal of scan during the initial scan and up to the first reversal of the scanning reference direction and to issue another signal upon the second reversal of the scanning reference direction in order to control the free-car distance counter of the car locating and gating circuits CLG1 and CLG2. Reversal of scan circuits in the allotter gating circuit receive information by coupling ASC–25 to AGC–16, to pass a negative signal for up allotter ring counter direction and a positive signal for down allotter ring counter direction. Similarly ASC–26 is coupled to AGC–15, to pass a positive signal for up allotter ring counter direction and a negative signal for down allotter ring counter direction. The terminal landings in the scan are assigned to the direction of scan which achieved the terminal position as a down scanning reference direction for the bottom terminal and an up scanning reference direction for the top terminal by a positive signal at ASC–41 during the down scanning reference direction and a positive signal at ASC–42 during the up scanning reference direction.

OR 218 is gated while the allotter ring counter is set for a descending count and while the first position of the scanner is active. Each of these conditions impose a positive signal on an input to OR 218 resulting in the enabling of AND 219. AND 219 is gated by OR 218 except when inhibited by the cross inhibit from the up scanning reference direction circuit. AND 219 issues a positive signal which is inverted by inverter 220 and again by inverter 221 to pass a positive signal to terminal ASC–41 during the interval the down scanning reference direction is maintained.

OR 222 is gated while the allotter ring counter is set for an ascending count to apply a positive signal to its lower input, and while the upper terminal position of the scanner is active to provide a positive signal on its upper input. AND 223 is gated by the gated OR 222 and the absence of a cross inhibit signal from inverter 220. The cross inhibits between AND's 219 and 223 enable the scanning reference direction to be maintained until the count has advanced from a terminal position. Thus if an up direction were set in the ring counter OR 222 would be gated. When the tenth scan position is achieved the down direction is set in the ring counter; however, the OR 222 would continue to be gated and would hold AND 223 gated so that it inhibited AND 219 even though OR 218 is also gated at this time. Thus while the ring counter is set for up and at other than the lowest scan and while the scan is at its highest, a positive signal is issued from inverter 224 to terminal ASC–42. Conversely when the ring counter is set for down and at other than the highest scan and while the scan is at its lowest, a positive signal is issued to terminal ASC–41.

Classification of the calls as to their direction and correlation of the scanning reference direction thereto is utilized in the total stops gating circuits typified by TSG1 and TSG2 for car 1 for counting intermediate stops. ORs 225 and 226 provide signals to the total stops gating circuits for both intermediate stops counting and total stops gating. Intermediate stops counting is accomplished in synchronism with the allotter scan by sensing each coincidence of a scan position with a call assigned the car for that position and by serially counting those coincidences. Total stops counting is accomplished at the end of the scan by enabling all calls assigned the car to be counted. OR 225 is gated during the period of down scanning reference direction by the positive signal from inverter 221 and OR 226 is gated during the period of up scanning reference direction from inverter 224 to provide intermediate stops count control. Both of ORs 225 and 226 are gated at the end of the scan by the positive "eighteen count" signal applied to ASC–38 and passed over lead 227. While OR's 225 or 226 are gated a negative signal is issued at ASC–21 and ASC–22 respectively to enable the AND gates of the total stops gating circuits of FIG. 8 as will be described.

*Description of FIG. 7*

Each car is provided with an allotter coincidence circuit which responds to a coincidence of the scan position and the effective or lead position of the car to aid in locating the car with respect to the call. FIG. 7 illustrates in detail the allotter coincidence circuit for car 1, ACC1, and represents by the dot-dashed rectangles labeled ACC2, ACC3 and ACC4 the allotter coincidence circuits for cars 2, 3 and 4.

The allotter coincidence of scan position and effective car position is sensed by a series of AND circuits one for each scan position or landing as 228 to 237 for landings 1 to 10 respectively in the illustration. Each AND has two inputs and is responsive to a coincidence of positive signals thereon. The lower input is from the scanner outputs ASC–11 to ASC–20 for positions 1 to 10 respectively. The upper input is an effective car position derived from the apparatus of the aforenoted car control United States patent application Ser. No. 380,385 or from conventional floor selector machines. Such inputs are termed "lead positions" to signify the current position at which a car is capable of stopping. They are designated here and at other points where they are utilized as LP–1 through LP–10 for landings 1 through 10. The coincidence of a lead position and a scan position gates the AND for that position to issue a positive signal to OR 238. That signal is inverted by inverter 239 to appear at ACC1–1 as a "car found signal." During the scanning cycle similar "car found signals" are issued from ACC2–1, ACC3–1, and ACC4–1 as cars 2, 3 and 4 are located by the coincidence of the scan position and their respective lead positions.

*Description of FIGS. 8 and 9*

The allotter develops an analog signal representing the total number of stops each car must make. Total stops gating circuits TSG1 and TSG2 shown in FIGS. 8 and 9 are typical for ascertaining the total stops for Car 1 and correspond to circuits TSG3 and TSG4 for Car 2, TSG5 and TSG6 for Car 3 and TSG7 and TSG8 for Car 4.

Total stops gating circuits also provide signals to intermediate stops counter ISG of FIG. 9 to count the number of stops each car must make between its position at the time the allotting takes place and the location of the call being allotted. Thus the sensing of the total stops is synchronized with the allotter scanning whereby the intermediate stops are serially applied to the intermediate stops counter.

Total stops are sensed broadside by AND circuits which are responsive to the gating of OR's 225 and 226 at the end of a scan and to the activated individual demand memories. In the example these coincidence circuits are grouped in five landing modules.

Total stops gating circuit TSG1 accommodates the up and down demans for car 1 for landings six through ten while circuit TSG2 accommodates landings one through five for that car. The demand memories of FIG. 15 issue negative signals at their −6 terminals when an up demand or a command is registered for their landing and issue negative signals at their −18 terminals when a down demand or a command is registered for their landing. Accordingly all calls assigned a car are indicated by these outputs from its demand memories. The up demand memory outputs appear as negative signals at the upper inputs of up AND's 241 to 249 for landings 1 to 9 in FIG. 8. Down demand memory output signals are applied to the upper inputs of down AND's 252 to 260 for landings 2 to 10 in FIG. 8. AND's 241 to 249 and 252 to 260 are employed in the serial counting of intermediate stops by combining their gated signals with allotter scan position signals in the circuits of FIG. 9. They are also employed in the broadside gating of the total stops register to output resistors 271 to 280. These grouped AND's are inhibited and enabled by signals common to each group and derived from the allotter scanning circuit at ASC–21 and ASC–22. While the scanning reference direction is set for an ascending scan a negative signal is passed from ASC–22 to TSG1–17 and TSG2–15 to enable all of down AND's 252 through 260. Any down demand registered in the demand memories of car 1 will impose negative signals on those AND's and result in a negative output to the OR of the series 262 to 269 for landings 2 to 9 corresponding to the landing of the registered demand. The OR's 262 to 269 respond to up and down demands for the landings and issue a negative output in response to either. Thus, when the allotter scanner reference direction is set in a descending direction, a negative signal is present on TSG1–15 and TSG2–17 and all AND's 241 to 249 for which up demand memories are operated pass a signal to appropriate OR's the group 262 to 269.

All up and down memories which are active cause negative signals to be applied to inverters for landings 1 to 10 which in turn develop positive signals.

FIG. 9 is coupled to FIG. 8 through the vertically extending leads 281 to 290 coupled to the output of the inverters from ANDs 241 to 260 and OR's 262 through 269. In accordance with the scanner sequencing, leads 281 and 290 can each be activated over one portion of the scan interval provided an up first demand memory or a down tenth demand memory is registered. Leads 282 to 289 can be activated over either or both of the up and down scan portions since they respond to both up and down demand memories for the second through ninth landings. A positive signal on any of leads 281 to 290 enables a corresponding AND 301 to 310 in FIG. 9 when the allotter scanner is on the position corresponding to that AND and applies a positive signal to its other input through TSG1–1 to TSG1–5 or TSG2–1 to TSG2–5. Thus the AND's 302 to 309 can be activated twice during each scan if both up and down demands are registered for the landing to which they correspond.

Each response of an AND 301 to 310 represents a call registered in a demand memory. Since both commands and demands are registered in a demand memory, as will be discussed below, the several response during the allotter scan serialize the calls to which the car must respond by positive signal pulses appearing at OR's 311 and 312. These pulses are inverted by inverters 313 and 314 and passed from TSG1–24 and TSG2–24 to intermediate stops gating circuit ISG at ISG–1 and ISG–2 respectively. They are combined at OR 315 gated through AND 316 from the initiation of the allotter scan until the car is found and an inhibit signal is imposed from car locating and gating circuit CLG1 as a positive signal from CLG1–11 to ISG–3. AND 316 is enabled in synchronism with the allotter scanner clocking to avoid spurious signals by enabling negative pulses from ASC–24 to ISG–18. AND 316 issues a pulse through inverter 317 at ISG–4 for each demand memory in which a demand or command is registered and which is encountered in the allotter scanning operation between the initiation of scan and the location of the car thereby producing a number of pulses corresponding to the number of stops required of the car before it can reach the call being allotted.

The intermediate stops gating circuit includes sections gating stops for each of the four cars as indicated by the dashed lines sectioning the dot-dashed rectangle labeled ISG in FIG. 9. "Car found" signals are supplied these gates for cars 2, 3 and 4 at ISG–7, 11 and 15. Scanner clock synchronization is through the paralleled connections represented by arrow-headed lead 318. Inputs from the total stops gating circuits (not shown) for cars 2, 3 and 4 are applied at ISG–5 and 6, 9 and 10, and 13 and 14 respectively in the same manner as at ISG–1 and 2.

The output of each car's gate at ISG–4, 8, 12 and 16 for cars 1 to 4 is applied to an intermediate stops counter ISC individual to the car as typified for car 1 in the rectangle shown in FIG. 9. This counter can conveniently be of the binary type comprising four flip flop stages in the present system of ten landings. If a greater number of landings were present additional stages could be added, although in the present system the capacity to count fifteen intermediate stops is considered adequate. The binary counter has not been shown in detail since its form and equivalent counters are well known. For car 1 the counter has an advance input ISC–24 from intermediate stops at ISG–4. A reset prior to each allotter scan is applied to the intermediate stops counter at ISC–3 to set the count to zero. Each counter stage has an output in accordance with conventional binary counting for a count of one at ISC–23, two at ISC–22, four at ISC–21, and eight at ISC–20. In order that a binary to analog addition can be accomplished to apply a signal to the analog summing lead 300 which is characteristic of the number of intermediate stops the signals from the counter are applied to resistances having values weighted in accordance with the count they represent. For example if a strict signal relationship is desired for the intermediate stop count factor the resistance 319 for the one count output should be of a magnitude eight times that of resistance 321 for the eight count output. Similarly the two count output resistance 322 should be four times the resistance 321 and the four count output resistance 323 should be twice that of resistance 321.

The total number of stops assigned a car is ascertained at the end of the scan by broadsiding all of the activated demand memories to output resistances 271 to 280 of FIG. 8. As described with respect to the allotter scanner of FIG. 6, upon the termination of the scan OR's 225 and 226 are both gated to issue negative signals from ASC–21 and ASC–22 to terminals TSG1–15 and 17 and TSG2–15 and 17 whereby all of AND's 241 through 249 and 252 through 260 are enabled. Those AND's to which activated demand memories are connected are gated at this time so that the resistances coupled thereto through terminals TSG1–18 to 25 and TSG2–18 to 25 are grounded and draw current to represent the analog signal from summing lead 300 for the total number of stops imposed upon that car.

In regard to the signal weights to be given each factor considered in the allotting decision, it is to be understood that the weighting can be arbitrary. That is, for example the total stop count signal might be made up from identical signal levels for each landing represented so that each of resistances 271 to 280 are of identical magnitude. Alternatively the resistances for the terminal landings, resistances 271 and 280 might be half the magnitude of each of the other landings in order to give those landings double the weight attributed to demands registered for the landings intermediate the terminals.

*Description of FIG. 10*

Each car is provided with a car locating and gating circuit as shown in FIG. 10. This circuit includes the means for comparing the summed signals for the various factors which are incorporated in the decision making evaluation of each car's service capability with respect to the call which is being allotted and for issuing the car assigned signal if the call is to be allotted to the car. It also gates the advance of the scan position to coincidence with the lead position of the car whereby the distance register gating circuit for the car is latched as is the intermediate stops gating and the free car distance register.

Much of the information utilized by the car locating and gating circuit is derived from the allotter scanning circuit and the allotter gating circuit while its effective summed signal is complied by an operational amplifier of FIG. 12 which in turn is supplied by the total stops gating circuits TSG1 and TSG2, the intermediate stops counter ISC, the distance register gating circuit DRG, the free car distance register FDR and a car load sensing circuit all of which supply lead 300.

A number of signals applied to and derived from the car locating and gating circuits of car 1 are common to those circuits for the other cars. Thus in the decision making operation of the allotter a ramp signal is applied to each car's locating and gating circuit simultaneously as is a start ramp signal. The eighteenth pulse of the allotter scanner is also applied to the circuits of all cars as are the call direction signal, the allotter reset signal, the allotter reference scan direction signals and the reversal of allotter scan signals.

A car located signal is issued as a positive signal at CLG1–11 when a car lead position coincides with the allotter scan position and the allotter scan is in the proper direction. This signal is passed to ISG–3 to latch the intermediate stops gating whereby the effective number of calls between car location and demand being allotted is ascertained. In order that the calls be restricted to those which are effective the scan follows the circuit of the car travel. Thus for an up call the scan is directed from the call downward searching for an up car; once the lower terminal has been scanned, the scan is upward beginning at the second landing and the search is for a down car; when the upper terminal is achieved the scan again reverses and proceeds downward from the ninth landing to the landing above the call being allotted while the search is for an up car. An inversion in scan and search response is utilized for a down call. Thus the car best suited to respond is a down car above the call found by an initial scan upward, the next most favorable positioned car is an up car near the top of the travel hence a scan downward seeking an up car is undertaken and the third category of car position and direction is a down car below the down call encountered by an up scan from the second landing and responsive to a down setting for the car.

The separation of a car from the call also relies upon the scanning circuit above. That is, it counts each landing at which the car might stop in running from its current position and in the direction it is currently providing service. If a down call were registered at the eighth landing and the car were traveling upward at the seventh landing the distance register gating circuit would be enabled when the allotter scanner count was at five since the scanner would step to landings nine and ten on an ascending scan and then landings nine, eight and seven on a descending scan. At the coincidence of the scan and car lead positions, the car locating and gating circuit inhibits the scan counter of the distance register gating circuit, so that that count is available to produce a distance count contributing to the summed analogue signal of the car service capability.

According to the present system a car having no service requirements imposed upon it yet available for service is considered to be particularly well situated to serve a call being allotted. Such a car is termed a "free car." It has no direction setting and therefore can be set according to the requirements of a call allotted to it. The above outlined circular scan is therefore not required in ascertaining the separation of a free car from a call to be allotted. However, in order to maintain compatibility with the allotter scanning system utilized, elements of that scan are employed in evaluating the availability of a free car to sevre the call being allotted. Since only the absolute separation of the call from the free car is of interest, the initial portion of the scan up to the first reversal of scan is utilized in the car hunting and the landings scanned between the call and car are counted by the distance register gating circuit for the car if the car is encountered. Following the first reversal of scan the counting for free car distance purposes is suspended. Upon the second reversal, absolute separation of car and call is again ascertainable by initiating the scan position count in a free car distance counter for the car upon coincidence of that count and the free car lead position and continuing the count to the termination of the scan at the landing adjacent that of the call being allotted. Thus for a down call free car distance circuits are effective only during the ascending scan before the first reversal and after the second reversal while for an up call they are effective only during the descending scan before the first reversal and after the second reversal.

Car locating relies upon the relationship of the allotter scanning direction to the service direction assigned to the car. A down scanning reference direction is signified by a positive signal from ASC–41 applied to CLG1–19 while the up scan is signaled from ASC–42 to CLG1–21. The car service direction from car 1 car control circuit CC is indicated by a positive signal from SSL–31 to CLG1–20 for an up car and from SSL–32 to CLG1–22 for a down car. Coincidence of an up reference scanning direction and a down service setting of the car is sensed by AND 324 which activates OR 325 through inverter QB. Conversely, a down scan and an up service setting of the car passes a signal through AND 326 and inverter QA to OR 325. OR 325 therefore passes a signal when the scan direction is compatible with the car service setting for assignment of the car.

The coincidence of lead position for a car having a service direction compatible with the scan position is employed throughout the scan for an active car as the means for marking the distance of the car from the call and the intermediate stops count. This coincidence is also used for a free car to mark its distance from the call prior to the first reversal of scan if the free car is ahead of the call, or after the second reversal of scan if the free car is behind the call.

The signal from OR 325 is inverted by QC and applied to AND 330 to enable that AND to pass a signal through inverter QE to OR 327 in the event car 1 is not a free car. A free car is signified by a positive signal from SSL–2 to CLG1–12. Thus a negative signal through OR 328 indicates the car is not in the free car status and the inversion at QD enables AND 330. During the initial portion of the allotter scan a negative signal issues from AGC–18 to CLG1–18. Upon the first reversal of scan that signal becomes positive to inhibit OR 328 and AND 330. If car 1 is a free car, or 328 inhibits AND 330 upson the first reversal of the allotter scan. Thus if the car service direction and the direction of scan are related so that it can be located and if the car is not a free car or if it is a free car but the first reversal of scan has not occurred a signal will be applied to the upper input of OR 327, inverter QG and the upper input of AND 329.

The positive free car signal at CLG1–12 enables AND 331. During the terminal portion of the allotter scan, that following the second reversal of scan direction, a positive signal is applied from AGC–20 to CLG1–13 and to the lower input of AND 331 so that a signal is passed through inverter QF to OR 327, inverter QG and AND 329. Thus the upper input to AND 329 is inhibited for a car when it is not suitably conditioned relative to scan direction for assignment and in the case of a free car between the first and second scan reversals.

Coincidence of car lead position and allotter scan position when sensed in the allotter coincidence circuit of FIG. 7 is indicated by a negative signal at ACC1–1 to CLG1–16 and the upper input to AND 332. The allotter scanner clock issues from ASC–24 inhibiting positive signals during its advance to avoid false responses. These signals applied at CLG1–14 are applied to the lower input of AND 332 so that that gate will pass a signal only during quiescent conditions of the car lead position-scan position coincidence. When the signal is passed, it activates OR 333 and, through inverter QH, appears as an enabling signal on the middle input of AND 329.

During the active portion of the allotter scanner cycle the reset terminal ASC–39 issues a negative signal to CLG1–17 which is inverted by QO to an enabling signal applied at the lower input of AND 329. Upon reset of the allotter scanner an inhibit signal is applied to AND 329 by this circuit. Thus during an active scan, when the scan position coincides with the car lead position, and when the scan is in a proper relationship to the car service condition to assign the call AND 329 passes a signal through inverter QI to latch OR's 327 and 333 over lead 334, and through inverter QJ to the car located output CLG1–11, and inputs of AND's 335, 336 and 337.

The positive signal at CLG1–11 is passed to ISG–3 of FIG. 9 to inhibit AND 316, thereby stopping the accumulation of counted calls in intermediate stops counter ISC. AND 335 enables a latch signal to the distance register gating circuit DRG when activated. AND's 336 and 337 enable an advance signal for the free car distance register FDR. When the car is not in its "free car" status the negative signal at CLG1–12 is inverted by inverter QS to an enable signal to AND 335 so that a signal from AND 335, inverted by QM activates OR 338, which passes an enable signal to AND 339 through inverter QN. AND 339 passes the "active car located signal" provided the allotter scanner is not being reset, since the negative signal from ASC–39 to CLG1–17 is inverted by Q15 and applied to its lower input. The positive signal from AND 339 is inverted by inverter QP and employed to latch OR 338 to hold the signal until the allotter scanner is reset. It also inhibits AND 337 and is issued at CLG1–15 to DRG–11 to the distance register gating circuits DRG.

OR 338 can also be activated by AND 336 when a free car is found by the allotter prior to the first scan reversal so that AND 339 is operated until the allotter scanner preset inhibits it. This also issues a signal to the distance register gating and an inhibit to AND 337.

AND 337 when gated passes advance signals to free car distance register as positive signals inverted twice in QQ and QR and then issued from CLG1–10 to FDR–24. Five coincident conditions are required to gate AND 337: (1) no car located signal should be issued from AND 339 for either a found "active car" or a "free car" found prior to the first scan reversal; (2) two scan reversals must have occurred during the current scan cycle to impose a positive signal at CLG1–13; (3) a car located signal must be issued by AND 329; (4) the car must be a free car; and (5) the scan advance must be completed by the scanner clock to issue a positive signal to CLG–14. Since the scanner clock alternately imposes an inhibit and a gating condition on AND 337, upon the coincidence of all other conditions, AND 337 applies advance pulses to the free-car distance register gating circuit until the scanner is reset whereby the counter in that circuit is advanced to count the number of landings between the position of the free car and the location of the call to be assigned.

The upper portion of the car locating and gating circuit shown in FIG. 10 including circuits associated with terminals CLG1–1 to CLG1–9, CLG1–25, CLG1–26 and CLG1–47 is concerned with the control of the assignment of a call to the car. As will be discussed, a ramp signal which increases generally linearly with time is employed as a standard against which all summed service capability signals are compared simultaneously. When coincidence is achieved between a summed signal and the ramp, the car of that signal is assigned the call currently under consideration by the allotter. The ramp is generated in a section of the intermediate stops gating module of FIG. 11 and issues from ISG–19 to CLG1–2, and to the comparator of each car. That signal is passed to comparators other than that of car 1 on lead 341. The sum signal to the comparator of car 1 is supplied by an operational amplifier shown in FIG. 12 connected to CLG1–1. Similar sum signals are supplied to each car's comparator from that car's signal summing circuit and operational amplifier.

When a coincidence in the level of the sum signal and the ramp signal occurs, a negative signal is developed by the comparator and applied to OR 342 and through inverter QT to AND 343. A start ramp signal developed in the allotter gating circuit AGC of FIG. 14 as a negative signal is applied from AGC–11 to CLG1–3 for all cars. It is applied to OR 344 for car 1 and by lead 345 to similar OR's for each of the other cars. OR 344 issues an enabling signal to AND 343 through inverter QSS in response to this start ramp signal. When the allotter scanner has advanced a number of positions equal to the number of landings to be scanned (twice one less than the total number of landings) and has completed a scan, allotter gating circuit AGC issues a positive signal at AGC–24 to CLG1–4 and AND 343. If the car is not unavailable for the reception of a call assignment, as where it is not overloaded to apply a positive signal to CLG1–25 or is not parked at the main or lobby landing to apply a positive signal at CLG1–26, OR 343A applies no inhibit signal through inverter QAA to the upper input of AND 343. AND 343 latches OR's 342 and 344 through inverter QU and issues a "car assigned" signal as a negative signal at CLG1–5 connected to the allotter gating circuit at AGC–7.

The call under consideration by the allotter is assigned to the appropriate demand memory of car 1 by the positive enabling signal from the car locating and gating circuit at CLG1–8 for an up call and CLG1–9 for a down call. These signals are derived from AND's 346 and 347 respectively for up and down calls. Each of these AND's requires a "car assigned" signal at its upper input and a cal finder ring counter inhibit signal at its middle input to indicate no further advance by the ring counter as derived from AGC–22 and applied to CLG1–47 and RCG–41. If the landing call under consideration is an up call, AND 346 is gated by these conditions by the positive enabling signal from ASC–45 to CLG1–6 and the lower input of AND 346 to issue a signal to CLG1–8. If it is a down call, AND 347 is enabled under these conditions by the positive signal from ASC–47 to CLG1–7 to issue a signal to CLG1–9.

As noted for the call finder ring counter, an interlock is provided between the ring counter and the allotter to prevent the allotting of a call while the ring counter is hunting a call and to prevent the ring counter hunt while the allotter is functioning. The input at CLG1–47 provides this interlock in the allotter call assignment function by imposing a negative signal to inhibit AND's 346 and 347 until the allotter scanner preset is completed. This inhibit signal is developed in the allotter gating circuit AGC of FIG. 14 at AGC–22 in response to conditions in the ring counter gating circuit at RCG–20 and in the allotter scanner circuit at ASC–39. The AGC circuit is arranged to gate a negative OR 417 over an interval beginning with the "call to be found" signal in the RCG circuit and remaining until the allotter scanner preset is concluded and the allotter scan initiated in the ASC circuit.

It should be noted that the "distance count" signal indicative of the completion of an allotter scan is applied to an AND for each car corresponding to AND 343 by means of lead 348. The call finder ring counter, advance signal is passed to the other cars on lead 349. The up or down nature of the call being allotted is indicated to the other car's CLG circuits by leads 351 and 352. Allotter scan direction is conveyed to each car's CLG circuits by leads 343 and 354 while the "zero reversals of scan" and "two reversals of scan" signals are passed to the other car's CLG circuits by leads 355 and 356. All other cars receive "allotter scanner reset" signals over lead 357 and "allotter scanner clock advance" signals over lead 358.

*Description of FIGS. 11 and 12*

After the scan has been completed, a "start ramp" signal is applied to the ramp generator of FIG. 11 at ISG–23. This signal is negative and maintained until a car is assigned. During the maintenance of the signal the output at ISG–19 increases with time. This signal source is common to all cars. It is arranged to develop an essentially linearly increasing level with time determined in accordance with the time constants of the circuit including condenser 358 and resistances 359 and 361.

The sum signal from the several service capability evaluation circuits as combined on lead 300 are matched to the comparator of the car locating and gating circuits typified in FIG. 10 by an operational amplifier 371 which supplies the comparator through CLG1–1. The input signal on lead 300 is a sum of currents derived from sources of fixed voltage through resistances selected in accordance with the weight to be attributed to the service capability evaluation factors and the degree of significance of the several levels for each factor. Thus as discussed with respect to the total stops gating circuits TSG1 and TSG2 and the intermediate stops counter ISC of FIGS. 8 and 9, resistances of various magnitudes are coupled to lead 300 to add current in an amount indicative of the weight to be given those factors. Similarly, as will be discussed the distance register gating circuit of FIG. 13 is capable of adding current to lead 300 in an amount dependent upon the number of landings between the car and the call.

The operational amplifier 371 responds to the changes in current on lead 300 through the negative feedback provided by resistances 372 and 373 such that its output tends to maintain a constant voltage at input 374. The remaining terminals are the supplies for the amplifier as indicated by the legends −24 v., COM., and +24 v.

The separation of a free car from the landing of the call to be assigned is introduced as a factor by the free car distance register FDR of FIG. 12. That circuit is a four stage binary counter in the ten landing system under consideration since the maximum count which it might sense is nine. The counter is of conventional form and therefore has not been ilustrated. Further, alternative forms of known counters might be employed. As described with respect to the car loading and gating circuit, the free-car distance register receives driving advance pulses from CLG1–10 to CDR–24, if its car is a free-car, if the free-car is not located prior to the first scan reversal, and if the scan has advanced to the second reversal, between the scan position at which the car is located and the termination of the allotted scan. The count accumulated is represented in the usual binary manner as current through resistances 375, 376, 377 and 378 connected between terminals FDR–23, FDR–22, FDR–21 and FDR–20 and lead 300 for counts of 1, 2, 4 and 8 respectively. In order to properly reffect as current level contributions on lead 300, the resistances 375, 376, 377 and 378 are related in a proportion inverse to the count they represent as eight, four, two and one times the resistance of 378 respectively. Reset of the free car counter at the initiation of an allotter scanner function is accomplished by a positive signal from ASC–39 to FDR–3 and the reset of each counter stage.

Free car distance is measured in the distance register gating circuit of FIG. 13 when the free car is located before the first scan reversal as described with respect to FIG. 10. A preference for the assignment of calls to free-cars over active cars is inherent in the system since by definition a free-car has no calls assigned and normally has no load applied. As among free-cars, that free-car closest to the call either above or below the call will have a preference in assignment.

Car loading is also significant as a factor for revaluating service capability. While a number of techniques are known for ascertaining car loading including passenger counters, loading distribution over the cab floor, photoelectric scanning of the cab interior, and weighing the cab structure, the latter technique has been chosen for purposes of illustration. Load switch 379 is of conventional form and may be located between the cab and sling for the car. It responds to several levels of loading of the car by transferring grounded movable contact 381 to contact 382 for a 50% of capacity load, 383 for a 75% of capacity load, and 384 for a full load. Since the loading is cumulative on the load switch, the resistances 385, 386 and 387 are connected to lead 300 in parallel and are representative of the effect of the next increment of load upon the service capability of the car. In one utilization resistance 385 for the increment from 0 to 50% of capacity is approximately one-half that of resistances 386 and 387 so that it has twice the effect on the current as the other resistances of the group.

*Description of FIG. 13*

Another factor incorporated into the analog signal addition on lead 300 is the spacing of the car from the call being allotted. This signal is developed in FIG. 13 by the distance register gating DRG based upon signals derived from the distance counter DC to be described with FIG. 14. The distance register gating responds upon location of a car providing normal service or a free car located prior to the first reversal of the allotter scan to record for the allotter the number of scan steps counted from the call location to the car location. This information is gated at the time the car is located and the gates are latched throughout the remainder of the allotter operation by DRG. Each car has a DRG circuit.

The distance counter DC in the present example is a five stage binary counter which has outputs for the counts of 1, 2, 4, 8 and 16 at AGC–2, 3, 4, 5 and 6 respectively. These are coupled to the distance register gating at DRG–1, 2, 3, 4 and 5 for counts 1, 2, 4, 8 and 16. Two AND gates are provided for each count level. The first AND's respond to the initial "car located and conditioned for distance counting" signal as issued at CLG1–15 as a negative signal which is sustained until the allotter is reset. This signal is passed by blocking capacitance 388 and inverter 389 to enable any of AND's 391 to 395 having a count signal from DC. For a one count, for example, AND 391 gates a positive signal to OR 396 and inverter 397 to AND 398. AND 398 sustains the count developed at the time the car is located even though the distance counter DC continues to advance its count to the end of the allotter scan since the "car located signal" at DRG–11 is sustained at its lower input and a latch signal is provided through inverter 399, back to OR 396. Thus the output resistances 401, 402, 403, 404 and 405 between terminals DRG–6, 7, 8, 9 and 10 and analog signal summing lead 300 for counts of 1, 2, 4, 8 and 16 respectively, are grounded to provide the current drain appropriate for the distance count. As in previous analog signal generating resistances the magnitudes of resistance relative to the 16 count resistance 405 are twice, four times, eight times, and sixteen times for counts of 8, 4, 2 and 1 respectively.

*Description of FIG. 14*

The allotter gating circiut AGC shown in FIG. 14 is common to all cars. It supplies the "start ramp" signal for the ramp generator and car locating and gating circuits, the scan reversal signals delineating zero reversals and two reversals of scan direction, the call finder not running signal to the car locating and gating circuits, the distance count signals for the distance register gating circuit, and the end of scan signal for the allotter scanner and the car locating and gating circuits.

The interlocking of the allotter and the call finder to prevent call assignment by the allotter during the hunting of the call finder and to prevent the hunting of the call finder during the operation of the allotter subsequent to the allotter scanner preset is accomplished at terminals AGC–23, –22 and –13. At the initiation of a call finder-allotter operation, the registration of a call causes a "call to be found" signal to be issued as a positive signal at RCG–20 of FIG. 2. This signal is applied to AGC–23, is inverted by inverter 416 and gates OR 417. OR 417 issues a negative signal through inverters 418 and 421 to AGC–22 and RCG–41 thereby gating AND 116 to cause the ring counter gating to enable the clock of the call finder ring counter FIG. 3. OR 417 also issues a negative signal to CLG1–47 to inhibit the allotter AND's 346 and 347 of FIG. 10 thereby preventing the assignment of a call to any demand memory. OR 417 has latch which is released only when the allotter scanner is preset.

When the call is found by the call finder, the positive signal applied to AGC–23 is removed. However, the signal gated to inverter 418 by OR 417 is applied to AND 415 to hold that AND gated as long as no allotter preset signal is issued from ASC–39 to AGC–13. With no allotter preset signal, AGC–13 is negative and inverter 412 passes a positive signal to AND 415. AND 415, initially gated by the "call to be found" signal, remains gated until the allotter preset applies a positive signal at AGC–13. This inhibits AND 415 removing the latch it supplied to OR 417 and since the call has been found OR 417 ceases to be gated. The resulting positive signal at AGC–22 inhibits the call finder ring counter clock and enables the call assigning AND's 346 and 347.

The scanning direction currently set in the allotter scanner is imposed on AGC as a positive signal for up scan from ASC–26 to AGC–15 and a positive signal for down scan from ASC–25 to AGC–16. An up scan setting actuates OR 406 to the upper input of AND 407 and a down scan setting actuates OR 408 to the lower input of AND 409. AND's 407 and 409 each respond to a reversal of scan to actuate AND 411 upon the second scan reversal.

Upon initiation of the scan, the allotter scanner preset is released to apply a negative signal from ASC–39 to AGC–13 and inverter 412 which passes an enabling signal to AND's 413, 414 and 415. AND 415 is enabled in the latch functions for the call finder ring counter interlock with the allotter.

The release of the preset signal to AND's 413 and 414 at the beginning of the scanner clocking immediately gates that AND for the current scan direction. An ascending scanning reference direction is signified by a positive signal from ASC–42 to AGC–12 and OR 422 while a descending scanning reference direction applies a positive signal from ASC–41 to AGC–14 and OR 423. Both of AND's 413 and 414 are latched by the feedback through inverters 424 and 425, lead 426 and OR 422 for AND 413 and through inverters 427 and 428, lead 429 and OR 423 for AND 414. Upon completion of the first reversal of scan, both of AND's 413 and 414 are gated to gate AND 431. This develops an inhibition on the "zero reversal" signal through inverters 432 and 433 so that the negative "zero reversal" signal at AGC–18 is supplanted by a positive signal throughout the remainder of the scan cycle.

At the time of the first reversal of scan the inhibit on AND's 407 and 409 is removed so that that AND for the current scan direction is gated, as through OR 406 to AND 407 for an up scan or through OR 408 to AND 409 for a down scan. Once gated these AND's are latched for the remainder of the scan cycle through the inverters 434 and 435 to lead 436 and OR 406 or the inverters 437 and 438 to lead 439 and OR 408. The second reversal of the scan gates the second AND of 407 and 409 to apply enabling signals to both inputs of AND 411 whereby a positive "two reversals of scan" signal appears at AGC–20. As explained above these reversal of scan signals are employed in the car locating and gating circuits to enable the car locating signal and the free car distance register drive signal.

Termination of the allotter scan is determined by the number of advancing pulses generated. For a ten landing structures eighteen advance pulses are required to complete a scan, these being composed of up calls at landings 1 to 9 and down calls at landings 2 to 10. Generally the scan can be equated to the number of landing calls to be scanned, normally the number or landings is less one times two. The distance counter DC is utilized to ascertain the termination of the scan and to identify the number of landings between the call to be allotted and the car.

Pulses from the allotter scanner clock at ASC–24 are applied to AGC–1 and the advance input of the first flip flop FF–1 of the five stage binary counter DC. Each pulse causes an inversion of FF–1. Similarly, the output of FF–2 represents a count of two, that of FF–3 a count of four, that of FF–4 a count of eight, and that of FF–5 a count of sixteen. These counts appear respectively at AGC–2 through AGC–6 to represent the current count of the allotter scanner and thus the number of landings scanned from the landing for which the call subject to the allotter is registered. The count is represented at any instant to the distance register gating circuits of the cars by the states of FF–1 through FF–5. This count is used to gate on latching circuits in DRG when the car is located.

The count of eighteen, significant of a complete scan cycle in which all possible up and down stops are scanned in a ten landing structure is derived from distance counter DC through AND 441 by the coincidence of an output from FF–2 and FF–5 representative of the sum of a two count and a sixteen count. AND 441 is employed in marking the end of the allotter scan by issuing through the inverters 442 and 443 a positive signal to terminal AGC–24 and to "start ramp" AND 444. The signal at AGC–24 is passed to ASC–38 to the reset circuitry in the allotter scanner imposing an inhibit on AND 214 and gating OR's 225 and 226 to activate the total stops gating. It is also passed to CLG1–4 and CLG2–4 to enable AND 343 for each car whereby the "car assigned" signal can be issued upon coincidence of the ramp signal with a service capability analog sum signal for one of the cars.

AND's 343 in the car locating and gating circuits receives a "start ramp" signal from AND 444 when none of the car locating and gating circuits are issuing a "car assigned" signal from CLG1–5 to AGC–7, CLG1–35 to AGC–8, CLG2–5 to AGC–9, and CLG2–35 to AGC–10 for cars 1 to 4 respectively, when the eighteenth scanner count gates AND 441, and when a suitably delayed signal responsive to the eighteenth count has been passed by delay circuit 445. A coincidence of these conditions causes AND 444 to gate a positive signal which is inverted to a negative signal by inverters 446, 447 and 448 and passed to AGC–11 as a "start ramp" signal for the ramp generator as ISG–23 and AND's 343 at CLG1–3.

*Demand memories*

The assignment of a landing call by the allotter results in the introduction of that call into the appropriate demand memory for the car. Each car has a set of demand memories which develop and retain signals employed in the car drive logic until the call has been answered or until the service capability of the car has been altered to a degree indicating an impairment in its ability to serve the call. In the illustrative embodiment the demand memories have been modularized so that up and down memories for each landing except the terminals are combined in a signal module. This permits a single signal to be developed for both up and down demands where required for a given landing. The signals from demand memories are applied to the allotter in order to indicate the assignment of service requirements during the evaluation of the car's service capability. Once a demand memory is activated, it locks out operation of the call finder and allotter to subsequently registered landing calls for that landing and service direction. They are also applied to the car drive logic to control the start and stop of the car. Signals are applied to the demand memories from the call finder and the call memories to identify a call to be assigned, from the allotter to define the assignment of up and down calls, from the command memories under certain circumstances to indicate a coincidence of a car call for the landing when the car is set for the service direction of the landing call, and from the call reset gating for resetting the demand memories in response to the answering of the call by the car.

The demand memory for the terminal landings is similar to that for the other landings except that the output signals to the car drive logic circuits are maintained separate.

The demand memories typical for a car are illustrated in FIG. 15 including logic diagrams for those for a typical landing intermediate the terminals, and for the terminal landings, together with a dot-dashed rectangle representative of the demand memories for a second landing.

*Description of FIG. 15*

Registration of a landing call in its call memory as shown in FIGS. 2 or 3 coupled with the selection of the call by the call finder results in the imposition of a signal on the corresponding demand memory for each bar. Thus an up landing call for the ninth landing causes a positive signal to issue from CM9–12 to DM9–4 and the lower input of AND 451 in the ninth demand memory of each car. The allotter as an incident of its allotting function removes the inhibit signal from all of the assigned car's up demand memory AND's corresponding to 451 by a positive "assigned up call" signal from CLG1–8 to terminal 5, in this case DM9–5. AND 451 when gated passes a positive signal to inverter 452 which advances a gating signal to OR 453. The gated OR 453 actuates flip flop FF–9U through inverter 454 whereby a positive signal is issued to an associated driver to operate indicator lamps (not shown), and to OR 455. OR 455 issues signals to the direct drive car logic circuits and the allotter. Flip flop FF–9U produces a negative signal on its second output lead at DM9–8 to provide "an up demand present" signal in the call reset gating circuit at CRG9–7 for car 1.

A down landing call at the ninth landing in a similar manner gates OR 456 to issue demand memory signals to the direct drive car logic and allotter. It applies an enabling signal from call memory at CM9–8 to AND 457 which is gated by the removal of its inhibit signal when the "down call assigned" signal for car 1 is issued by the allotter at CLG1–9 to CM9–19. Inverter 458 gates OR 459 which triggers flip flop FF–9D through inverter 461. When the ninth down demand flip flop FF–9D is triggered, it actuates a driver to DM9–16 and a negative signal to DM9–1 to provide a "down present" signal in the call reset gating circuit for that landing at CRG9–12 for car 1, and gates OR 456.

Either an up or a down demand memory signal for the ninth landing gates OR 462 from OR's 455 or 456 to provide a signal to the direct drive car logic through inverter 463, DM–9 and DD1–15. An up demand produces a signal through inverter 464 and terminal DM9–6 to DD3–14 and the allotter total stops gating circuit of car 1 at TSG1–14.

Entry of a command for a car can cause subsequently registered landing calls to be directly assigned to that car as demands without operation of the call finder and allotter. Such landing calls are directly applied from the call memories to the demand memories and are gated into those memories at AND's 466 and 467 if an enabling command is registered and a negative enabling signal is present on lead 465. A selector switch to lead 465 provides constant lockout of direct assignment in its upper position, car load control of lockout at its middle position wherein a load actuated switch is opened from ground to apply a negative signal at same predetermined load level, e.g. 90% of capacity, and a constant enabling of direct assignment in its lower position. It is to be appreciated that other service conditions within the system can readily be employed to enable the direct assignment of landing calls by a negative signal or to inhibit by a positive signal applied to lead 465. Thus under direct assignment of landing calls unnecessary assignments of calls and unnecessary stops of the cars are avoided. This type of operation is particularly desirable as the system approaches its capacity since the slight delays in response which may be introduced by the more intense use of individual cars is compensated for by the more efficient utilization of the system.

As will be more fully set forth below an overloaded car releases demands for which there are no corresponding commands. Under such conditions the system will ordinarily have the loads so distributed that all effective elevators are at or near the overload condition. Thus it is assumed that if a car is assigned to stop for a command it will lose at least one passenger at the landing and will therefore be able to accommodate at least one passenger from the landing. A landing call is assigned directly to a car having a command under overload conditions as the best means of serving that call under saturated or near saturated conditions for the system.

As will be described with respect to the command memories, a car call for a landing has no direction preference. If, however, the car is set for a given service direction a negative signal having a service direction setting is issued from the command memory. Thus, a ninth landing command for an up car issues a signal at COM5 and for a down car issues a signal at COM5–6 to AND's 466 and 467 respectively. Under the condition that direct landing call assignment is not inhibited and a command is registered in a car set for a given direction, as a ninth command in car 1 when that car is set for up service, the registration of an up ninth landing call as a negative signal from CM9–19 to DM9–3 gates AND 466 to trigger flip flop FF–9U. The resulting signal to inverters 468 and 469 gates OR 453 with the same results as the registration of an up ninth landing call assigned by the allotter through AND 451.

Once a demand is registered by the operation of a demand memory flip flop, either through the direct demand assignment of a command or by the call finder and allotter assignment of a landing call, further assignments are inhibited by the signals from the flip flops, as at DM9–8 for a ninth up demand and DM9–1 for a ninth down demand. This inhibiting of the call finder and allotter is accomplished by the call reset gating of FIG. 4 at the inputs to OR's 173 and 174 and in the ring counter gating for the call finder ring counter as shown and described for FIG. 2.

Reset of the demand memories upon the response of the car to the landing call as by stopping at the landing while set to provide service in the call direction is accomplished in the call reset gating circuit of FIG. 4. In the case of a ninth demand, the reset signal, a positive signal, is issued by OR's 175 and 176 for up and down demands respectively at CRG9–3 and CRG9–2 as described for FIG. 4. Those signals are applied through DM9–10 and DM9–13 to flip flop reset OR's 471 and 472 respectively and are passed by inverters 473 or 474 to OR's 475 or 476 and inverters 477 or 478 to the reset inputs of FF–9U or FF–9D respectively. Once the flip flops are reset they remove the call finder inhibiting "demands present" signal at DM9–8 and DM9–1 whereby subsequently registered landing calls for the ninth landing can institute the call finder and allotter functions.

Demand memories pass both command and demand assignments to the direct drive modules of the car logic and the total stops gating of the allotter at terminals 6 and 18. However, the reallotting functions are applied only to the demands and only in the case there is no corresponding command for the car. Therefore the demands are reset separately while command signals are sustained in the demand memories.

Registration of a command results in a negative signal at DM9–2 for an up nine command and at DM9–22 for a down nine command. This signal is passed by inverter 479 or 480 directly to OR 455 or 456. It is sustained by the command memory and is reset with the command memory. Thus the demand can be reset apart from the command.

Several modes are available for resetting the demands as outlined above. The response of the car to the demands by stopping at the landing of the demand while set for service in the direction required of the demand results in a reset from terminal DM9–10 or DM9–13 to OR's 472. A demand can also be reset from the command memory by a posiitve signal from COM5–13 to DM9–11 when reset conditions prevail and no command is registered for the landing. This signal also functions through OR's 471 and 472 to reset flip flops FF–9U and FF–9D.

Another reset of the demands is caused to function by an excessive delay in response to a registered call. A time delay TD–9U is activated upon registration of an up ninth landing call as a negative signal from CM9–19. Similarly, every other landing call has an associated time delay as represented in FIG. 15. The time delays are adjusted by the magnitude of resistance to ground set in adjustable resistor 481. At the end of the time interval defined by the time delay a positive signal is issued to inverter 482 which passes a negative signal to OR 475 in the reset circuit for flip flop FF–9U. This time interval in the exemplary system has a range of from 40 seconds to 2 minutes. Thus if the landing call is not cancelled, in a manner to be described, within the interval of the time delay associated with its calling registering device, the demand memory is cancelled and the call is again hunted by the call finder and alloted to the car most favorably conditioned to serve it.

*Command memories*

Each car is provided with a command memory for each landing which it serves. A command memory stores a call registered in the car until it has been served. Since commands are not directionally selective, the command memory circuit module employed in the illustrative embodiment accommodates commands for two landings. Thus five modules are employed for each car serving the ten landings of the structure. Input signals for the command memories include the positive going signals from the call button within the car and service direction signals from the car's start stop logic, to be discussed. Command memory reset is derived from the call reset circuits when the car call has been served by the car. Registration of a command results in both positive and negative output signals indicative thereof as well as signals signifying the registration and the service direction setting of the car as utilized in the previously described demand memories. The command memories also reset the demand memories in case the car is overloaded unless a command is registered for a landing at which a demand is registered.

*Call reset*

In the present embodiment calls are cancelled by the closing of the doors of a car while at the landing of the call. It is to be understood that other call cancellation criteria might be employed such as the opening of the doors or the coincidence of car lead poistion with the landing for which the call is registered. However, early call cancellation is not dictated by the considerations of prior art systems since the individual assignment of calls to cars diminishes the importance of cancelling the call inasmuch as other cards will not respond to that call as they would in systems relying on a coincidence of lead position with the call location for the assignment of the call.

Call reset signals are generated in circuits individual to the cars. In the example, the rest circuits are arranged in modules for five landings. Thus, call reset CR–2 corresponds to call reset CR–1 except for the landings controlled.

The call reset signals are applied directly to the command memories and indirectly to the call memories and demand memories through the call reset gating circuits of FIG. 4.

*Description of FIG. 16*

FIG. 16 illustrates a typical call reset circuit module and a typical command memory module presented in logic diagram form. It includes a dot-dashed rectangle representing a second call reset module and thus a complete call reset circuit for one car serving the ten landings. Only one command memory is shown, that for the fifth and sixth landings, COM3. It is to be recognized that a ten landing system includes four additional command memory modules for the first through fourth landings, COM1 and COM2 and the seventh through tenth landings COM4 and COM5.

Car calls for landings are registered on button actuated switches located on control panels in the cars. They are identified by the prefix C and the number of the landing for the typical car, as C6 and C5 for the sixth and fifth landings. Operation of C5, for example, triggers flip flop FF–5 through input terminal COM3–3 to produce a negative signal on COM3–8, the upper input of AND's 483 and 484 and the lower input of AND 485 and a positive signal on COM3–4 and the driver for call registered indicator lamp C5L connected at COM3–1.

If the car is set for up service, a negative signal is applied from lead 486 to COM3–9 and the lower inputs of AND's 483 and 488. AND 483 is gated and issues a "fifth up command" signal at COM3–7. A call at C6 would similarly gate AND 488 to issue a "sixth up command" at COM3–10. A down car develops a negative signal from lead 487 at COM3–12 and the bottom input of AND 484 and 489 to issue "down commands" at COM3–6 and COM3–15 for the fifth and sixth landings.

Each command entered in a command memory is passed to the car logic through the car's demand memory for the corresponding landing. This is accomplished by coupling up commands at COM3–7 and COM3–10 to demand memory inputs DM5–2 and DM6–2 respectively. Down commands at COM3–6 and COM3–15 are coupled to demand memory inputs DM5–22 and DM6–22 respectively.

In the case of car overload, all demands for which these are not corresponding commands in the car are reset by reset of the demand memories and are reassigned from the call memories through above described call finder and allotter sequence. A load switch, which may be set at a suitable level such as 100% load, when actuated by the car load develops a positive signal on lead 490 to all command memories for the car as to COM3–14 and the upper inputs of AND's 485 and 491. If a command is in registration, an inhibit signal will appear on the lower input of the corresponding AND 485 and 491 and no positive signal will be gated. If no command is registered the AND will be gated and a positive demand reset signal will issue.

In the case of the sixth landing the demand reset signal will pass from COM3–16 to DM6–11 and the OR's 471 and 472 of the demand memory for the sixth landing for that car to the resets of FF–6U and FF–6D, to reset the demands for the sixth landing.

If a command were registered at the time the car became overloaded the demand for the landing would not be cancelled since the negative "command registered" signal as from FF–6 to the lower input of AND 491 would inhibit the AND and prevent the issuance of a "demand reset" signal at COM3–16.

The call reset CR–2 of FIG. 16 receives car lead position signals from the car control (not shown) to indicate the car's effective position when in motion or set to move and its actual position when stopped. Cancellation of a call is accomplished at the car lead position as the car door is closed as indicated by a "door closed" signal at CR2–29 to each lower input of AND's 492 to 496. Commands are reset directly through the reset lead of the flip flop in the command memory. Thus a command for the sixth landing is reset as the car closes its doors while stopped at the sixth landing since a signal from LP–6 to CR2–30 coupled with a "door closed" signal at CR2–29 gates AND 492 so that a double inversion occurs at inverters 497 and 498 to pass a positive reset signal from CR2–15 to COM3–17 and flip-flop FF–6 reset input. Similarly resets are issued to command memories for landings 7 to 10 from terminals CR2–14, 13, 12 and 11 respectively.

Demand reset signals are direction selective as issued by the call reset. Thus a car set for up service will cancel only the up demand for the landing at which it is stopped. Car direction signals appear on leads 486 and 487 for up and down service settings and are applied at CR2–9 and CR2–10 respectively. Thus while a car is on the down service setting AND's 499 to 503 are enabled and on up service AND's 504 to 507 are enabled. A car set for up service stopped at the sixth landing issues a command reset signal to the upper input of AND's 499 and 504. AND 504 is gated by its up setting to pass a negative signal from CR2–16 to CRG6–16 to 19 for cars 1 to 4 depending upon which car has the call reset. If the car had been set for down service, AND 499 would have been gated and the reset signal would appear at CR2–8 and be passed to CRG6–20 to 23.

It will be noted that the call reset will issue reset signals to both the command memory and the call reset gating and thus can rest command memories, demand memories and call memories simultaneously.

*Car drive circuits*

Each car is provided with drive logic controls to develop start and stop signals for the car controls which enable the car to serve its assigned command and demands. Those drive logic controls can be considered from the standpoint of the setting of the car service direction relative to the location of the call to be served such that the car runs upward for any calls above it or downward for any calls below it in accordance with direct drive controls. The running of the car in the direction opposite the direction in which service is called for utilizes inverse drive controls. Thus travel direction and service direction need not be the same. This distinction becomes significant with respect to the functions of the allotter since the allotter considers a car's service direction. A car running downward to serve a lowest "up call" 'will be viewed as an up car by the allotter and even though adjacent and traveling in the direction of the call to be assigned will be considered as spaced therefrom by the range of travel it is required to traverse to meet its service assignment.

Four direct drive circuits and two inverse drive circuits are employed for each car. The first and second direct drive circuits, DD1 and DD2, are employed to generate signals characteristic of any call above the car and any call below the car respectively and any memory for the car having a call in registration. These circuits receive signals from the demand memories of the car and car lead position signals. They cause a car to continue in the direction it has been traveling until it has reached the extreme command or demand in that direction. Thereafter it can become a free car, or if it has demands for the opposite service direction, or if it has commands or demands located toward the opposite limit of travel it will reverse automatically to accommodate the commands or demands.

The third and fourth direct drive circuits, DD3 and DD4 relate car position to location and direction of demands such that they issue signals for up demands at or above the car in DD3 and down demands at or below the car in DD4. The inputs to these circuits are from the car lead position and the demand memories for the car.

The inverse drive circuits ID1 and ID2 issue signals for an up demand at the car position but no up demands below that position and a down demand at the car position but no down demand above that position.

Each of the drive circuits issues signals to the start-stop logic of the car from which it is applied to the car control.

*Description of FIGS. 17 and 18*

Direct drives DD1 and DD2 are shown in FIGS. 17 and 18. Each accumulates demand signals for both up and down demands by cascading OR gates such that the first OR responds to demands at two landings and each successive OR responds to a demand at those preceding landings and the next succeeding landing. The accumulation is in a descending order for DD1 and in an ascending order for DD2 so that OR's in DD1 respond to any demand for a landing above the sampled output while in DD2 the response is to any demand for a landing below the sampled output.

The common demand outputs for either up or down demands or commands from terminal 15 of the demand memories for landings 2 through 9 and terminal DM1–18 for the down demand and command memory for the tenth landing are connected to terminals DD1–22 to DD1–14 respectively and thence to the inputs of OR's 511 to 518. Thus a tenth demand or command gates all of OR 518 to 511 and enables all of AND's 519 to 527; a ninth demand or command gates all of OR's 518 to 511 and enables AND's 520 to 527; an eighth demand or command gates OR's 517 to 511 and enables AND's 521 to 527; and so forth until a second demand or command gates only OR 511 and only AND 527. The lead position of that car which DD1 controls is applied to DD1 as negative signals at DD1–3 to DD1–12 for landings 1 to 9 respectively and to the lower inputs of AND's 527 to 519 respectively. Since the presence of a command or demand above any OR causes the gating of that OR and the enabling of its associated AND, if the car is effectively at the fifth landing so that LP5 applies an enabling signal through DD1–7 to AND 523 and there is any demand or command for the car for a landing above the fifth for the sixth to tenth landings, OR 515 will gate AND 523 and pass a "call above the car" signal to OR 528. The positive signal input to OR 528 is provided by inverters in each of the leads between the AND's 519 to 527 and the OR 528. It is inverted to a negative "call above to car" signal at DD1–2 by inverter 529. The negative signal from cascaded OR's 511 to 518 appearing at DD1–24 indicates a demand or command present for any of landings 2 through 10.

FIG. 18 corresponds to FIG. 17. The second direct drive DD2 issues a signal at DD2–24 if an up demand or a command for the first landing or a command or an up or down demand for the second through ninth landing is assigned the car. DD2 issues a signal at DD2–2 if any command or up or down demand assigned the car is registered below the car.

OR's 531 to 538 are respectively connected directly at DD2–22 to DD2–15 to the demand memory outputs at their terminals 15 for landings 9 through 2 to respond to a command, or up or down demand for the car for those landings. They are also cascaded from all lower numbered OR's of the series so that any call below will gate them. OR 538 is also connected to the first landing command and up demand memory through DM1–6 to DD2–14.

Effective car position is correlated to call location by AND's 539 and 547 by means of car lead position signals for landings 2 to 10 applied to DD2–12 to DD2–3 respectively and the lower inputs of AND's 539 to 547 respectively. The upper inputs to AND's 539 to 547 are supplied by the call below outputs from DD2–14 for the first landing and OR's 538 to 531 for the second to ninth landings. When a call is registered below the car, the AND for its lead position is gated to gate OR 548 and issue an "any call below the car" signal. Thus if a call were present at the third landing to apply a negative signal to DD2–16, OR 537 and all lower numbered OR's of the series would be gated to enable AND's 541 to 547. A car effectively at the sixth landing would gate AND 543 and OR 548 so that inverter 549 would issue a negative "any call below the car" signal at DD2–2. On the other hand if the car were effectively at the second or third landing so that a lead position signal were imposed on AND 539 or 540 both AND's would be inhibited, unless another call was present at the first or second landing, and OR 548 would not be gated.

A command stop gating circuit SG3 is illustrated in the lower portion of FIG. 18. This circuit responds to a coincidence of car lead position with the registered commands for that car. Its output is employed in the "never pass a command" circuit of FIG. 23 of the car's start-stop logic SSL. In the start-stop logic the run of a car to a farthest call reversal is characterized by the direction of service to be provided the call rather than the direction of travel to the call. This is done to enable a car to make an "up stop" while traveling downward to a lowest "up" call and to lighten an "up" hall lantern at that stop. Such logic, in order to be compatable with other features, has been arranged to disregard calls assigned the car and encountered after the initiation of the farthest call reversal run. The "never pass a command" control overcomes this disregard of commands so that commands are answered on a farthest call reversal run.

In the circuit SG3 car position is indicated at odd terminals SG3–5 through SG3–19 for landings 9 through 2 respectively, the landings intermediate the terminals of car travel. These car position signals, LP–9 to LP–2 are each applied to an AND which also has a command signal for the corresponding landing applied from COM5–8, COM4–11, COM4–11, COM4–8, COM3–11, COM3–8, COM2–11, COM2–8 and COM1–11 at the even terminals SG3–4 through SG3–18 for landings 2 through 8 respectively. Gating of an AND produces a "car at command" signal by gating the OR command to the AND's so that it passes the signal through inverters to terminals SG3–2 and SG3–24.

*Description of FIGS. 19 and 21*

Direct drive circuits DD3 and DD4 are of a configuration similar to DD1 and DD2 in that they compirse a series of cascaded OR's with intermediate couplings to the inputs of AND's. The signals to DD3 and DD4 include car lead position inputs to correlate car position in the AND's with call location. However, the call inputs are directionally selective as supplied from demand memories at terminals 6 for up demands to DD3 and at terminals 18 for down demands to DD4. Further, the connections from the OR outputs to the AND inputs are from the OR of a given landing to the AND having a car lead position input for that landing whereby the AND's respond to "up calls at or above the car" or "down calls at or below the car" rather than "any call above the car" or "any call below the car" as in DD1 and DD2. DD3 and DD4 also correspond to DD1 and DD2 in signal polarities such that demand memory signals and car lead position signals are all negative, an inverter is coupled to the output of each AND and alternate OR's are provided with double inverters in order to obtain a suitable level of signal.

Up demand memory signals resulting from a command for the landing while the car is set to provide up service or from an up landing call for the landing assigned to the car for landings 1 through 8 as derived from DM1–6 to DM8–6 are applied to DD3–22 to DD3–15 and OR's 551 to 558 respectively while DM9–6 is connected to DD3–14 and to OR 558. Each of these demand signals and any demand signals below them is effectively connected to a respective AND of the series 561 to 569. AND's 561 to 569 are also supplied car lead position signals LP1 to LP9 at DD3–3 to DD3–10 and DD3–12 for landings 1 through 9 respectively. A signal at any up demand input gates the OR for that landing and all OR's for lower demands so that all AND's for that landing and landings below are enabled. OR's for landings above the highest up demand signal are inhibited as are the corresponding AND's. When the car lead position is below the landing for which the highest up demand is in registration, the AND for that lead position is gated and issues a signal through its inverter to OR 559 and inverter 560 to DD3–2. Thus, a seventh up demand gates OR 557 and all lower up demand OR's 556 to 551. If the car lead position is at the fifth landing, AND 565 is gated to OR 559 through its inverter so that a negative "up call at or above the car" signal is issued by inverter 560. Had the car lead position been at the eighth landing the enabling signal from LP8 to AND 568 would have been ineffective since AND 568 is inhibited from OR 558 and no "up call at or above the car" signal would issue.

Similarly, down demand memory signals are applied through DD4–15 to DD4–22 to OR's 573 to 580 for landings 3 to 10 respectively and from the output of each OR to an AND of the series 583 to 590 respectively. The second down demand at DD4–14 is connected to AND 582 and with the third demand to OR 573. Car lead position is signaled from LP2 through LP10 to DD4–12 and DD4–10 through DD4–3 and the lower inputs of AND's 582 through 590 for landings 2 through 10 respectively. In this manner the lowest down demand signal gates its corresponding OR and all OR's above it so that each AND associated with a gated OR is enabled and that AND corresponding to the car lead position is gated to output OR 571. The output signal, a "down call at or below the car" signal, is inverted to a negative sign at inverter 572 and appears at DD4–2.

Each of FIGS. 19 and 21 also includes a stop gating circuit SG1 and SG2 for up and down stops of the car. These circuits respond to a coincidence of car lead position with up or down demand signal to produce a signal employed in the car's start-stop logic controls.

Up stop gating circuit SG1 includes nine AND's 591 through 599 for landings 1 to 9. Up demand signals for the landings are supplied individually to the left hand inputs of the respective AND's while car lead position signals for those landings are supplied to the right hand inputs. Thus demand signals from DM1–6 through DM9–6 connected to SG1–5, 7, 9, 11, 13, 15, 17, 19 and 21 and car lead position signals from LP1 through LP9 connected to SG1–4, 6, 8, 10, 12, 14, 16, 18 and 20 are respectively applied to AND's 591 through 599. The gating of an AND, as where the car lead position LP6 and an up demand for the sixth landing gate AND 596, applies a signal to OR 601 which is inverted by inverter 602 to SG1–24 and inverted again by inverter 603 to SG1–2 to provide a "car at up call" signal.

The down stop gating circuit SG2 of FIG. 21 provides a "car at down call" signal at SG2–24 and SG2–2 in the same manner as the up stop gating circuit. Down demand signals from DM2–18 to DM9–18 and DM1–18 are connected to SG2–21, 19, 17, 15, 13, 11, 9, 7 and 5 to the left inputs of AND's 612 through 620 while car lead positions LP2 through LP10 are connected to SG2–20, 18, 16, 14, 12, 10, 8, 6 and 4 to the right hand inputs of AND's 612 through 620 for landings 2 through 10. Any gated AND passes a signal through OR 604 and inverters 605 and 606 to SG2–24 and SG2–2 to indicate to the car's stop-start logic that the "car is at a down call."

*Description of FIGS. 20 and 22*

Inverse drive circuits ID1 and ID2 are shown in FIGS. 20 and 22. They indicate appropriate reversal limits for the car by issuing a signal characteristic of a call in one direction for the landing of the car's lead position at a time when no calls in that one direction are spaced from the car in the direction opposite the requirements of the call. Thus, they respond to directionally selective demand signals and to car lead position such that a signal is gated by a coincidence of a demand in the given direction at the car location unless the gate is inhibited by additional demands spaced from the car position in the direction opposite the given direction.

Calls beyond any given location are detected by cascaded OR gates as in the previously described drive circuits. They are effective upon AND gates to partially enable them and to inhibit the next adjacent AND. Car lead position gates the AND's.

In the inverse drive circuit for up calls, ID1, up demand signals from DM1–6 through DM9–6 are applied to ID1–13, 14, 15, 17, 19, 21 22, 4 and 7 and to OR's 622 through 629 for up demands for landings 1 through 9 respectively. Car lead positions for landings 1 through 9 are applied from LP1 through LP9 to ID1–12, 9, 11, 18, 20, 3, 1, 5 and 6 and the lower inputs of AND's 631 through 639 respectively. The up demand signals are negative and the lead position signals positive. Each AND for a landing having a landing below it for which up demands can be registered includes an inhibit signal input from the up demands for all landings below its landing which is derived from the OR for the next landing below. All AND's include an enable input from the demand memory for its corresponding landing. Thus for AND 632 the presence of an up demand on its OR 622 as passed by inverter 640 partially enables the AND 632. The partially enabled AND 632 can be gated by the car lead position signal from LP2 to ID1–9 for its landing on its lower input when the car is effectively at the landing unless there is an up demand for a landing below the car. Such an up demand below will impose a negative inhibit signal on the middle input of the AND 632 from first up demand at ID1–13. If the car were at the third landing and had a third up demand in registration a positive signal would be present at the lower input of AND 633 from LP3 and ID1–11 and at the upper input of AND 633 from ID2–15, OR 623 and inverter 641. If no up demand exists for the first or second landing OR 622 is inhibited and no negative signal is imposed on the middle input lead 642 to AND 633 whereby AND 633 is gated. When gated, AND 633 through its output inverter gates OR 621 to issue through inverter 630 a positive "up call at the car but none below" signal at ID1–8. On the other hand, had an up demand been present for the first or second landing, OR 622 would have gated an inhibit signal on lead 642 to AND 633 and no signal would issue at ID1–8.

The above combination of considerations applies to each of AND's 632 through 639. In the case of AND 631 for the first landing no up demand can exist for a landing below and hence no middle inhibit input is required. When the car's lead position is at the lowest landing and an up demand for the first landing is in registration AND 631 is gated by the positive signals from ID1–12 and ID1–13 to gate OR 621 and issue the "up call at the car but none below" signals at ID1–8.

Inverse drive circuit ID2 of FIG. 22 corresponds to ID1 for the purpose of sensing a down call at the car at a time no down calls exist above the car. Signal polarities to the several logic elements are identical in ID1 and ID2. Down demand signals DM2–18 through DM9–18 and DM1–18 are applied to ID2–7, 4, 22, 21, 19, 17, 15, 14 and 13 for landings 2 through 10 respectively and to OR's 652 through 659 for landings 2 through 10 respectively. The car lead position signals for landings 2 through 10 are applied from LP2 through LP10 to ID2–6, 5, 1, 3, 20, 18, 11, 9 and 12 and to the lower inputs of AND's 662 to 670 respectively. Inhibiting inputs to AND's 662 through 669 are provided from the OR's of the next higher landing. Thus an output "down call at the car but none above" signal is issued by OR 660 and inverter 661 to ID2–8 when a down demand signal for a given landing is imposed through its OR of the series 652 to 659 to its AND 662 to 669 when the car lead position signal is issued for that given landing to its AND, provided no inhibiting signal is imposed on that AND by a down demand for a higher landing. In the case of the top landing no inhibit is required, hence AND 670 is gated by a coincidence of car lead position at the tenth landing and a down demand for the tenth landing.

*Start-stop logic and car control circuits*

The start stop logic circuits SSL and car control circuits CCC of FIGS. 23 and 24 are typical of those for each car in the system. Generally they issue start and stop and travel direction signals to the hoisting machinery controls, the car control as depicted in the aforenoted United States patent application Ser. No. 380,385. They also control the door open and door close signals for the car. They, in cooperation with the car cntrol and car safety circuits, issue signals indicative of the coincidence of closed door condition, open door condition, car service direction, car travel direction which may be different from a service condition as where the car travels upward to serve a down demand, and the free car state.

Car travel direction and car service direction are developed from signals derived from the direct and inverse drives of FIGS. 17 to 22. When calls for service in in the current direction of travel exist ahead of the car its service and travel direction are the same. In the case of demands, a call at the car location can also result in the same travel and service direction. When the car has no calls ahead of it, it either stops and accepts a free car status or reverses unless it has a demand for service in its current travel direction at its location. The car as a free car is maintained at the last location it achieved in providing service, or a simulated call can be imposed upon it to cause it to park at some other location. If it has other calls assigned, upon reversing it serves those calls for which it was reversed.

The calls for which it was reversed may be either for service in the direction of travel or in the opposite direction. The start-stop logic is arranged to cause the car to stop for demands and commands for the service direction in the order they are encountered and to disregard calls for the service direction opposite the direction of travel. When a car is started for a demand for service in the direction opposite that in which the car will be required to travel to reach the call, as where a car must be run downward to serve an up demand below it, the start-stop logic causes it to disregard down demands assigned to it subsequent to the start. Thus a descending car will pass a down demand wher it was started downward to serve an up demand. In the logic, the descending car is treated as an up car under these circumstances.

The start-stop logic insures that no command is passed. Thus a command registered after a car has started in a travel direction opposite its assigned service direction is answered without awaiting the completion of service. This situation might arise for a descending up car when a passenger entered the car and failed to register a command until the car had been assigned an up service status.

When a car is a free car it is available to serve calls for either direction. According to the logic employed in the allotter a car is located with respect to its service direction status. Therefore the start-stop logic is arranged to assign both an up and down service status to a free car. For other car conditions cross inhibiting controls prevent a car from having both service directions assigned simultaneously.

*Description of FIG. 23*

"Start up" and "start down" signals are issued by the start-stop logic SSL of FIG. 23 at SSL–28 and SSL–29 and passed to the car control circuit CCC of FIG. 24. "Up car" service assignment signals are developed at SSL–31 and SSL–13 and "down car" service assignment signals appear at SSL–32 and SSL–12. The direct drive circuits of FIGS. 17 through 19 and 21 provide the control for these signals at input terminals SSL–22, 1, 17, 21, 23 and 10.

A call above the car or an up call at the car gates OR 671 while a call below the car or a down call at the car gates OR 672. Any command or demand above the car produces a negative signal at SSL–22 to inverter 673. An up call at or above the car causes a negative signal at SSL–1 to inverter 674. Similarly a call below the car applies a negative signal at SSL–23 to inverter 675 and a down call at or below the car applies a negative signal to inverter 676. If the car has any call either OR 671 or 672 will be gated, OR 671 for calls requiring up travel and OR 672 for calls requiring down travel.

If no calls are assigned to the car the car is considered a "free-car." An absence of a call for landings 1 to 9 produces a positive signal at SSL–17 which, when coincident with a positive signal at SSL–21 resulting from an absence of a call for landings 2 to 10, gates AND 677. AND 677 issues a free-car signal as a positive signal at SSL–2. This signal is passed from AND 677 through inverters 678 and 679. It will be noted that OR's 671 and 672 and AND 677 operate in a mutually exclusive manner.

The free car signal produces an "up car" and "down car" assignment. When a car is in the free car status it is available for service in either direction and therefore is considered in the logic of the system as both an up car and a down car. This is accomplished by gating the up and down service assignment OR's 680 and 681 by the positive signal from inverter 679. There OR's issue positive signals to inverters 682 and 683. The resultant negative signals to up and down start AND's 684 and 685 have no effect at this time since no calls are registered to gate either of OR's 671 or 672. The negative signals to inverters 686 and 687 produce positive "up car" and "down car" service assignment signals at SSL–31 and SSL–32 respectively, and are passed to inverters 688 and 689 to produce negative "up car" and "down car" service assignment signals at SSL–13 and SSL–12 respectively. As described above the positive service assignment signals are employed in the car locating and gating circuits at CLG1–20 and CLG1–22 and in the car stop controls to be described. The negative service assignment signals are employed in the command memories and the call reset circuits as at COM5–9 and COM5–12 and in the control of the service completion flip flop to be described.

If a call is assigned to the car, AND 677 is disabled, at least one of OR's 671 and 672 is gated and one service assignment OR 680 or 681 is gated. A call above the car or an up call at the car gates OR 671 to cause inverter 690 to issue a negative signal to AND 691. A second input to AND 691 is derived from the output which controls the hall lantern drives for a down stop SSL–35 such that if no down hall lantern actuation is imposed that input is enabled. This signifies that the car is not set for a down service stop. The third input to AND 691 is a cross inhibit from the corresponding down service assignment AND 692. Thus, up service assignment AND 691 is gated if a call requiring travel upward is assumed, if no down stop is imposed on the car, and if the car is not subjected to a down service assignment at AND 692. Conversely, down service assignment AND 692 is gated if a call requiring travel downward is assigned, if no up stop is imposed on the car from SSL–34 and if the car is not subject to an up service assignment at AND 691.

Service assignments imposed by calls assigned to the car are passed to the up or down service assignment OR's 680 and 681 as positive gating signals by inverters 693 and 694.

"Start up" and "start down" signals are derived from AND's 684 and 685. When a call requiring travel upward gates OR 671 and an up service assignment is made by gated AND 691, AND 684 is gated to pass a negative signal to inverter 695. A call requiring travel downward and a down service assignment gates AND 685 to pass a negative signal to inverter 696. The start AND's 684 and 685 have their outputs cross inhibited by AND's 697 and 698, such that a positive signal from "up start" AND 697 causes a negative signal at inverter 699 to inhibit AND 698 and conversely the gating of "down start" AND 698 causes a negative signal from inverter 700 to inhibit AND 697. These negative "start up" and "start down" signals are applied to the car control circuit of FIG. 24.

The stop signal logic is developed primarily in the upper portion of FIG. 23. Up stops are gated by AND 701 and down stops by AND 702. The coincidence of a car lead position with a down call is signified by a positive signal from the stop gating circuit at SG2–24 to SSL–14 and that of a car lead position with an up call by a positive signal from SG1–24 to SSL–11. These signals gate AND's 702 and 701 if they are not inhibited. AND's 702 and 701 are enabled through AND's 704 and 703 for normal stops and through AND's 706 and 705 for reversal stops as at a highest or lowest call. Only one of AND's 703, 704, 705 and 706 can enable a stop signal at any one time.

When an "up call at or above the car" signal is developed at DD3–2 and applied to SSL–1 as a negative signal, inverter 674 passes a positive enable signal to "normal up stop" AND 703 and a positive inhibit signal to inverter 707 and the "up set" AND 708. If the car is in the "up service" status, a positive signal from inverter 686 also enables AND 703. With the set input to farthest call reversal flip-flop inhibited in AND 708, a positive signal appears at the middle input 709 to AND 703 so that it is gated to inverter 710 and "up stop" OR 711. OR 711 when gated, enables AND 701 through inverter 712. At this time AND's 705 and 706 are inhibited by the negative signal from the farthest call reversal flip flop lead 713 and AND 704 is inhibited by the "up service" status of the car which causes inverter 687 to issue a negative signal. An "up stop" signal results at SSL–15 as a negative signal passed to CCC–1 by inverter 714 and OR 715.

If the car were in the down service status and stopped at a call which was not the highest call, as a down demand or where an up demand or command existed below, its stop would be classed as a "down stop" for the car control through SSL–16 to CCC–2. Such a condition is accomplished by gating AND 702 from AND 704 for a normal down stop. A setting of the car to a "down service" status imposes a positive enable signal on AND 704 from inverter 687. The characterization of the requirements imposed upon the car when it is stopped as including a down call at or below the car imposes a positive enable signal from inverter 676 upon AND 704. This signal also produces an inhibit through inverter 716 to AND 717 in the set input of the farthest call reversal flip flop so that a positive enable signal on lead 709 is passed to AND 704. With AND 704 gated, OR 718 is gated from inverter 719 to enable AND 702 through inverter 720. The gating of down stop AND 702 by a positive "down call where car is" signal at SSL–14 issues a positive signal to inverter 721 to gate OR 722 to SLL–16 and CCC–2. AND's 703, 705 and 706 are inhibited while AND 704 is gated by the negative "not up service" signal from inverter 686 and the negative "not lowest call' signal from farthest call reversal flip flop at least 713.

When a car is started to an assigned call which requires a farthest call reversal the stop logic is set for the reverse service direction and the stop is enabled through AND 705 or 706. These AND's are enabled by the operation of the farthest call reversal flip flop and the service completion flip flop whereby a down stop and down hall lantern operation is effected for a car traveling upward to a highest call and an up stop and up hall lantern operation occurs for a car traveling downward to a lowest call.

If a car has cleared its last assigned call for a given service direction which it can answer for the same given travel direction, and if that car is assigned a call for the opposite service direction which is displaced from the car in the given direction, the farthest call reversal flip flop is set and is held set for the next run. At the end of that run it is reset by a car stop signal. Clearance of down calls at or below the car is indicated as a positive signal from DD4–2 to SSL–10 so that inverter 676 inhibits AND 704 and removes the inhibit signal from AND 717 as developed through inverter 716. When the up calls at or above the car are cleared, the postive signal from DD3–2 to SSL–1 inhibits AND 703 and removes the inhibit from AND 708. If the car has cleared its up calls at or above the car, is set for up travel to apply a positive signal from CCC–7 to SSL–27 and AND 708, upon issuance of an up start signal a position signal from CCC–24 to SSL–24 gates AND 708. Conversely, if the down signals at and below the car are cleared, the car is set for down travel with a positive signal at SSL–30 and a start signal is applied as a positive signal at SSL–24, AND 717 is gated. The gating of either of AND's 707 or 717 to OR 723 sets the farthest call reversal flip flop to a negative signal on lead 709 and a positive signal on lead 713. The negative signal on 709 inhibits AND's 703 and 704. The positive signal on 713 enables AND's 705 and 706 so that the car will receive a stop signal only when a descending car has an "up call at but none below the car" signal from ID1–8 to SSL–4 or an ascending car has a "down call at but none below the car" signal from ID2–8 to SSL–6. Positive signals at either of these terminals are amplified through tandem inverters 724 and 725 or 726 and 727 to enable AND 705 to institute an up stop by the decending car or AND 706 to institute a down stop by the ascending car.

As will be described with respect to FIG. 24, a positive "start not" signal appears at CCC–13 when the car initiates a stop. This signal resets the farthest call reversal flip flop if it has been set thereby transferring the stop control from farthest call reversal stop AND's 705 and 706 to the normal stop AND's 703 and 704. This transfer occurs without any detrimental effect upon the car and indicator operation since the initial stop signal to the car control circuit was also applied to the car service direction AND's 691 and 692 so that the service direction is reset at the time the farthest call reversal flip flop is reset and the normal stop channel is thereby fully operative. Thus a down car stopping for a lowest up call initiates the stop in the up stop control. The up stop control reset the car to an up service status and sets the car control circuit for a stop. The stop signal from the car control circuit transfers the up stop control from a farthest call reversal stop channel to a normal stop channel.

AND's 705 and 706 respond to a coincidence of car position with the call as in the case of AND's 703 and 704 as a condition to institute a stop. However, in the case of a farthest call reversal the up stop for a down car or down stop for an up car inhibits the service assignment AND's 691 or 692 since a positive signal at SSL-35 for a down stop inhibits up service AND 691, and a positive signal at SSL-34 for an up stop inhibits up service AND 692. The cancellation of the service status disrupts the stop logic and extinguishes the hall lanterns prematurely. Therefore an alternative means of retaining the farthest call reversal stop AND's 705 and 706 gated during the entire stop interval has been provided by the service completed flip flop. This flip flop is triggered by the stopping relationship of car lead position and call at the initiation of a farthest call reversal stop. Thus when the car is not in the up service mode a positive signal appears on lead 728 and when the car is at an up call a positive signal is pased by lead 729 to gate AND 731 and issue a lowest call reversal signal to the set input of service completed flip flop whereby lead 732 is positive to enable up farthest call reversal stop AND 705. Conversely when the car is not in the down service mode, a positive signal appears on lead 733 and if the car is at a down call a positive signal appears at lead 734 to gate AND 735. AND 735 resets the service completion flip flop to issue a negative signal on lead 732 and a positive signal on lead 736. Down stop farthest call reversal AND 706 is gated when AND 735 is gated, a down call is at the car but none are above the car and farthest call reversal flip flop has been set. Each of the farthest call reversal AND's operate upon a respective stop OR through an inverter. AND 705 operates inverter 737 to gate up stop OR 711 and AND 706 operates inverter 738 to gate down stop OR 718.

Inasmuch as the farthest call reversal flip flop operates at the beginning of a run by a car to its farthest call for reversal to inhibit the normal stopping means, AND's 703 and 704, the car is precluded from stopping in response to conditions which normally would cause it to stop such as a call assigned for a landing which the car will pass and for service in the car travel direction. It is desirable to exclude demands of this type since otherwise service could be unduly delayed to the call which set up the farthest call reversal operation. However, commands are directly assigned the car and represent the service needs of the load already within the car. Therefore, it is desirable to serve those commands if the car approaches the landing of a command while running to its farthest call reversal. A never pass a command circuit is provided to enable service to commands when the car is making a farthest call reversal run.

The never pass a command circuit includes OR's 715 and 722 in the up and down stop circuits as gated from AND's 739 and 740. As described with respect to FIG. 18 stop gating circuit SG3 issues a negative signal at SG3-2 when the car lead position coincides with a registered command as derived from the command memory terminals 11 for even landings and 8 for odd landings at all but the terminal landings. This signal enables AND's 739 and 740 so that that AND for the current direction of car travel is gated. AND 739 stops the car while ascending as signified by the negative signal from SSL-30 while AND 740 stops a descending car as signified by the negative signal from SSL-27. Thus under all operating conditions the never pass a command circuit insures that the car will stop for commands for landings which it encounters.

Hall lantern drivers are actuated by the stop signals issued by the start-stop logic at SSL-34 for an "up stop" and at SSL-35 for a "down stop." These signals indicate the direction in which the car will travel from the stop, thereby informing the prospective passengers awaiting service at the landing the direction in which that car will provide service. Each stop signal is issued as a negative signal from OR 715 or 722. In order to accommodate the hall lantern drivers the stop signal is inverted from outputs of OR's 715 and 722 by inverters 741 and 742 for "up" and "down" respectively.

*Description of FIG. 24*

The car control circuit CCC of FIG. 24 receives its signals from the start-stop logic SSL and the car controls. Primary car control functions are performed through AND's 755 and 756. Start up AND 755 has an input for a "start up" signal from SSL-28 to CCC-4 which is negative when the start stop logic indicates an up start is appropriate. It has a "direction up" input from the car direction flip flop which is negative when the car control circuit prerequisites for up travel are satisfied. It has a negative input from the stop accepted OR 757 and its inverter 757I when no stop signal has been accepted and an inhibit signal from that input when a stop is accepted. Thus start up AND 755 is gated from the "start-up" signal of SSL-28 until the stop "accepted signal" of SSL-15 for an "up stop" or SSL-16 for a "down stop."

A "down start" is gated by AND 756 when no inhibiting "stop accepted" signal is gated by OR 757, the car direction from the direction flip-flop is negative on lead 758I, and a "start down" signal is passed from SSL-29 to CCC-5 and lead 759.

Direction control of the hoist machinery of the car is accomplished through the direction flip-flop such that an up setting results in a positive signal on lead 758 and CCC-7 to the car control and SSL-27 and in a negative signal on lead 761 and CCC-6. Conversely, a down setting results in a positive signal on lead 761 and CCC-6 and a negative signal on lead 758 and CCC-7. AND 762 is inhibited when the car doors are open even though a start signal is present, as will be explained, to issue a positive signal from inverter 763 and thus a negative signal from inverter 764 to AND's 765 and 766. With AND's 765 and 766 enabled a "start up" negative signal at CCC-4 is passed over lead 767 to gate up AND 766 setting the direction flip-flop to issue a positive signal at 758 and a negative signal at 761. A "down start" negative signal at CCC-5 is passed over lead 759 to gate down AND 765 and cause the flip-flop to issue a negative signal at 758 and a positive signal at 761.

A "start up" or "start down" signal gates "start accepted" OR 768 to inverter 769 whereby AND 762 is partially enabled. If the car doors are not open, no inhibiting signal is applied by inverter 770 to AND 762, and AND 762 is gated to inverter 763. The negative signal from 763 is applied directly to inverter 764 to inhibit the direction set AND's 765 and 766. It is also applied to the upper input of AND 771 which is inhibited by the absence of an enabling negative signal on the lower input for an interval of the time delay circuit 772. In the illustrative embodiment time delay 772 introduces a delay of 100 milliseconds and inverts the signal so that a second inverter 773 is required to provide the enabling polarity for AND 771. This provides a slow to operate-fast to reset characteristic for AND 771 which insures that the direction set AND's are inhibited prior to the issuance of the start signal to the car. The appearance of a negative signal on CCC-13 represents a "start" signal to the car control while a positive or "start not" signal represents a "stop" to the car control and a reset to the farthest call reversal flip flop of SSL at SSL-33.

"Door open" signals for the car are developed in the car control circuit and issued at CCC-12 through the combination of a "stop" signal from OR 757 through inverters 757I and 774 and lead 775, with a negative "door closed" signal on lead 776, and, when employed with parking controls, a "car not parked" signal at CCC-3 to gate AND 777. "Open doors" AND 777 issues a negative signal which is inverted by inverter 778 and appears as a positive "open doors" signal at CCC-12 from which it is passed to the car control including the direct control of the door drive.

The car doors when opened cause a positive "door is open" signal to be transmitted from the car to the car control circuit at CCC-8. This signal inhibits AND 779 through inverter 781 to cause inverter 783 to issue a positive signal to lead 776. The positive signal inverted by inverter 77D inhibits AND 762 to prevent starting of the car. The positive signal to AND 777 inhibits it to prevent another door open signal. When the door is closed a negative signal at CCC–8 enables AND 779 through inverter 781. AND 779 is gated after a time through inverting time delay 782 to enable AND's 762 and 777. In the example, the time delay of 782 is arranged to introduce a delay of fifty milliseconds. The slow to operate-fast to reset characteristic thus afforded AND 779 inhibits the operation of AND 762 to insure that the call which stopped the car is reset by the door closing before the car starts. During this fifty milliseconds the call reset signal is effective as will be described.

The car control circuit responds to and actuates the door controls in establishing the door open interval and issuing the call reset signals. While the doors of the car are closed a positive "door is closed" signal is issued from the car to CCC–15 to inhibit AND 784. AND 784 is employed when the car parking feature is applied to the system to institute the operation of the door open timer. It is enabled by a negative "car not parked" signal at CCC–17 so that when a "door is not closed" is applied at CCC–15 it will gate a timer cycle initiation. The door open timer has an interval determined by the adjustment of rheostat 785 across CCC–20 and CCC–21.

When the door open timer completes its interval, it issues a negative signal to inverter 786 which passes a positive "close door" signal from CCC–11 to the car, and the door drive to cause it to drive the doors closed. Upon closure of the car doors, the AND 784 is inhibited by the positive "door is closed" signal whereby the positive going signal to the Schmitt trigger results in a signal at CCC–10 which has a fast rise time to insure that the call which the car has just served is reset before the car is started. This call reset signal is applied to CR1–29 and CR2–29 of the call reset circuits of FIG. 16 as described above.

*Hall Lantern*

As in conventional elevator control systems, the passengers awaiting service at the landings are informed of the approach of a car and the direction in which that car will provide service by a series of hall lanterns associated with each car. A lantern is provided for each direction in which a car can provide service from the landing. Thus only an up indicator is available at the lowest landing, only a down indicator is provided at the highest landing, and each intermediate landing has both up and down indicators.

In a service run where the car is assigned to calls for landings beyond the landing at which the car is stopped, the hall lantern or indicator indicates continued service in the direction the car traveled. Thus if a car were ascending to serve an up demand for up travel, when it stopped at the landing of that demand an up lantern for that car at that landing would be illuminated. If the car were stopping for a command and a demand or command were above it, it also would have an up lantern lighted. However, since the lantern is to indicate the direction in which service is to be provided from the landing, if the car were ascending to a down demand, it would operate its down lantern since it would reverse and descend from that landing. Conversely, a descending car will operate down lanterns if it is to serve landings below and an up lantern if next it will serve landings above.

*Description of FIG. 25*

The hall lanterns, designated by their landing numbers and directional suffixes of U for up and D for down, are shown for a typical car in FIG. 25. The circuit module HLD for the ten landings has a lamp driver for each indicator to terminals HLD–16 to HLD–24 for landings 1 to 5 and HLD–47 to HLD–39 for landings 6 to 10 respectively. Each driver is actuated to illuminate its hall lantern by gating an AND from a car lead position input at terminals HLD–7, 5, 3, 2, 1, 25, 26, 27, 28 and 37 for landings 1 to 10 respectively and from either a "stop up" or "stop down" signal, depending upon the directional indication, as derived from the start stop logic of FIG. 23 at SSL–34 and SSL–35 as applied to HLD–4 and HLD–35 respectively.

Positive car lead position signals are issued by the car and applied to the AND's 786 and 803 as the lead position is advanced. Coincidence of a stop signal for a landing with the lead position for that landing gates the AND to operate the driver and the hall lantern. For example if a positive "down stop" signal is applied to HLD–35, it appears at each of the lower inputs of the odd numbered AND's. If the car has a fourth landing lead position LP4 to apply a positive signal at HLD–2 and 791 will be gated and lantern 4D illuminated. The hall lantern remains illuminated until its AND gate is inhibited by the cancellation of the stop signal. Thus, in the example, when the start-stop logic cancel the "stop down" signal to HLD–35 and 791 will be inhibited to darken 4D.

*Recapitulation of call finder*

Upon the registration of a landing call upon one of the buttons S1U to S9U or S2D to S10D of FIGS. 2 and 3, that call is entered into an appropriate call memory CM1 to CM9 in which it is retained until the call is answered and a cancelling signal issued from the car control circuit of the car logic at CCC–10 of FIG. 24 to the call reset CR1 and CR2 for the car, FIG. 16, and the call reset gating CRG–1 to CRG–9 of FIG. 4. The signal in the call memory initiates the operation of a timer 76 of FIG. 1 which is set for some interval established as the limit within which the car should normally respond to and answer the call. If the call is answered within the interval of the call timer, the call memory and timer are reset. If the call is not answered within that interval and the timer times out, it issues a reallotting signal to the demand memory for the car whereby the call again assumes an unassigned statute and is treated as a newly registered call by the call finder.

The presence of a call in the call memory will institute operation of the call finder, if the call finder and allotter are not processing a call, unless a demand memory for one of the cars for this call has been activated. A car's demand memory for a call can be activated by an allocation by the allotter, or when the direct assignment feature is effective by a car call through operation of a command memory for the landing. If a car has been assigned to the call in the call memory, further operation of the call finder is inhibited by a signal to the call reset gating CRG1 to CRG9 of FIG. 4 for the appropriate landing and thence as an inhibiting signal to the call memory.

If no car is allotted by having its demand memory operated, the call in the call memory is passed through the ring counter gating RCG of FIG. 2 to the call finder ring counter CFRC of FIG. 3 as a starting signal for the ring counter clock 118. The purpose of the call finder ring counter is to serially locate unassigned calls for the preset of the allotter scanner ASC of FIG. 6. The ring counter begins its count from its current location, usually as established by the last preceding call finder operation. It advances the count, corresponding to landing locations, in the direction for which the counter was set until it reached a limit at which its direction is reversed or until it encountered the call which instituted its operation. Once the call is located the advance of the counter is inhibited by a signal from the call memory to the ring counter gating RCG and from the allotter gating circuit AGC to the ring counter gating, until the call has been allotted. The ring counter functions rapidly, requiring only a few microseconds per landing position. Further, if the call location coincides with the ring counter position, no advance of the counter is required.

A preset signal from that output of the call finder ring counter upon which the ring counter has been stopped and the direction of scan set in the counter at the time it found the call are applied to the preset input of the allotter.

*Recapitulation of the allotters*

The invention contemplates individually considering landing calls as selected by the call finder and developing an assignment between the selected call and any of the cars. The eligibility of cars to be assigned to a call is not dependent upon the position of the cars relative to the call, hence any car which is active in the group can be assigned. Selection of the car to serve the selected call is based upon its ability to serve the call. This ability can be evaluated by various techniques and means. Two such techniques are shown.

Both of the illustrated means for developing an assignment between a car and a selected call, termed allotters, consider spacing between the cars and the selected call as a primary criterion of the capability of the cars to serve the call. They also consider the calls assigned to the cars and the loading of the cars.

Each of these allotters predicts the operation of cars relative to the selected call and develops the assignment according to that prediction either on the basis of an acceptable level of operation or an optimum operation. Each has the flexibility to correct itself if a poor prediction is made or the prediction is invalidated by conditions which arise subsequent to the prediction. Thus, if a call is not responded to in an acceptable interval or it becomes apparent that the prediction will be invalidated as by the loading of the assigned car beyond the anticipated level, or that other cars might better serve the selected call for which an assignment has been made, as where the assigned car's doors have been held open an excessive interval, either of the allotters can reprocess the call based upon the then current service conditions imposed on each of the cars.

Both forms of allotters contemplate high speed operation wherein each call is processed in a few milliseconds. Accordingly, both employ high speed solid state switching elements of well known design related in generally conventional manner to achieve the novel logic functions disclosed.

In the first form of allotter shown in FIG. 1*a* the capability of the cars to serve the selected call is ascertained on the basis of given attributes of the cars considered serially in the order of their spacing from the calls. A scanning device is provided to select the car nearest the call and consider a first preferred limit upon its attribute or set of attributes. If the car is within the acceptable limit it is assigned to serve the call, if not, the next closest car is considered. Thus all cars are reviewed relative to the limit until one is found acceptable and assigned or upon completion of the review, a second preferred limit is established and the cars reviewed relative thereto.

The second form of allotter as disclosed in FIG. 1*b* considers the service capability of all cars simultaneously and assigns the car with the optimum service capability to serve the selected call.

It develops an analog signal for each car of the service capability of that car relative to the call currently being considered. It does this by developing a group of signals which are characteristic of the delaying factors imposed upon the car and summing those signals so that the car with the most favorable sum is selected for the call.

A number of factors have been employed in the present example as indicative of predicted answer time. The distance between an active car and the call being allotted, counted as the number of possible landings between the car and the call in the distance register gating circuits DRG1 to DRG4 of FIG. 13 for cars 1 through 4, is one factor. Another is the distance between a free car and the call, counted as the number of landings in the distance register gating circuits DRG1 to DRG4 from the initiation of the scan to the locating of the car, or, if the car is behind the call, counted in the free-car distance register FDR of FIG. 12 from the locating of the car to the termination of the scan. Additional factors include the number of stops assigned to the car between that car's present lead position and the call being allotted as sensed in intermediate stops counter ISC of FIG. 9.

Other factors are indicative of the time required for the car to serve the assigned calls remaining after it has stopped for the call to be assigned. These factors include the total number of stops assigned to the car as indicated in its total stops gating circuit TSG1 to TSG8 for cars 1 to 4, and the degree of loading imposed upon the cars as indicated by load weighing switches of FIG. 12 or other devices which sense various degrees of loading.

These factors are each arranged to contribute to a summed signal for each car. A ramp signal generator, in the intermediate stops gating circuit module of FIG. 11 of the example, generates a signal which increases with time. This ramp signal is compared with each of the summed car signals in comparator circuits 371 which responds to a coincidence in the two signal levels. Upon operation of a comparator, the call is allotted to that car and the allotting function terminated with respect to that call.

Each car is located with respect to the call being answered by presetting the allotter scanner to the call location. Thus in a ten landing building the allotter scanner has ten presets as at ASC–1 to ASC–10 for landings 1 to 10. The allotter scanner is then set to hunt for the cars beginning from the location of the call to be allotted and advancing in a direction opposite that in which those cars would be required to travel to respond to the call. For up calls the allotter scanner is set to scan downward to the lower limit of travel, then to reverse and scan upward to the upper limit of travel, and again reverse and scan to its position of initiation. For down calls the scan is inverted. Initial scan direction is set by the ring counter gating circuit, RCG of FIG. 2, of the call finder through terminals ASC–47 for up scan (a down call) and ASC–45 for down scan (an up call). Termination of the scan is controlled by a counter in the allotter gating circuit AGC of FIG. 14 which stops the scan after eighteen steps, twice the number of landings served less two, or viewed in another manner the total number of landing calls which can be registered, as signaled at ASC–38.

Car spacing from a call being allotted is gated into its distance register gating circuit DRG1 to DRG4 of FIG. 13 as the count of the number of scanner steps counted in distance counter DC of FIG. 14 at the time coincidence bewteen directionalized car lead position and allotter scanner active position are coincident as sensed in the car's allotter coincidence circuit, ACC1 to ACC4 of FIG. 7. Once the distance register gating circuit is actuated it retains the count until the allotter cycle is completed.

If a car is in the free-car status, that is, it has no commands or demands to satisfy, it has no predetermined direction setting and can respond by travel in either direction. Hence the free-car distance need only be considered as the number of landings between the car and call. The car locating and gating circuit CLG1 or CLG2 of FIG. 10 gates the distance register gating circuit for the free-car to count the number of landings between the call and car if the car is encountered by the scan in the initial portion of the scan, that preceding the first scan reversal. If the free-car is not located in the range of travel scanned prior to the first reversal, the free car distance register FDR of FIG. 12 is enabled when the car position is coincident with the active scan position following the second scan reversal. FDR is a counter which counts the number of scan steps between the car position and the termination of the scan at the call location. The accumulated count in FDR in retained throughout the remainder of the allotter cycle.

Stops assigned to each car between the call and the car are counted serially in the intermediate stops counter ICS for that car as shown in FIG. 9 during the scan steps. A count is made upon each coincidence of a scan position with a command or demand for that landing represented by the position. Coincidence is sensed in the total stops gating circuits for the car TSG1 to TSG8 of FIGS. 8 and 9 and gated to ISC through the intermediate stops gating circuit of FIG. 9, ISG.

The total stops assigned to a car are broadsided in the total stops gating circuits for each car. TSG1 to TSG8 of FIGS. 8 and 9 upon the completion of the allotter scan. These stops, both commands and demands, are indicated from the demand memories DM1 to DM9 for each car to the appropriate total stops gating circuits.

Each of the load sensing, total stops gating, intermediate stops gating, car distance register gating and free-car distance register, in accordance with the values or counts developed therein, develop analogue signals as by the current which is drained from a common line through grounded resistors. The sum of these signals as developed at the completion of the allotter scan is maintained while a "scan completed" signal starts the ramp generator. The call finder and allotter functions from initiation of the hunt for the call to the allottment of the call to the car are completed in a maximum of 12 milliseconds for a system as illustrated wherein the call finder requires from zero to seventeen steps for a ten landing structure (50 microseconds per step) the allotter preset requires of the order of fifty microseconds, the allotter scanner requires eighteen steps for a ten landing structure (50 microseconds per step) and the ramp reaches its maximum signal value in 10 milliseconds.

Upon allottment of the call, the call finder and allotter are released for processing of other unallotted calls. In the event the allotter fails to allot the call to a car within one hundred milliseconds of the initiation of the processing of that call by the call finder, the allotter rescan circuit ARC of FIG. 5 is gated to cause another allotter operation for that call.

Reallottment of calls also is introduced when the car to which calls are allotted is subjected to a delay which invalidates the predicted capability of the car to serve the call which was the basis for allotting the call. This reallottment is instituted for example by the loading of the car to capacity so that it cannot accommodate additional passengers by delaying the car as where the doors are held open at a stop an excessive interval, or by an excessive interval of registration of a landing call as measured by a call timer. When a reallottment signal is issued the demand in a demand memory is cancelled and the call from which the demand was derived is retained in its call memory for reallottment through the call finder and allotter functions. Demands which coincide with commands are not cancelled since the car necessarily will stop at the landing and at least one passenger will leave the car so that at least one entering passenger can be accommodated.

*Recapitulation of the car control logic*

The car control logic of the present invention differs from that of contemporary systems by restricting the interrelationships between the service requirements registered and the cars serving those requirements. In contemporary systems landing calls are applied to a group supervisory control which usually is set in discrete programs. The calls are made available to the cars in accordance with the program which prevails in a rigid pattern. They ordinarily are available to any car and are served by the first car which is moved into a stopping zone of travel associated with the call. The cars feed back signals to the supervisory control and to the call registering circuits subject to the lag inherent in systems of this nature. Thus the call is cancelled and becomes unavailable to other cars in the system only after it has been served by a car which encountered it on a random basis.

While the present invention need not exclude programmed controls which are superimposed thereon, it is considered capable of serving all conditions previously met by distinctly programmed controls with the aforenoted single operating mode. In particular landing calls when registered are distributed to the cars individually and on the basis of the relative capabilities of the several cars to serve the call. This tendency to assign the call to the car best situated to provide service distributes the calls among the cars so that service tends to be equalized thereby reducing passenger waiting time. Each call is stored in its assigned car's controls and is rendered ineffective upon the service of other cars. The individual controls for the car feed information back to the assigning equipment including that required for decision making with regard to additional calls and the cancellation of the call actuated conditions upon the provision of service to the call. Thus the car neither finds the call by traveling to it nor controls the cancellation of the registration as a direct function of its motion.

In particular calls registered in the cars are directly stored in command memories individual to the cars. Calls registered at the landings can be directly assigned to a car which is already conditioned through a command memory to serve the landing in that direction, and are assigned through the call finder and allotter otherwise to enter the call in a demand memory individual to the car. Landing calls are stored in a call memory until service has been completed. They can be reallotted in response to various conditions in the system such as excessive delays in cancelling then, delays of the assigned car and overloads in the assigned car. Calls can be reallotted without restriction, or advantageously they can be reallotted selectively either individually or on the basis of their relationship to commands which are retained by the command memories. Demands can be retained if a corresponding command is registered.

The relationship of commands, demands and commands and demands to the position of the car to which they are assigned is sensed in the car logic direct drive, inverse drive, and stop gating circuits. These relationships include any call except at the lowest landing and any call above the car sensed in DD1, any call except at the highest landing and any call below the car sensed in DD2; an up call for any landing and any up call at or above the car, sensed in DD3; a down call for any landing and any down call at or below the car, sensed in DD4; up call at car position but none below the car, sensed in ID1; and down call at car position but none above the car, sensed in ID2. The signals derived from these circuits are employed in the start-stop logic circuits for each car such that calls above the car while the car is in the up service status cause up start signals to be issued to the car control and calls below the car when in the down service status cause down start signals to issue. The up and down service and start controls are cross inhibited.

Free cars, those with no calls assigned are identified in their stop start logic by sensing signals from the direct drive circuits.

Farthest call reversal runs are also ascertained in the stop start logic of the car so that the completion of normal service in one service status when additional calls are assigned as sensed in the direct and inverse drive circuits set the following run for a farthest call reversal. During the run the assignment of intervening demands does not interrupt the reversal service since the logic conditions the car as one providing service in the opposite direction. Commands are always capable of causing a car to stop.

Stop operations are instituted by a coincidence of the car lead position with an up demand or command, a down demand or command, or a command alone as sensed in stop gating circuits SG1, SG2 and SG3 for the car. Each car's stop gating circuits are coupled to its stop start logic to control the stop logic. The stop logic includes four channels: a normal up stop, a normal down stop, a farthest call reversal up stop, and a farthest call reversal down stop. These various types of stop function are combined to a single stop signal which in turn is combined with a single start signal such that the elevator car receives and responds to either the presence or absence of a start signal.

Control of the car hoist motor is by means of a start signal which is inhibited to stop the car. It is also inhibited while the car doors are open. Direction settings of the hoist motor are made in response to "start up" and "start down" signals while the start signal is inhibited.

Completion of service to an assigned call is assured when the car doors are closed. Upon the closing of the doors a call cancelling signal is issued for the landing at which the car is stopped to the call memory, demand memory and command memory for that landing and the call's service direction. The cancellation of the door open start inhibit signal is delayed a sufficient interval to permit the call cancellation prior to the advance of the start signal to the other controls.

Stop signals to the car control circuit activate door open signals. Door open time intervals are also defined in these circuits.

The preceding discussion sets forth an elevator control system of great flexibility. The system can accommodate many criteria of service in evaluating the individual capabilities of the cars. Further, its concept consideration of landing calls and their assignment to cars in accordance with the relative service capability of the cars to serve the calls lends itself to many forms of treatment. Thus, serially performed functions can be broadsided, analog signals can be interchanged with digital signals offering the same information, and sequences of functions can be altered all without departing from the spirit or scope of the invention presented here. Accordingly it is to be understood that the present disclosure is set forth as illustrative of the inventive concepts and is not to be read in a limiting sense.

It is noted that certain of the details disclosed herein are the subject of separate patent applications. The form of allotter set forth in FIGS. 1*b*, and 5 through 14 is the subject of an application for Elevator Controls filed herewith in the names of Donivan L. Hall, James H. Kuzara and William C. Susor, United States Ser. No. 494,194. The drive circuits of FIGS. 17 through 20 are the subject of an application for Elevator Controls filed herewith in the names of James H. Kuzara and Orvale J. Martin United States Ser. No. 494,056.

Having described the invention, we claim:

1. An elevator system including a plurality of cars serving a plurality of landings, means for registering calls common to the cars for service at individual landings; means common to the cars for storing said registered calls until service is provided to said calls; means common to a plurality of cars for individually selecting said registered calls; and means for establishing a service assignment between said selected call and one of said plurality of cars; means for each car for causing said car to run in response to a registered call common to said cars only in response to an assignment between said call and said car; means for each car for causing said car to stop in response to a registered call common to said cars only in response to an assignment between said call and said car; first means responsive to service to the landing of a stored call for releasing the storage of said call in said call storage means and the assignment between said call and a car by said assignment means; second means for cancelling the assignment between said call and a car other than by service by a car to the landing of said call; and means responsive to the cancellation of said assignment between said call and said car by said second means for actuating selecting means to select said call and for actuating assignment means to develop a second assignment of said call between said call and a car.

2. A combination according to claim 1 wherein each of said plurality of cars which is capable of serving said selected call is eligible for assignment to said selected call without restriction to the car of said plurality which is closest to the landing of said selected call.

3. A combination according to claim 1 wherein said call registering means are associated with each of a plurality of landings and with each service direction provided from each of said landings and said selecting means selects registered calls according to the landing location and the service direction of said calls.

4. A combination according to claim 3 wherein said selecting means hunts registered calls in the order of the landings represented by said calls and selects a registered call in accordance with the service direction of said call.

5. A combination according to claim 4 wherein said selecting means hunts in an ascending and descending order of landings represented by said calls and selects calls having a service direction requirement in correspondence with said hunting direction.

6. A combination according to claim 3 wherein said call selecting means comprises a scanner having scan positions corresponding to said landings, a scan advance for said scanner, and a coincidence sensing latch to inhibit said advance when said position and advance direction are in coincidence with said registered landing call and service direction.

7. A combination according to claim 1 wherein said call selecting means comprises a scanner means having a position corresponding to each of said landings and each service direction of said call means for said landings, and means responsive to a coincidence of said scanner means position with a registered call for its corresponding landing and service direction.

8. A combination according to claim 1 including first means responsive to the registration of a call by operation of said call means, second means responsive to the assignment of a registered call to a car, means to initiate the hunting by said call selecting means in response to the operation of said first means by a given call, and means to inhibit the hunting by said call selecting means in response to the response by said second means to a call for the landing of said given call.

9. In an elevator system comprising a plurality of elevator cars serving a plurality of landings and having landing call registering means, the combination comprising memories for storing the registration of each landing call; means for scanning said memories; means responsive to a call in a memory for instituting scanning by said scanning means; and means responsive to the coincidence of a scan with a memory having a registered call for terminating said scanning by said scanning means, whereby said final scan position selects a registered landing call; means for assigning said selected landing call to a car of said plurality; means for resetting said memory and the assignment of said assignment means in response to service to the landing of said memory by a car; second means responsive to a predetermined service condition other than service to the landing of said memory by a car and indicative of a change in the capacity of said system to serve an assigned call for resetting said assignment of said assignment means; means responsive to said second means to cause said scanning means to reselect said landing call of the reset assignment; and means responsive to reselection of said landing call to cause said assigning means to reassign said reselected landing call to a car of said plurality.

10. A combination according to claim 9 wherein said scanning means scans said memories in the sequence along the path of travel of said cars of said landings associated with said memories.

11. A combination according to claim 9 including a limit for said scanning means a direction of scan control which causes said scanning means to advance its scan in a first direction to a limit, and means responsive to the scan advance to said limit for reversing said scan direction.

12. A combination according to claim 9 including means to inhibit said scan instituting means for a given landing call in response to an assignment between said call and a car.

13. A combination according to claim 1 comprising means for timing the interval which a call remains registered, and means responsive to a predetermined time interval defined by said timing means for cancelling the assignment between said call and said car.

14. A combination according to claim 1 including means individual to each car for registering car calls for service at landings served by said car, and means responsive to registration of a car call for the car subject to assignment and for the landing having the call subject to assignment to inhibit said cancelling means.

15. A combination according to claim 1 including means individual to each car for registering car calls for service at landings served by said car, means responsive to the registration of a landing call for a landing for which a car call is registered for directly assigning said landing call to the car having said registered car call.

16. A combination according to claim 1 including means to ascertain the distance between each of a plurality of cars and the selected call.

17. A combination according to claim 1 including means individual to each car for registering car calls for service at landings served by said car, means for directly assigning registered car calls to the car for which said calls are registered, means to ascertain the number of assignments between each car and said registered landing and car calls, and means to develop a preference in said assigning means for an assignment between the selected call and a given car according to the number of calls assigned that car.

18. A combination according to claim 16 including means individual to each car for registering car calls for service at landings served by said car, means for directly assigning registered car calls to the car for which said calls are registered, means to ascertain the number of assignments between each car and said registered landing and car calls, and means to develop a preference in said assigning means for an assignment between the selected call and the car closest to said call and having less than a predetermined number of assigned calls.

19. A combination according to claim 1 including means to ascertain the load imposed upon each car and means to develop a preference in the assignment between the selected call and a given car according to the ascertained loading of said car.

20. A combination according to claim 16 including means to ascertain the load imposed upon each car, and means to develop a preference in assignment between the selected call and a given car according to a combination of the ascertained loading of said car and the distance between said car and the selected call.

21. A combination according to claim 16 including means to ascertain a service condition individual to each car which is indicative of the capability of said car to serve said selected call, and means to develop a preference in assignment between the selected call and a given car according to a combination of said level of service capability of said given car and the distance between said given car and the selected call.

22. A combination according to claim 1 including demand storage means individual to each car and for each landing and call service direction which is actuated for a given car, landing and service direction by said assignment means when an assignment is established for said given car and a call for said landing and service direction; command storage means for storing calls for each car and for each landing served by said car; car call registering means for each car for entering a command for service at a landing into the command storage for said car and for said landing; and direct demand assignment means responsive to a command registered in a command storage for a car for a given landing for directly actuating said demand storage for said car for said given landing in response to a call for said given landing registered on said common call means.

23. A combination according to claim 1 including means individual to each car for storing each assigned call for each car and means for inhibiting operation of said call selecting means and said call assigning means for the registration of a car call for a given landing in response to the storage of an assigned call for said given landing.

24. A combination according to claim 22 including means to sense a predetermined service condition imposed upon each elevator car and means responsive to a predetermined service condition for inhibiting operation of said direct demand assignment means.

25. A combination according to claim 1 including demand storage means individual to each car and for each landing and call service direction which is actuated for a given car, landing and service direction by said assignment means when an assignment is established for said given car and a call for said landing and service direction; and means to deactuate said demand storage means in response to a change in service conditions in said system indicative of a change in the capacity of said system to serve a demand.

26. A combination according to claim 1 including demand storage means individual to each car and for each landing and call service direction which is actuated for a given car, landing and service direction by said assignment means when an assignment is established for said given car and a call for said landing and service direction; and means to deactuate said demand storage means for a given car in response to a change in service in the capacity of said car to serve demands assigned thereto.

27. A combination according to claim 26 wherein said service condition is the loading of said car.

28. A combination according to claim 1 including demand storage means individual to each car and for each landing and call service direction which is actuated for a given car, landing and service direction by said assignment means when an assignment is established for said given car and a call for said landing and service direction; means individual to each car for registering car calls for service at landings served by the car; command storage means for each car for storing car calls for each landing served by said car; means for cancelling calls registered in said demand memories in response to a service condition indicative of a change in the service capacity of said system with respect to assigned calls; and means responsive to a registered command for a car and landing coincident with an operated demand memory for inhibiting said call cancelling means for said demand memory.

29. A combination according to claim 1 including demand storage means individual to each car and for each landing and call service direction which is actuated for a given car, landing and service direction by said assignment means when an assignment is established for said given car and a call for said landing and service direction; means individual to each car for registering car calls for service at landings served by the car; command storage means for each car for storing car calls for each landing served by said car; means for cancelling calls registered in said demand memories of a car in response to a service condition indicative of a change in the service capacity of said car to serve calls assigned said car; and means responsive to a registered command for said car for a landing for which a demand is assigned said car for inhibiting said call cancelling means for said demand memory.

30. A combination according to claim 28 including means establishing a car service direction wherein said inhibiting means is effective only when said car service direction and said landing of said command correspond to said demand service direction and landing for said car.

31. An elevator system including a plurality of cars serving a plurality of landings, means for registering calls common to the cars for service at individual landings, means respoisive to operation of one of said call registering means for selecting said call, means individual to each car for ascertaining the level of service burden imposed upon said car, means to develop a service assignment between said selected call and the car nearest said call and having an acceptable level of service burden.

32. An elevator system including a plurality of cars serving a plurality of landings, means for registering calls common to the cars for service at individual landings, means responsive to operation of one of said call registering means for selecting said call, means individual to each car for ascertaining the level of service burden imposed upon said car, means establishing for each car a plurality of acceptable levels of said ascertained service burden, means to develop a service assignment between said selected call and the car nearest said call and having a first acceptable level of service burden, and means responsive to the absence of a car within said first acceptable level to develop a service assignment between said selected call and the car nearest said call and having a second preferred acceptable level of service burden greater than said first level.

33. A system according to claim 31 wherein said means ascertaining service burden is responsive to the loading in each car.

34. A system according to claim 31 wherein said means ascertaining service burden is responsive to the number of call assignments for each car.

35. A system according to claim 31 wherein said service burden ascertaining means is responsive to less than a predetermined level of loading of a car and less than a predetermined number of call assignments for said car to indicate an acceptable level of service burden.

36. A system according to claim 32 wherein said service burden ascertaining means is responsive to the loading of a car, the number of call assignments for said car and the service direction of said car; wherein said call registering means establish a call service direction; and wherein said means establishing acceptable levels of service burden establishes a first preferred level for a car having less than a predetermined level of loading and less than a predetermined number of call assignments, and a second preferred level for a car loaded to less than capacity and traveling in a service direction corresponding to the service direction of the call.

37. In an elevator system comprising a plurality of cars serving a plurality of landings the combination for ascertaining the distance between the cars and a landing for which a call for service is registered comprising, a scanning means for successively scanning positions corresponding to the landings in the travel of said cars, means for registering a call for service at a landing, means to initiate said scanning of said scanning means from the scan position corresponding to the landing of a registered call in response to said call registering means, and means responsive to the coincidence of scan position with the effective landing position of each car.

38. A combination according to claim 37 including means for registering calls for service at each landing in the direction that service is available from said landing, means to set the scanning direction in opposition to the direction of service of said registered call, and means to signify the service direction of each car, wherein said means responsive to a position coincidence of said scan and said car is responsive only when said coincidence occurs when said scan direction opposes said car service direction.

39. A system for controlling a plurality of elevator cars serving a plurality of landings and wherein service assignments are developed between all calls for service and individual cars without requiring the cars to be in immediate proximity to calls in order to establish the assignment comprising means to register landing calls, means to predict the service capability of each of said cars with respect to individual registered landing calls as a function of the disposition of each car in said system, and means to establish a service assignment between each individual registered landing call and a car based upon the predicted service capability of said car with respect to said call.

40. A combination according to claim 39 wherein said assignment means establishes an assignment only when the car subject to the assignment has at least a predetermined predicted service capability with respect to said call.

41. A combination according to claim 40 wherein said assignment means establishes an assignment for that car closest to said call and which has said predetermined capability.

42. A combination according to claim 39 including a timer for timing the interval a landing call is registered, means responsive to service by a car to a landing call for cancelling the registration of said call, and means responsive to the definition by said timer of a given time interval for cancelling the assignment between the car and the landing call associated with said timer.

43. A combination according to claim 42 including car call registering means for the landings served by said cars and means to inhibit said assignment cancelling means in response to the registration of a car call for the landing associated with said timer for the assigned car.

44. A combination according to claim 42 including means individual to the cars to register calls for the landings, means to establish a service direction for each car, and means responsive to the registration of a landing call for a landing coinciding with the landing of a car call in a given car set for the service direction of said landing call for assigning said landing call to said given car.

45. A combination according to claim 44 including means to inhibit said call coincidence assigning means in response to a predetermined service condition.

46. A combination according to claim 45 wherein said predetermined service condition is the loading of said given car at a predetermined magnitude.

47. A combination according to claim 1 including demand storage means individual to each car for each service direction for each landing served by said car, said demand storage for a given car, landing and service direction being actuated by said assignment means to store an assignment when said assignment is established for said given car for said service direction and landing; and means for cancelling said demand storage assignment in response to the response of said first and second assignment cancelling means.

References Cited

UNITED STATES PATENTS

| | | | |
|---|---|---|---|
| 2,557,179 | 6/1951 | Fish et al. | 187—29 |
| 2,624,425 | 1/1953 | Eames | 187—29 |

(Other references on following page)

UNITED STATES PATENTS

| | | | |
|---|---|---|---|
| 2,685,348 | 8/1954 | Borden | 187—29 |
| 2,795,298 | 6/1957 | Suozzo et al. | 187—29 |
| 2,827,981 | 3/1958 | Eames et al. | 187—29 |
| 2,941,624 | 6/1960 | Keppler et al. | 187—29 |
| 3,080,945 | 3/1963 | Dinning et al. | 187—29 |

FOREIGN PATENTS

| | | |
|---|---|---|
| 820,157 | 11/1937 | France. |

OTHER REFERENCES

Publication: G.E.C. Journal, vol. 31, No. 2, 1964, pp. 84–91, "Automatic Control of Groups of Lifts," by S. T. Hunt and R. J. Bedford of the Express Lift Company Limited, Northampton, England.

ORIS L. RADER, *Primary Examiner.*

W. E. DUNCANSON, Jr., *Assistant Examiner.*

UNITED STATES PATENT OFFICE

CERTIFICATE OF CORRECTION

Patent No. 3,443,668 Dated May 13, 1969

Inventor(s) DONIVAN L. HALL and WILLIAM C. SUSOR

It is certified that error appears in the above-identified patent and that said Letters Patent are hereby corrected as shown below:

| | | |
|---|---|---|
| Column 5, | line 59, | "while" should be -- which --. |
| Column 9, | line 15, | "depicated" should be -- depicted --. |
| Column 18, | line 25, | after "car" insert -- over --. |
| Column 21, | line 75, | "estabilshed" should be -- established --. |
| Column 22, | line 56, | "Th" should be -- The --; |
| | line 57, | "hiibts" should be -- hibits --; |
| Column 22, | line 75, | "CRFC" both occurrences should be -- CFRC --. |
| Column 28, | line 24, | "isssue" should be -- issue --. |
| Column 33, | line 64, | "upson" should be -- upon --. |
| Column 64, | line 15, | "car" should be -- hall --; |
| | line 41, | after "service" insert -- conditions imposed upon said given car indicative of a change --. |
| Column 65, | line 15, | "respoisive" should be -- responsive --. |

Signed and sealed this 5th day of November 1974.

(SEAL)
Attest:

McCOY M. GIBSON JR.
Attesting Officer

C. MARSHALL DANN
Commissioner of Patents